US011929655B2

United States Patent
Ota et al.

(10) Patent No.: US 11,929,655 B2
(45) Date of Patent: Mar. 12, 2024

(54) TRANSPORT SYSTEM AND PROCESSING SYSTEM

(71) Applicant: CANON KABUSHIKI KAISHA, Tokyo (JP)

(72) Inventors: Hirohisa Ota, Kawagoe (JP); Takeshi Yamamoto, Fujisawa (JP); Satoru Deguchi, Yokohama (JP); Takashi Shigemori, Kawasaki (JP); Kichinosuke Hirokawa, Kawasaki (JP); Ryota Okazaki, Yamato (JP)

(73) Assignee: CANON KABUSHIKI KAISHI, Tokyo (JP)

( * ) Notice: Subject to any disclaimer, the term of this patent is extended or adjusted under 35 U.S.C. 154(b) by 0 days.

(21) Appl. No.: 17/179,500

(22) Filed: Feb. 19, 2021

(65) Prior Publication Data
US 2021/0184555 A1    Jun. 17, 2021

Related U.S. Application Data

(63) Continuation of application No. 16/134,563, filed on Sep. 18, 2018, now Pat. No. 10,965,201.

(30) Foreign Application Priority Data

Sep. 25, 2017  (JP) ................ 2017-184119
Sep. 25, 2017  (JP) ................ 2017-184121

(51) Int. Cl.
*H02K 41/03*  (2006.01)
*B65G 43/00*  (2006.01)
(Continued)

(52) U.S. Cl.
CPC .......... *H02K 41/031* (2013.01); *B65G 43/00* (2013.01); *B65G 47/642* (2013.01); *B65G 54/02* (2013.01);
(Continued)

(58) Field of Classification Search
None
See application file for complete search history.

(56) References Cited

U.S. PATENT DOCUMENTS 2,750,897 A    6/1956  Davis
3,340,821 A    9/1967  Wesener
(Continued)

FOREIGN PATENT DOCUMENTS

CN    1333731 A     1/2002
CN    102039902 A   5/2011
(Continued)

OTHER PUBLICATIONS

Chinese Office Action issued in corresponding Chinese application No. 201811113994.2 dated Jul. 7, 2021 (partial English language translation).
(Continued)

*Primary Examiner* — William R Harp
(74) *Attorney, Agent, or Firm* — VENABLE LLP

(57) ABSTRACT

An embodiment includes: a first transport module on which a carriage moves; a second transport module that is configured to be able to move to a position for connecting to the first transport module and on which the carriage is able to move to and from the first transport module; a position detection unit that detects a position in a moving direction of the second transport module and outputs position information; a first control unit that controls motion of the carriage on the first transport module; a second control unit that controls motion of the carriage on the second transport module; a third control unit that controls motion of the second transport module; and a fourth control unit that controls the first to third control units. The fourth control (Continued)

unit corrects a position where the second transport module connects to the first transport module based on the position information.

14 Claims, 38 Drawing Sheets

(51) Int. Cl.
*B65G 47/64* (2006.01)
*B65G 54/02* (2006.01)
*H02P 6/00* (2016.01)
*H02P 6/12* (2006.01)
*H02P 25/06* (2016.01)

(52) U.S. Cl.
CPC ............... *H02P 6/006* (2013.01); *H02P 6/12* (2013.01); *H02P 25/06* (2013.01)

(56) References Cited

U.S. PATENT DOCUMENTS

| | | |
|---|---|---|
| RE27,871 E | 1/1974 | O'Connor |
| 3,880,299 A | 4/1975 | Zollinger |
| 4,207,821 A | 6/1980 | Beckert |
| 4,615,273 A | 10/1986 | Osthus |
| 4,630,216 A | 12/1986 | Tyler |
| 5,664,929 A | 9/1997 | Esaki |
| 7,071,865 B2 | 7/2006 | Shibamiya |
| 7,296,234 B2 | 11/2007 | Fukuda |
| 7,496,278 B2 | 2/2009 | Miyamoto |
| 7,522,087 B2 | 4/2009 | Shibamiya |
| 8,023,802 B2 | 9/2011 | Miyamoto |
| 9,365,354 B2 | 6/2016 | Takagi |
| 9,611,107 B2 | 4/2017 | Wernersbach |
| 9,757,797 B2 | 9/2017 | Urata |
| 9,919,878 B2 * | 3/2018 | Dong ................. H05K 13/0061 |
| 9,957,119 B2 | 5/2018 | Wernersbach |
| 10,280,016 B2 | 5/2019 | Wernersbach |
| 10,511,247 B2 | 12/2019 | Mukai |
| 10,562,720 B2 | 2/2020 | Yamamoto |
| 10,625,948 B2 | 4/2020 | Fujii |
| 10,889,449 B2 | 1/2021 | Umeyama |
| 10,994,953 B2 * | 5/2021 | Ragan .................... B65G 54/02 |
| 2014/0257554 A1 | 9/2014 | Takagi |
| 2014/0292112 A1 | 10/2014 | Mukai |
| 2016/0159585 A1 | 6/2016 | Wernersbach |
| 2016/0355350 A1 | 12/2016 | Yamamoto |
| 2017/0008709 A1 | 1/2017 | Tomoda |
| 2017/0117829 A1 | 4/2017 | Yamamoto |
| 2019/0092578 A1 | 3/2019 | Umeyama |

FOREIGN PATENT DOCUMENTS

| | | |
|---|---|---|
| CN | 103918174 A | 7/2014 |
| CN | 104411608 A | 3/2015 |
| CN | 104875766 A | 9/2015 |
| CN | 106170422 A | 11/2016 |
| CN | 106335755 A | 1/2017 |
| CN | 106808204 A | 6/2017 |
| CN | 206218764 U | 6/2017 |
| JP | H01-151997 U | 10/1989 |
| JP | H03-033903 A | 2/1991 |
| JP | H04-243727 A | 8/1992 |
| JP | 5-24652 A | 2/1993 |
| JP | 5-64311 A | 3/1993 |
| JP | 7-144755 A | 6/1995 |
| JP | H08-036417 A | 2/1996 |
| JP | H08-047825 A | 2/1996 |
| JP | H09-169405 A | 6/1997 |
| JP | H11-99940 A | 4/1999 |
| JP | 2004-015894 A | 1/2004 |
| JP | 3920489 B2 | 5/2007 |
| JP | 3927632 B2 | 6/2007 |
| JP | 2008-037595 A | 2/2008 |
| JP | 2012-162336 A | 8/2012 |
| JP | 2015-213394 A | 11/2015 |
| JP | 2016-050112 A | 4/2016 |
| JP | 2016-112676 A | 6/2016 |

OTHER PUBLICATIONS

Japanese Office Action issued in corresponding Japanese application No. 2017-184121 dated Sep. 9, 2021 (with English language translation).
Japanese Search Report dated Jul. 1, 2021 in corresponding Japanese application No. 2017-184119 (English translation included).
Chinese Office Action issued in corresponding Chinese application No. 202111078977.1 dated Jul. 29, 2022 (with English language translation).
Japanese Office Action issued in corresponding Japanese application No. 2022-018111 dated Feb. 7, 2023 (with English language translation).
Japanese Office Action issued in corresponding Japanese application No. 2022-018111 dated Jul. 4, 2023 (with English language translation).
Japanese Office Action dated Oct. 17, 2023 during prosecution of related Japanese application No. 2022-018111 (English-language machine translation included.).

* cited by examiner

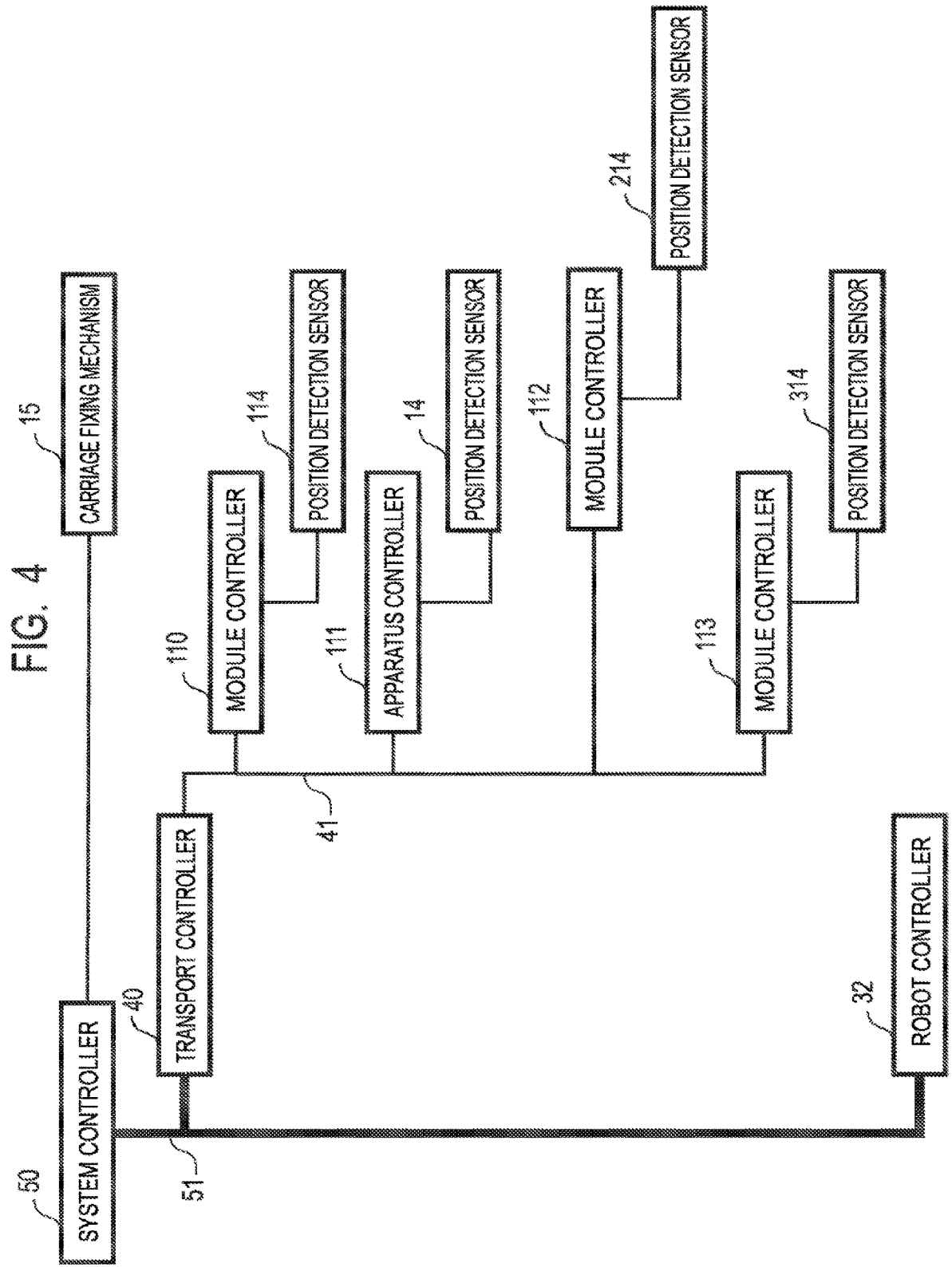

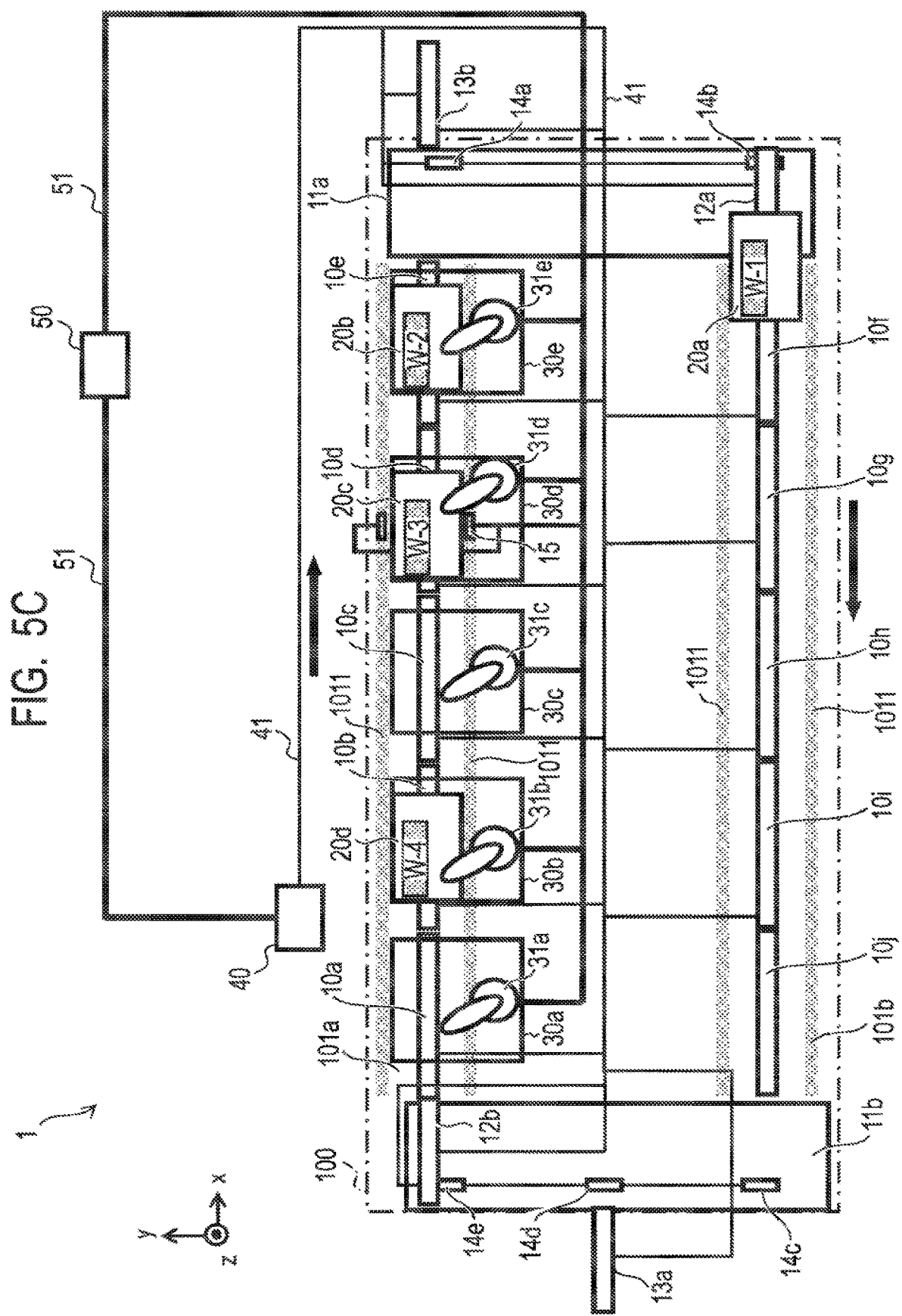

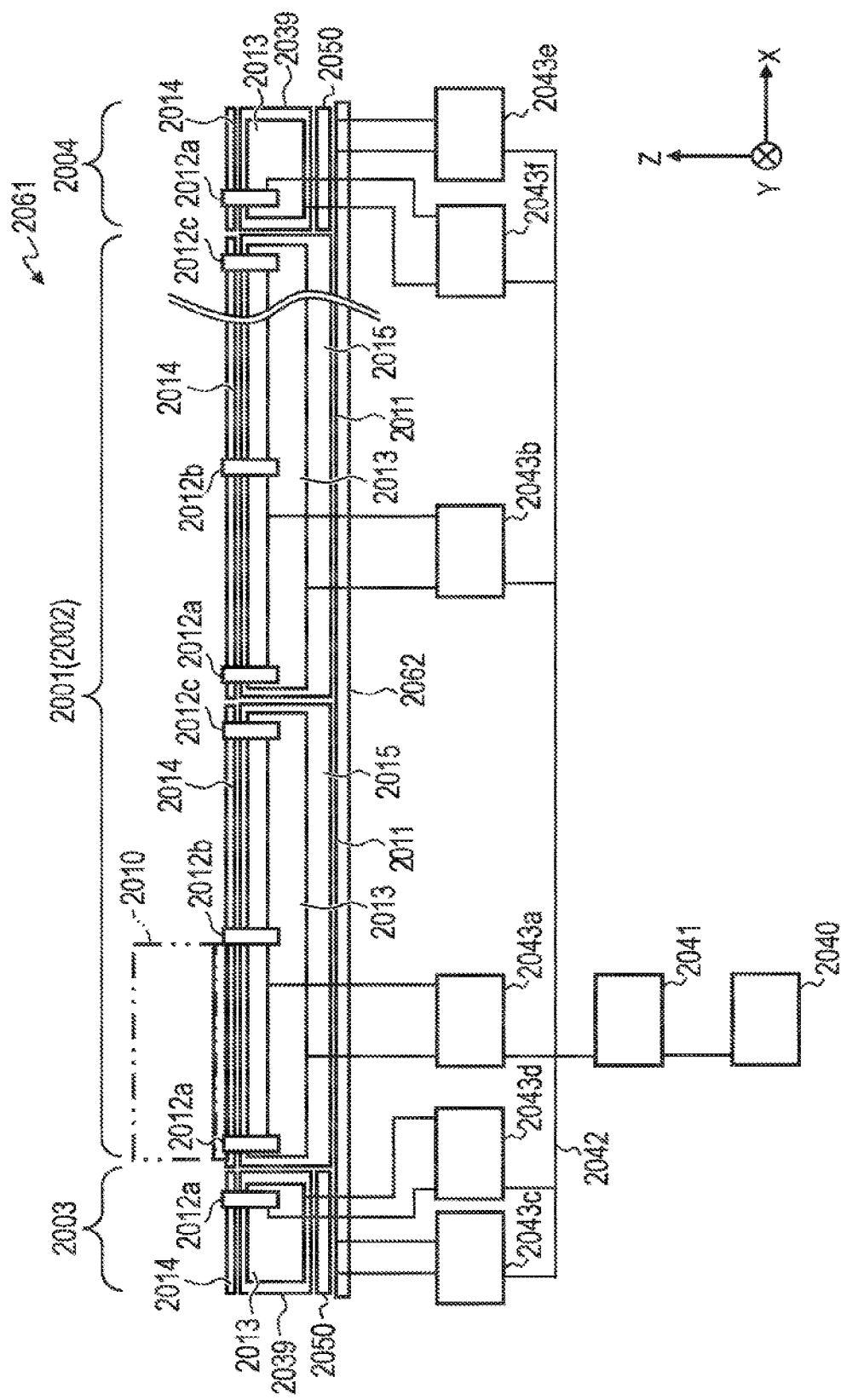

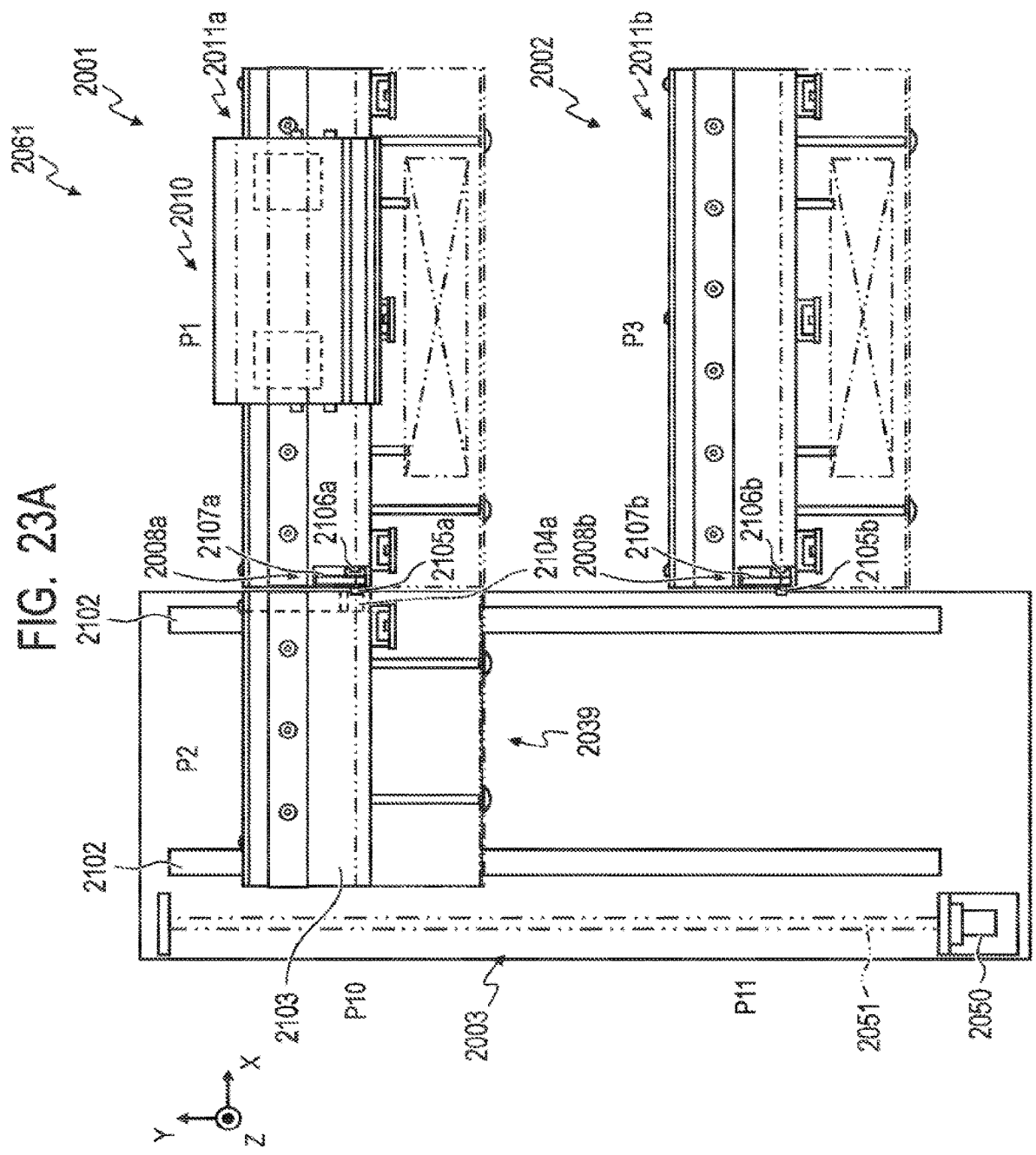

TRANSPORT SYSTEM AND PROCESSING SYSTEM

This application is a continuation of U.S. application Ser. No. 16/134,563 filed on Sep. 18, 2018.

BACKGROUND OF THE INVENTION

Field of the Invention

The present invention relates to a transport system and a processing system.

Description of the Related Art

In general, in a production line for assembling industry products, a plurality of so-called stations that carry out particular working processes are installed at predetermined intervals. A transport apparatus that transports a workpiece is arranged between these stations. Conventionally, once a workpiece is passed onto a holding unit of each station from the transport apparatus, then subjected to predetermined processing, and after the processing, the workpiece is again passed onto the transport apparatus and transported to the next process station.

In recent years, such a transport system that can perform processing on a workpiece left held on the carriage at the station and, after processing, transport the workpiece left held on the carriage to the next process station has been used. As such a transport system, a movable magnet type linear motor system (moving magnet type linear motor) is proposed. A movable magnet type linear motor system is formed of combination of a needle having a plurality of N-pole permanent magnets and S-pole permanent magnets aligned in an alternating manner on a carriage, a stator having a plurality of coils aligned in the traveling direction of the carriage, and a current controller that supplies currents to the coils. Such a movable magnet type linear motor system can not only advantageously perform processing on a workpiece held on the carriage but also ease constraints to the transport path because no wiring is required on the needle side.

Further, Japanese Patent Application Laid-Open No. H05-024652 proposes a transport apparatus that branches a pallet carrying a component or a workpiece to respective stations or into a plurality of transport lines in an assembly line for transportation. The transport apparatus disclosed in Japanese Patent Application Laid-Open No. H05-024652 has a branching apparatus that branches and passes pallets to an assembly line and a retune line or other processes.

Further, Japanese Patent Application Laid-Open No. H07-144755 proposes a transport apparatus that has a traveling carriage supply station provided outside a turn table on the extension line of the transport path. In the transport apparatus disclosed in Japanese Patent Application Laid-Open No. H07-144755, a traveling carriage can be supplied or collected while the traveling carriage supply station causes another traveling carriage to travel on a looped transport path on the primary line.

Japanese Patent Application Laid-Open No. H05-064311 discloses that a stopper for mechanically fixing a carriage is provided and the carriage is fixed in a positioning position.

In the conventional transport systems, however, there are first to third problems described below.

The first problem is a problem described below. In the transport apparatus as disclosed in Japanese Patent Application Laid-Open No. H05-024652, there is a problem of a position shift occurring in a moving direction of a transfer apparatus between the transfer apparatus and a transport path when a carriage is moved on the transfer apparatus such as a branching apparatus that transfers a pallet or a carriage. In a transport system in which a carriage travels, such a position shift causes an impact when the carriage passes on a connection part of the transport path and the carriage transfer apparatus, which makes high speed traveling difficult. Furthermore, there is a concern of damage on the carriage or the transport path due to the impact when the carriage passes on the connection part. Further, during a transfer operation, unless a carriage travels in a state where the transport path on which a carriage is traveling and the transfer apparatus are connected to each other and the carriage is able to transfer thereto, the carriage is likely to go out of the transport path.

Further, the second problem is a problem described below. In the transport apparatus disclosed in Japanese Patent Application Laid-Open No. H07-144755, since a traveling carriage supply station is arranged only outside the turn table on the extension line of the transport path, a place where the carriage is extracted or supplied is limited. Furthermore, for a closed transport path including a curved transport section, it is difficult to install the traveling carriage supply station disclosed in Japanese Patent Application Laid-Open No. H07-144755. It is demanded to extract a carriage from a transport path or supply a carriage to a transport path efficiently in a short time even with a closed transport path.

Further, the third problem is a problem described below. Positioning of a carriage to a station when processing operation is carried out is servo-controlled by using a motor controller based on position information obtained by sensing a scale attached to the carriage by using an encoder installed on a transport path side. In operation processes in a station, there may be a process of applying a large stress such as a process of attaching a component on a held workpiece by pressure joining, for example. Therefore, in order to realize accurate positioning for a carriage even in an operation process in which a large disturbance is added to the carriage due to a stress or the like, it is necessary to maintain a high rigidity with high speed and high performance servo control and a high power motor. However, a use of high performance servo control and a high power motor will lead to an increase in cost. In the transport apparatus disclosed in Japanese Patent Application Laid-Open No. H05-064311, a lock mechanism for positioning a carriage is provided to each station where the carriage is stopped. Thus, in the art disclosed in Japanese Patent Application Laid-Open No. H05-064311, an unnecessary lock mechanism is arranged also for a stop position which can be fully achieved as a result of the accuracy in the positioning with servo control, which leads to an increase in cost.

SUMMARY OF THE INVENTION

In order to solve the first problem described above, according to one aspect of the present invention, provided is a transport system including: a first transport module on which a carriage moves; a second transport module that is configured to be able to move to a position for connecting to the first transport module and on which the carriage is able to move to and from the first transport module; a position detection unit that detects a position in a moving direction of the second transport module and outputs position information; a first control unit that controls motion of the carriage on the first transport module; a second control unit that controls motion of the carriage on the second transport module; a third control unit that controls motion of the second transport module; and a fourth control unit that controls the first control unit, the second control unit, and the third control unit, and based on the position information output from the position detection unit, the fourth control unit corrects a position where the second transport module connects to the first transport module.

In order to solve the second problem described above, according to another aspect of the present invention, provided is a transport system including: a transport path including first and second transport modules on which a carriage moves; a third transport module that is configured to be able to move to a position for connecting to the first and second transport modules between the first and second transport modules and on which the carriage is able to move between the first and second transport modules; and a fourth transport module that is installed outside an area including the transport path and on which the carriage moves, and the third transport module is configured to be able to move to a position for connecting to the fourth transport module.

In order to solve the third problem described above, according to yet another aspect of the present invention, provided is a transport system including: a transport path that has a drive unit that drives a carriage and on which the carriage moves; a control unit that positions the carriage on the transport path to stop the carriage by using servo control; and a fixing unit that fixes the carriage to the transport path, and when the carriage is stopped by the control unit, the fixing unit fixes the carriage to the transport path at a first stop position where external force above a predetermined strength is applied to the carriage and does not fix the carriage to the transport path at a second stop position where no external force above the predetermined strength is applied to the carriage.

According to still another aspect of the present invention, provided is a processing system including: the transport system described above, and a processing unit that processes a workpiece transported by the carriage.

Further features of the present invention will become apparent from the following description of exemplary embodiments with reference to the attached drawings.

BRIEF DESCRIPTION OF THE DRAWINGS

FIG. 4 is a control block diagram illustrating a control configuration of the processing system according to the first embodiment of the present invention.

FIG. 5C is a schematic diagram illustrating the procedure of the carriage transfer process in the processing system according to the first embodiment of the present invention.

FIG. 17A is a schematic diagram illustrating a configuration of a transport system according to the eighth embodiment of the present invention.

FIG. 23A is a top view illustrating a stop position of a transport carriage in the transport system according to the eighth embodiment of the present invention.

DESCRIPTION OF THE EMBODIMENTS

Figure 1:
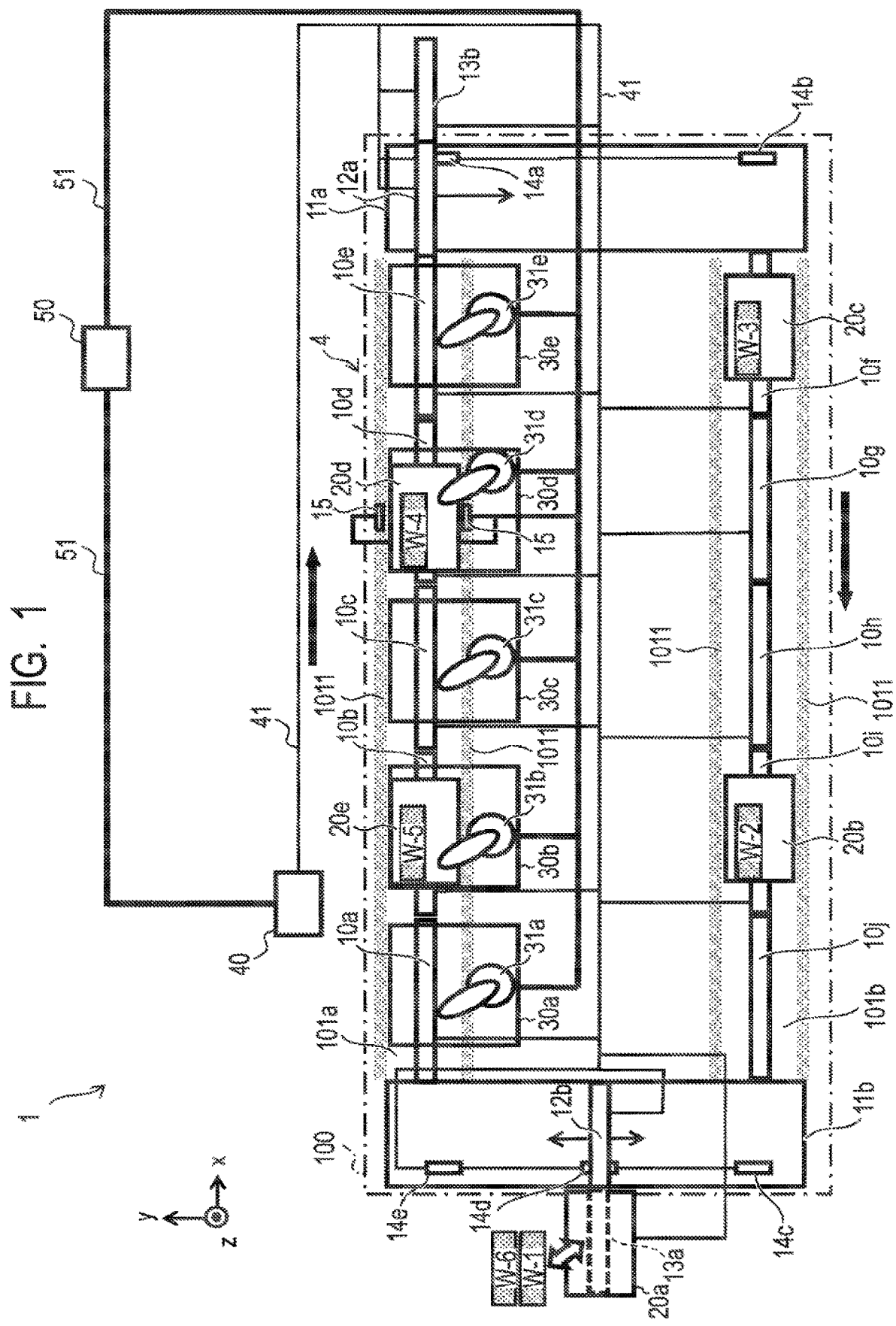
FIG. 1 is a schematic diagram illustrating the entire configuration of a processing system according to a first embodiment of the present invention.

Preferred embodiments of the present invention will now be described in detail in accordance with the accompanying drawings. Note that, in the following description and drawings, for a plurality of identical components, alphabets in small character are appended to the tail of the same reference numerals as identifiers when they are distinguished, and the identifiers are omitted and thus only the reference numerals are used when no distinction is needed in particular.

First Embodiment

A first embodiment of the present invention will be described by using FIG. 1 to FIG. 5E.

Figure 2A:
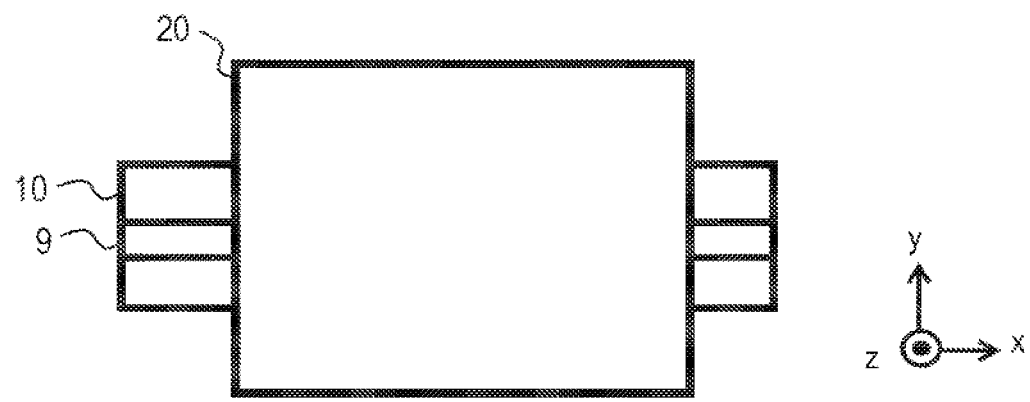
FIG. 2A is a schematic diagram illustrating a configuration of a carriage and a transport module in a transport system according to the first embodiment of the present invention.
Figure 2B:
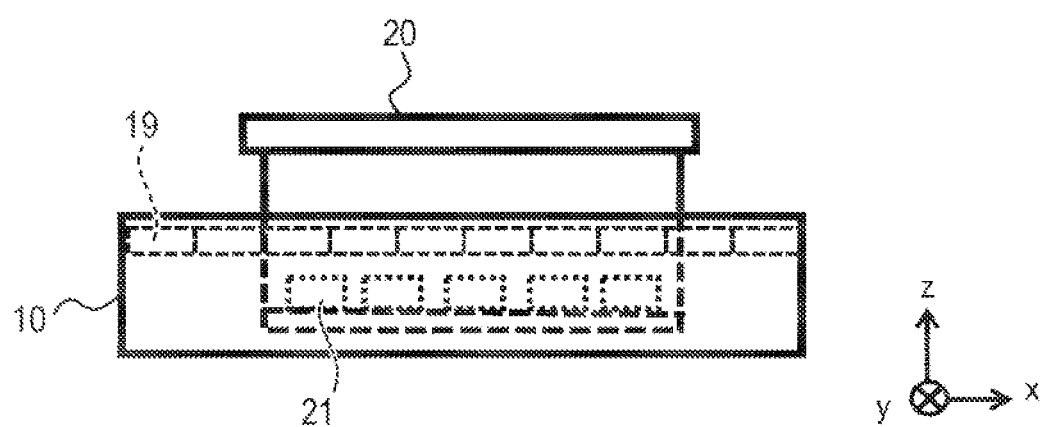
FIG. 2B is a schematic diagram illustrating a configuration of the carriage and the transport module in the transport system according to the first embodiment of the present invention.

First, a configuration of a processing system according to the present embodiment will be described by using FIG. 1 to FIG. 2B. FIG. 1 is a schematic diagram illustrating the entire configuration of a processing system 1 according to the present embodiment, which is a top view of the processing system 1 including a transport system 4 when viewed from the top. FIG. 2A is a plan view illustrating a configuration of a carriage 20 on a needle side forming a linear motor in the transport system 4 according to the present embodiment and a linear transport module 10 on a stator side. FIG. 2B is a side view illustrating a configuration of the carriage 20 and the linear transport module 10.

As illustrated in FIG. 1, the processing system 1 according to the present embodiment has transport paths 101, carriage transfer apparatuses 11, processing stations 30, and carriages 20. The processing system 1 according to the present embodiment includes a transport system 4 that transports workpieces W that are processing object to be processed. The processing system 1 forms a production line such as an assembly line of the workpieces W. Note that, for the workpieces W in the drawings, individual workpieces W are distinguished with reference numerals expressed by "W-n" (n is a positive integer) appended thereto. The transport system 4 has the transport paths 101, the carriage transfer apparatuses 11, and the carriages 20.

Here, respective coordinate axes, namely, an X-axis, a Y-axis, and a Z-axis in an XYZ coordinate system that is a rectangular coordinate system used in the following description are defined. First, the X-axis is defined in the transport direction of the carriage 20 that is horizontally transported. The perpendicular direction with respect to a horizontally placed frame (not illustrated) is defined as the Z-axis, and an axis orthogonal to the X-axis and the Z-axis is defined as the Y-axis. Note that the processing system 1 is installed on the frame. In the XYZ coordinate system defined as above, the direction in the X-axis is denoted as an X-axis direction, the direction in the Y-axis is denoted as a Y-axis direction, and the direction in the Z-axis is denoted as a Z-axis direction.

The transport system 4 in the processing system 1 is a circulating transport system in which a plurality of carriages 20 are circulated and transported. In the transport system 4, the transport paths 101 on which the carriage 20 is transported include two transport paths of a transport path 101a which is a forward path and a transport path 101b which is a reverse path. The transport path 101a that is a forward path and the transport path 101b that is a reverse path are installed to be parallel to each other.

Each transport path 101 is a transport path for the carriage 20 and is formed of a plurality of linear transport modules 10 connected to each other. Each linear transport module 10 is a straight transport module on which the carriage 20 moves straight.

As illustrated in FIG. 2A and FIG. 2B, the linear transport module 10 has a straight guiderail 9 and a plurality of coils 19 that are the stator of a linear motor. The plurality of coils 19 form a group of coils and function as a drive unit that drives the carriage 20 as described below. The guiderail 9 is installed in parallel to the X-axis direction on the linear transport module 10. Further, the plurality of coils 19 are aligned in the X-axis direction in which the carriage 20 travels. The linear transport module 10 configured as above is a module shorter than the transport path 101, and a plurality of linear transport modules 10 are connected to each other to form the transport path 101. FIG. 1 illustrates a case where five linear transport modules 10 are connected to each other to form the transport path 101 as an example. Further, while FIG. 2A illustrates a case where the guiderail 9 has the same length as the linear transport module 10 as an example, the guiderail 9 may be configured to have a length that spans over a plurality of linear transport modules 10.

The carriage 20 mounts and holds thereon a workpiece W that is a processing object and transports the workpiece W. The carriage 20 has a plurality of permanent magnets 21, the N-pole of which and the S-pole of which are arranged in alternating manner in the X-axis direction that is the traveling direction of the carriage 20. Between the plurality of permanent magnets 21 and the coils 19 of the linear transport module 10, electromagnetic force that drives the carriage 20 occurs by currents being applied to the coils 19 as a drive unit. In this way, the carriage 20 is driven as a needle of the linear motor by the electromagnetic force generated between the plurality of permanent magnets 21 and the coils 19 and travels on and along the guiderail 9 installed on the top face of the linear transport module 10. As discussed above, in the present embodiment, the transport system 4 with a movable magnet type linear motor is configured. Note that, instead of the permanent magnet 21, a ferromagnetic material such as an iron core may be used to configure a reluctance type linear motor.

The processing station 30 functions as a processing unit that processes the workpiece W. The processing stations 30 are installed along the transport path 101 inside a processing operation area 100 described later. Note that, while FIG. 1 illustrates a case where the processing stations 30 are installed only on the forward transport path 101a side and no processing station 30 is installed on the reverse transport path 101b side as an example, the embodiment is not limited thereto. The processing station 30 may be installed also on the reverse transport path 101b side. Further, the number of the processing stations 30 is not limited in particular and may be one or more.

A processing robot 31 that performs processing on the workpiece W transported by the carriage 20 is installed to each of the processing stations 30. The processing robot 31 may be a two-axis orthogonal robot, an articulated robot, or the like, for example. The carriage 20 is stopped at a predetermined stop position on the transport path 101 with respect to the processing station 30. A processing process by the processing robot 31 is performed on the workpiece W on the carriage 20 that has stopped on the transport path 101 under the control of a robot controller (see FIG. 3). The processing robot 31 applies a predetermined processing operation such as assembly of components or application to the workpiece W mounted on the carriage 20. Note that robots performing various processing operations on the workpiece W can be used as the processing robot 31 without being limited in particular.

Here, since the transport path length can be changed in accordance with a change of the number of the linear transport modules 10 to be connected, the transport path 101 has a high flexibility in the design of the transport path length thereof. Thus, the transport path length of the transport path 101 can be easily changed in accordance with the number of the processing stations 30 within the processing system 1.

In this way, an article such as an electronic device is manufactured by the processing robot 31 of the processing station 30 that functions as a processing unit that processes the workpiece W. The article to be manufactured is not limited in particular, and it may be any article. Various articles can be manufactured by a manufacturing method of an article using the processing system 1 according to the present embodiment.

The carriage transfer apparatus 11 is an apparatus for transferring the carriage 20 between transport paths different from each other, that is between transport modules not connected to each other. Two carriage transfer apparatuses 11a and 11b that transfer the carriage 20 between the forward transport path 101a and the reverse transport path 101b are installed in the transport system 4.

The carriage transfer apparatus 11 has a movable linear transport module 12 that is movable in the Y-axis direction. The carriage transfer apparatus 11 is able to move the linear transport module 12 in the Y-axis direction and stop the linear transport module 12 to be adjacent to the end of the transport path 101. A mechanism that moves the linear transport module 12 in the Y-axis direction is not limited in particular, and a single-axis actuator including a ball screw or the like may be used, for example.

The movable linear transport module 12 installed in the carriage transfer apparatus 11 has the same configuration as the linear transport module 10 forming the transport path 101 and has a guiderail 9 and the coils 19 that are the stator of the linear motor. Also in the movable linear transport module 12, in order to move the carriage 20 in the same manner as by the linear transport module 10 of the transport path 101, the guiderail 9 is installed in parallel to the X-axis direction thereon, and a plurality of coils 19 are aligned in the X-axis direction in which the carriage 20 travels.

As discussed above, the linear transport module 12 of the carriage transfer apparatus 11 is configured to be able to move to a position for connecting to the linear transport module 10 of the transport path 101, and thereby the carriage 20 is able to move to and from the transport path 101 and the linear transport module 10. Thereby, the linear transport module 12 can take in the carriage 20 on one transport path 101, move in the Y-axis direction with the carriage 20 being stopped thereon, and transfer the carriage 20 to another transport path 101.

Specifically, as illustrated in FIG. 1, the carriage transfer apparatus 11a is coupled to the end on the downstream side of the forward transport path 101a (the right end in FIG. 1) and the end on the upstream side of the reverse transport path 101b (the right end in FIG. 1). The linear transport module 12a of the carriage transfer apparatus 11a is configured to be able to connect to the linear transport module 10e at the downstream end of the forward transport path 101a. This enables the carriage 20 to transfer from the linear transport module 1e to the linear transport module 12a. Further, the linear transport module 12a is configured to be able to connect to the linear transport module 10f at the upstream end of the reverse transport path 101b. This enables the carriage 20 to transfer from the linear transport module 12a to the linear transport module 10f. Via such the linear transport module 12a, the carriage transfer apparatus 11a can transfer the carriage 20 on the forward transport path 101a from the linear transport module 10e at the downstream side thereof to the linear transport module 10f at the upstream end of the reverse transport path 101b.

Similarly, as illustrated in FIG. 1, the carriage transfer apparatus 11b is coupled to the end on the upstream side of the forward transport path 101a (the left end in FIG. 1) and the end on the downstream side of the reverse transport path 101b (the left end in FIG. 1). The linear transport module 12b of the carriage transfer apparatus 11b is configured to be able to connect to the linear transport module 10j at the downstream end of the reverse transport path 101b. This enables the carriage 20 to transfer from the linear transport module 10j to the linear transport module 12b. Further, the linear transport module 12b is configured to be able connect to the linear transport module 10a at the upstream end of the forward transport path 101a. This enables the carriage 20 to transfer from the linear transport module 12b to the linear transport module 10a. Via such the linear transport module 12b, the carriage transfer apparatus 11b can transfer the carriage 20 on the reverse transport path 101b from the linear transport module 10j at the downstream side thereof to the linear transport module 10a at the upstream end of the forward transport path 101a.

As discussed above, in the transport system 4, a circulating transport path is formed by the transport path 101a, the carriage transfer apparatus 11a, the transport path 101b, and the carriage transfer apparatus 11b, which as a whole is able to circulate and transport the carriage 20. Note that the transport system 4 has a maintenance linear transport module 13 described later that forms a transport path separated from the circulating transport path.

Here, when transfer motion of the carriage 20 between the linear transport modules 10 and 12, a position shift may occur between the linear transport modules 10 and 12 if the positions in the Y-axis direction of the linear transport module 12 and the linear transport module 10 are not matched with high accuracy. Specifically, a position shift may occur between the guiderails 9 of both the linear transport modules 10 and 12. When the carriage 20 transfers with a position shift occurring in the guiderails 9, a large load may be applied to the carriage 20 or the linear transport module 10 or 12 due to impact or the like, and the carriage 20 or the linear transport module 10 or 12 may be damaged. This may cause breakage of the carriage 20, the linear transport module 10 or 12, or other components in the processing system 1 or may cause a defect to occur in the workpiece W held by the carriage 20. Furthermore, if transfer motion of the carriage 20 is attempted with the linear transport module 12 of the carriage transfer apparatus 11 being not located at a position that enables the transfer motion of the carriage 20, the carriage may drop from the transport path 101.

To prevent this, the transport system 4 according to the present embodiment has position detection sensors 14 provided to the carriage transfer apparatus 11. The position detection sensor 14 functions as a position detection unit that detects the position in the moving direction (Y-axis direction) of the linear transport module 12 of the carriage transfer apparatus 11 and outputs an output signal including the position information.

As illustrated in FIG. 1, as the position detection sensor 14, position detection sensors 14a and 14b that detect the positions in the Y-axis direction of the linear transport module 12a connected to the linear transport modules 10e and 10f, respectively, are provided to the carriage transfer apparatus 11a. The position detection sensor 14a of the position detection sensor 14 also detects the position in the Y-axis direction of the linear transport module 12a connected to the maintenance linear transport module 13b described later.

Further, as the position detection sensor 14, position detection sensors 14c and 14e that detect the positions in the Y-axis direction of the linear transport module 12b connected to the linear transport modules 10j and 10a, respectively, are provided to the carriage transfer apparatus 11b. Furthermore, as the position detection sensor 14, a position detection sensor 14d that detects the position in the Y-axis direction of the linear transport module 12b connected to the maintenance linear transport module 13a described later is provided to the carriage transfer apparatus 11b.

The position detection sensor 14 may be a linear encoder, for example, without being limited thereto in particular. In the present embodiment, as described later, the transport controller 40 can identify the position in the Y-axis direction of the linear transport module 12 and correct the position before starting the motion of the carriage 20 based on an output signal including position information output from the position detection sensor 14. In the present embodiment, this allows the linear transport module 12 of the carriage transfer apparatus 11 to be positioned with high accuracy in the Y-axis direction with respect to the linear transport module 10.

As illustrated in FIG. 1, the processing operation area 100 illustrated by the dot-dash line in FIG. 1 is defined in the processing system 1. The processing operation area 100 is a region including the transport path 101a, a carriage transfer apparatus 11a, the transport path 101b, the carriage transfer apparatus 11b, and the processing stations 30. The processing operation area 100 is a region which the operator should not be allowed to enter when the processing system 1 is running in an automatic operation mode, for example, because of danger of contacting with the running processing robot 31 or the carriage transfer apparatus 11. In the actual operation, for example, a safety fence, a door, and a door closure detection sensor at the boundary of the processing operation area 100 may be provided to monitor open and close of the door, or an entry detection sensor that detects entry into the processing operation area 100 may be provided to monitor entry.

The transport system 4 has the maintenance linear transport module 13 installed outside the processing operation area 100. The maintenance linear transport module 13 is installed adjacently to the carriage transfer apparatus 11 inside the processing operation area 100. In FIG. 1, the maintenance linear transport module 13b is installed adjacently to the carriage transfer apparatus 11a. The maintenance linear transport module 13b is installed on the extension line of the transport path 101a. Further, the maintenance linear transport module 13a is installed adjacently to the carriage transfer apparatus 11b. The maintenance linear transport module 13a is installed between the transport path 101a and the transport path 101b.

The maintenance linear transport module 13 is a linear transport module used for performing maintenance of the carriage 20 or the like and functions as a unit used for manually accessing a particular carriage 20 on the transport path 101. Note that the maintenance linear transport module 13 can be used for other purposes than maintenance of the carriage 20, for example, collection of the workpiece W on the carriage 20, overtaking of the carriage 20, or the like, as described later.

The maintenance linear transport module 13 has the same configuration as the linear transport module 10 forming the transport path 101 and has the guiderail 9 and the coils 19 that are the stator of the linear motor. Also in the maintenance linear transport module 13, in order to move the carriage 20 in the same manner as by the linear transport modules 10 and 12, the guiderail 9 is installed in parallel to the X-axis direction on the maintenance linear transport module 13, and a plurality of coils 19 are aligned in the X-axis direction in which the carriage 20 travels.

The linear transport module 12 of the carriage transfer apparatus 11 adjacent to the maintenance linear transport module 13 is configured to be able to move to the position for connecting to the maintenance linear transport module 13. This enables the carriage 20 to move and transfer between the linear transport module 12 and the maintenance linear transport module 13.

For example, the linear transport module 12b of the carriage transfer apparatus 11b can take in the carriage 20 therein from the transport path 101b, move in the Y-axis direction with the carriage 20 being placed and stopped on the linear transport module 12b, and move and transfer the carriage 20 to the maintenance linear transport module 13a. Further, the linear transport module 12b can take in the carriage 20 from the maintenance linear transport module 13*a*, move in the Y-axis direction with the carriage 20 being placed and stopped thereon, and move and transfer the carriage 20 to the transport path 101*a*, for example. Note that the linear transport module 12*a* of the other carriage transfer apparatus 11*a* can operate in the same manner as for the maintenance linear transport module 13*b*.

The maintenance linear transport module 13 is installed outside the processing operation area 100 including the transport path 101. Thus, unlike the linear transport modules 10 and 12 inside the processing operation area 100, the maintenance linear transport module 13 allows the operator to safely access the carriage 20 even when the processing system 1 is running in an automatic operation mode, for example. Therefore, the operator can safely access the carriage 20 transferred on the maintenance linear transport module 13 and perform maintenance of the carriage 20 even when the processing system 1 is running.

Other purposes of access to the carriage 20 transferred on the maintenance linear transport module 13 may be collection of the processed workpiece W and supply of an unprocessed new workpiece W, for example. In this case, for example, the carriage 20*a* on which a processed workpiece W-1 is mounted is transferred from the reverse transport path 101*b* via the linear transport module 12*b* of the carriage transfer apparatus 11*b* to the maintenance linear transport module 13*a*, and thereby the workpiece W-1 is collected. Subsequently, an unprocessed new workpiece W-6 is mounted on the carriage 20*a* transferred to the maintenance linear transport module 13*a* and supplied to the forward transport path 101*a* via the linear transport module 12*b* of the carriage transfer apparatus 11*b*.

At this time, the linear transport module 12*b* of the carriage transfer apparatus 11*b* is required to be positioned with high accuracy in the Y-axis direction with respect to the maintenance linear transport module 13*a* in the same manner as for the linear transport modules 10*a* and 10*j* of the transfer paths 101*a* and 101*b*. As described above, the position detection sensor 14*d* that detects the position in the Y-axis direction of the linear transport module 12*b* connected to the maintenance linear transport module 3*a* is provided as the position detection sensor 14 to the carriage transfer apparatus 11*b*. Thus, the linear transport module 12*b* can be positioned with high accuracy in the Y-axis direction also with respect to the maintenance linear transport module 13*a*. Note that the linear transport module 12*a* of the other carriage transfer apparatus 11*a* can also be positioned with high accuracy in the Y-axis direction with respect to the maintenance linear transport module 13*b* by using the position detection sensor 14*a*.

Further, for example, a failure may occur in the middle of processing performed by the processing stations 30*a* to 30*e* on the forward transport path 101*a* resulting in a defective workpiece W. In this case, the carriage 20 on which the defective workpiece W is mounted is transferred to the maintenance linear transport module 13*b* installed on the extension line of the forward transport path 101*a*. Subsequently, the defective workpiece W is collected from the carriage 20 mounted on the maintenance linear transport module 13*b*. Here, since the maintenance linear transport module 13*b* is arranged outside the processing operation area 100, the carriage 20 on which the defective workpiece W is mounted can be collected without causing other carriages 20 to stop. Note that a process in the processing station 30 after a failure occurs can be skipped as an unnecessary process by a system controller 50 described later instructing a NOP (No Operation) command.

Furthermore, maintenance of the carriage 20 can be performed on the maintenance linear transport module 13*b*. Also at this time, only the particular carriage 20 can be accessed on the maintenance linear transport module 13 without affecting other carriages 20 in operation.

In addition, it is possible to temporarily evacuate the preceding carriage 20 in the maintenance linear transport module 13*b* and then allow the subsequent carriage to proceed to the next process, that is, perform overtaking of the operating carriage 20.

As discussed above, according to the present embodiment, it is possible to access a particular carriage 20 efficiently in a short time and therefore perform collection, supply, maintenance, or the like of the carriage 20 without causing another carriage 20 to stop.

Further, the processing system 1 according to the present embodiment has the transport controller 40 and the system controller 50. The transport controller 40 is connected to respective controllers of the linear transport modules 10, 12, and 13 and the carriage transfer apparatuses 11 and the position detection sensors 14 in the processing system 1 via a transport-system serial communication network 41 that is the same communication network. The transport controller 40 is responsible for controlling current conduction of the coils 19 in respective linear transport modules 10, 12, and 13. The system controller 50 is connected to the robot controller (not illustrated) and the transport controller 40 in the processing system 1 via a whole-system serial communication network 51. The system controller 50 implements synchronous control of the processing robot 31 and the transport controller 40.

Further, the transport system 4 according to the present embodiment has a carriage fixing mechanism 15 installed on the transport path 101. The carriage fixing mechanism 15 functions as a fixing unit that fixes the carriage 20 to the transport path 101 at a predetermined stop position on the transport path 101. A predetermined stop position on the transport path 101 as used herein refers to a stop position of the carriage 20 where a particular processing station 30 of the plurality of processing stations 30 processes the workpiece W on the carriage 20. The carriage fixing mechanism 15 fixes the carriage 20 to the transport path 101 and thereby prevents a position shift of the carriage 20 during processing of the workpiece W by the processing station 30.

Figure 3:
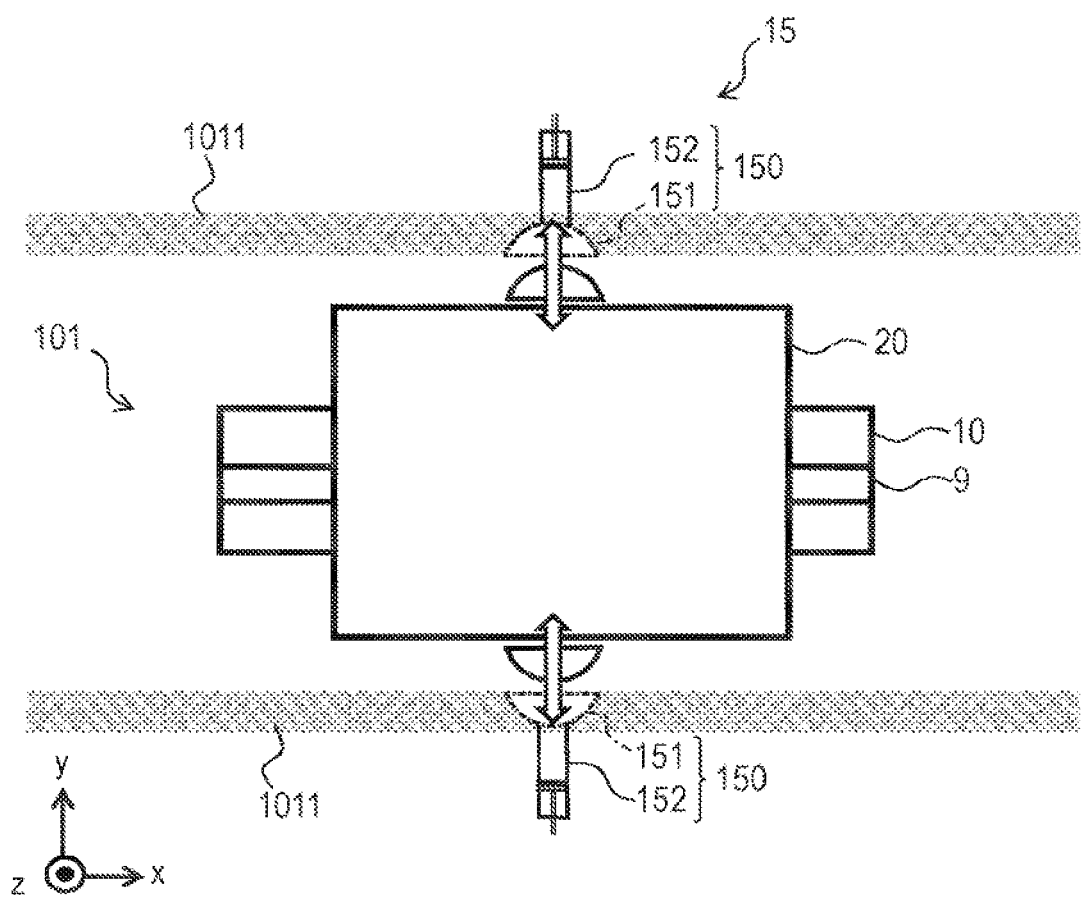
FIG. 3 is a schematic diagram illustrating a configuration of a carriage fixing mechanism in the transport system according to the first embodiment of the present invention.

FIG. 1 illustrates the carriage fixing mechanism 15 that fixes the carriage 20 to the transport path 101*a* at a stop position where one processing station 30*d* of the five processing stations 30*a* to 30*e* processes the workpiece W. The carriage fixing mechanism 15 that functions as a fixing unit that prevents a position shift of the carriage 20 during processing will be described below by further using FIG. 3. FIG. 3 is a schematic diagram illustrating a configuration of the carriage fixing mechanism 15 according to the present embodiment, which is a top view when the carriage fixing mechanism 15 and the carriage 20 fixed thereby are viewed from the top.

Some processing station 30 performs a process in which, when processing the workpiece W by the processing robot 31 thereof, large external force is applied to the carriage 20 via the workpiece W on the carriage 20. A process in which large external force is applied to the carriage 20 may be, for example, press-fit assembly or the like without being limited thereto in particular. During processing, the carriage 20 is positioned at a predetermined stop position by using servo control under the control of the transport controller 40. However, when the carriage 20 is subjected to external force greater than a predetermined strength via the workpiece W being processed, this may cause a position shift of the carriage 20. When a position shift occurs in the carriage 20 on which the workpiece W being processed is mounted, this causes the workpiece W being processed to be a defect. The carriage fixing mechanism 15 fixes the carriage 20 to the transport path 101 at a predetermined stop position as described above and thereby prevents a position shift of the carriage 20 during processing of the workpiece W.

FIG. 3 illustrates a view of the carriage fixing mechanism 15 fixing the carriage 20. Fences 1011 such as guardrails are installed along the transport path 101 on both side ends of the transport path 101 where the carriage fixing mechanism 15 is installed, respectively. The carriage fixing mechanism 15 has a pair of fixing units 150 installed to the fences 1011 on both side ends of the transport path 101, respectively. Each of the fixing units 150 has a fixing pad 151 and a fixing actuator 152. The fixing pad 151 is configured to be able to press the carriage 20 on the transport path 101 from the side of the carriage 20 toward the center line of the transport path 101 in the Y-axis direction. The fixing actuator 152 drives the fixing pad 151 in the Y-axis direction. The fixing actuator 152 is a solenoid, for example, and is driven under an instruction from the system controller 50.

The carriage fixing mechanism 15 installed on the transport path 101 drives the pair of fixing pads 151 by using the fixing actuator 152 of the pair of fixing units 150 and presses the carriage 20 by the pair of fixing pads 151 that press the carriage 20 in the opposite direction against each other to fix the carriage 20.

Here, a module controller 110 (see FIG. 4) controls current conduction to the coils 19 of the linear transport module 10 under the instruction from the transport controller 40 and controls transport of the carriage 20 on the transport path 101. When fixing the carriage 20 by the carriage fixing mechanism 15, the module controller 110 positions and stops the carriage 20 at a target stop position on the transport path 101 according to servo control.

Before and after fixing the carriage 20 by using the carriage fixing mechanism 15, the module controller 110 switches turning on and turning off of the servo control of the carriage 20 described above in the following manner. First, the carriage 20 is positioned and stopped at a stop position according to the servo control by the module controller 110 as described above. In response, the carriage fixing mechanism 15 turns on and drives the fixing actuators 152 under the instruction from the system controller 50. Thereby, the carriage fixing mechanism 15 uses the fixing pads 151 of the pair of fixing units 150 to press the carriage 20 from each other to hold the carriage 20 therebetween and fixes the carriage 20 on the transport path 101. Once the carriage 20 is fixed by the carriage fixing mechanism 15, the module controller 110 turns off the servo control of the carriage 20 to stop the carriage 20.

Processing is performed on the workpiece W on the fixed carriage 20 by the processing robot 31 of the processing station 30. After the completion of processing, the module controller 110 sets the current position of the carriage 20 to a target position and again turns on and starts servo control of the carriage 20 before turning off the fixed actuators 152 to release the fixing of the carriage 20. This is to avoid a servo error or rapid correction drive by the carriage 20.

After the servo control of the carriage 20 is restarted, the carriage fixing mechanism 15 turns off the fixing actuators 152 under the instruction from the system controller 50. Thereby, the carriage fixing mechanism 15 causes the fixing pads 151 of the pair of the fixing units 150 to separate from the carriage 20 to release the fixing of the carriage 20.

With a series of the control described above, when processing the workpiece W on the carriage 20 by using the processing robot 31, it is possible to increase the substantial rigidity of the carriage 20 by mechanically fixing the carriage 20 to the transport path 101 by using the carriage fixing mechanism 15. Thereby, even when large external force is applied to the carriage 20, it is possible to maintain accurate positioning of the carriage 20 and thus prevent a processing failure of the workpiece W.

In the present embodiment, the carriage fixing mechanism 15 described above is not installed in all the stop positions where processing processes on the workpiece W are performed by the processing robots 31a to 31e in the processing stations 30a to 30e. That is, the carriage fixing mechanism 15 is installed for only the stop position where a processing process by the processing robot 31d of the processing station 30d of the processing stations 30a to 30e so as to fix the carriage 20 to the stop position, as illustrated in FIG. 1.

The processing robot 3d to which the carriage 20 is fixed by the carriage fixing mechanism 15 in processing processes the workpiece W while applying external force greater than a predetermined strength to the carriage 20 via the workpiece W. In contrast, other processing robots 31a to 31c and 31e to which the carriage 20 is not fixed by the carriage fixing mechanism 15 in processing process the workpiece W without applying external force of a predetermined strength. In such a way, in the present embodiment, out of a plurality of stop positions where the carriage 20 is stopped, for only the stop position where external force greater than a predetermined strength is applied to the carriage 20, the carriage fixing mechanism 15 that fixes the carriage 20 to the stop position is installed. In the stop position where external force greater than a predetermined strength is not applied out of the plurality of stop positions, the carriage 20 is not fixed by the carriage fixing mechanism 15. Thus, compared to a case where the carriage fixing mechanisms 15 are evenly installed for all the plurality of stop positions, the number of installed carriage fixing mechanisms 15 can be reduced in the present embodiment, and this enables cost reduction.

As discussed above, in the present embodiment, the number of installed carriage fixing mechanisms 15 that is a unit for fixing the carriage 20 can be reduced, which enables cost reduction of the processing system 1 including the transport system 4. In the present embodiment, the carriage 20 can be reliably stopped by the carriage fixing mechanism 15 installed as described above, and accurate positioning can be realized at low cost.

FIG. 4 is a control block diagram illustrating a control configuration of the processing system 1 according to the present embodiment. The system controller 50 is a control unit responsible for the entire control of the processing system 1. The transport controller 40 and a robot controller 32 that controls the processing robot 31 in each processing station 30 are connected to the system controller 50 via the whole-system serial communication network 51, as illustrated in FIG. 3. Note that the robot controllers 32 are provided to the plurality of processing robots 31, respectively.

The transport controller 40 is connected to the module controller 110 that controls the linear transport module 10 forming the transport path 101 by the transport-system serial communication network 41. The module controllers 110 are provided to the plurality of linear transport modules 10, respectively. A position detection sensor 114 that detects the position in the transport direction (X-axis direction) of the carriage 20 on the corresponding linear transport module 10 is connected to each module controller 110. The position detection sensor 114 as a position detection unit may be a linear encoder, for example, without being limited thereto in particular. Note that the position detection sensor 114 is not illustrated in FIG. 1.

Further, the transport controller 40 is connected to an apparatus controller 111 that controls the carriage transfer apparatus 11 via the transport-system serial communication network 41. The apparatus controllers 111 are provided to the plurality of carriage transfer apparatuses 11, respectively. The position detection sensor 14 as a position detection unit described above that detects the position of the moving direction (Y-axis direction) of the linear transport module 12 of the corresponding carriage transfer apparatus 11 is connected to each apparatus controller 111.

Further, the transport controller 40 is connected to a module controller 112 that controls the linear transport module 12 of the carriage transfer apparatus 11 by the transport-system serial communication network 41. The module controllers 112 are provided to the plurality of linear transport modules 12, respectively. A position detection sensor 214 that detects the position in the transport direction (X-axis direction) of the carriage 20 on the corresponding linear transport module 12 is connected to each module controller 112. The position detection sensor 214 as a position detection unit may be a linear encoder, for example, without being limited thereto in particular. Note that the position detection sensor 214 is not illustrated in FIG. 1.

Furthermore, the transport controller 40 is connected to a module controller 113 that controls the maintenance linear transport module 13 by the transport-system serial communication network 41. The module controllers 113 are provided to the plurality of maintenance linear transport modules 13, respectively. A position detection sensor 314 that detects the position in the transport direction (X-axis direction) of the carriage 20 on the corresponding maintenance linear transport module 13 is connected to each module controller 113. The position detection sensor 314 as a position detection unit may be a linear encoder, for example, without being limited thereto in particular. Note that the position detection sensor 314 is not illustrated in FIG. 1.

As discussed above, the transport controller 40 is connected to the module controllers 110, 112, and 113 that are control units that control motion of the carriage 20 on the corresponding transport module. Further, the transport controller 40 is connected to the apparatus controller 111 that is a control unit that controls motion of the linear transport module of the carriage transfer apparatus 11.

The transport controller 40 functions as the control unit that controls the module controllers 110, 112, and 113 and the apparatus controller 111 connected by the transport-system serial communication network 41 as described above. Further, the position detection sensors 14, 114, 214, and 314 are connected to the transport controller 40 by the transport-system serial communication network 41, and an output signal of each sensor is transmitted. These various controllers and sensors are connected to the same communication network, namely, the transport-system serial communication network 41, and thereby latency in the transport system 4 can be reduced.

According to the instruction from the transport controller 40, each of the module controllers 110, 112, and 113 performs control of current conduction of the coils 19 of the corresponding linear transport modules 10, 12, and 13 under the control thereof. Thereby, each of the module controller 110, 112, and 113 functions as a control unit to control motion of the carriage 20 on the corresponding linear transport modules 10, 12, and 13. Further, according to the instruction from the transport controller 40, the apparatus controller 111 functions as a control unit that controls motion of the linear transport module 12 by the carriage transfer apparatus 11. In this way, the transport controller 40 can control each of the module controllers 110, 112, and 113 and the apparatus controller 111 to separately control the plurality of carriages 20 on the transport path 101 with desired drive profiles, respectively.

Further, the carriage fixing mechanism 15 is connected to the input/output control port of the system controller 50. The system controller 50 controls the operation of the carriage fixing mechanism 15 in accordance with transportation of the carriage 20. Note that, in some command system, the carriage fixing mechanism 15 may be connected to the input/output control port of the transport controller 40. In this case, the transport controller 40 controls the operation of the carriage fixing mechanism 15 in accordance with transportation of the carriage 20.

The transport controller 40 controls each linear transport module 10 and the carriage transfer apparatus 11 on the transport path 101 in synchronization. This enables a reduction in the tact time in the processing system 1 in the present embodiment. A specific procedure of a transfer process of the carriage 20 will be described below in a time sequence by using FIG. 5A to FIG. 5E. FIG. 5A to FIG. 5E are schematic diagrams illustrating the procedure of the transfer process of the carriage 20 between the transport path 101 and the carriage transfer apparatus 11 and illustrate in a time sequence the position of the carriage 20 and the linear transport module 12 of the carriage transfer apparatus 11. Note that, in the following, the module controllers 110 illustrated in FIG. 4 provided to the corresponding linear transport modules 10a to 10j illustrated in FIG. 1 are referred to as module controllers 110a to 110j, respectively, if necessary. Further, the apparatus controllers 111 illustrated in FIG. 4 provided to the corresponding carriage transfer apparatus 11a and 11b illustrated in FIG. 1 are referred to as apparatus controllers 111a and 111b, respectively, if necessary. Further, the module controllers 112 illustrated in FIG. 4 provided to the corresponding linear transport modules 12a and 12b illustrated in FIG. 1 are referred to as module controllers 112a and 112b, respectively, if necessary. Further, the module controller 113 illustrated in FIG. 4 provided in association with the maintenance linear transport module 13a illustrated in FIG. 1 is referred to as module controller 113a, if necessary.

Figure 5A:
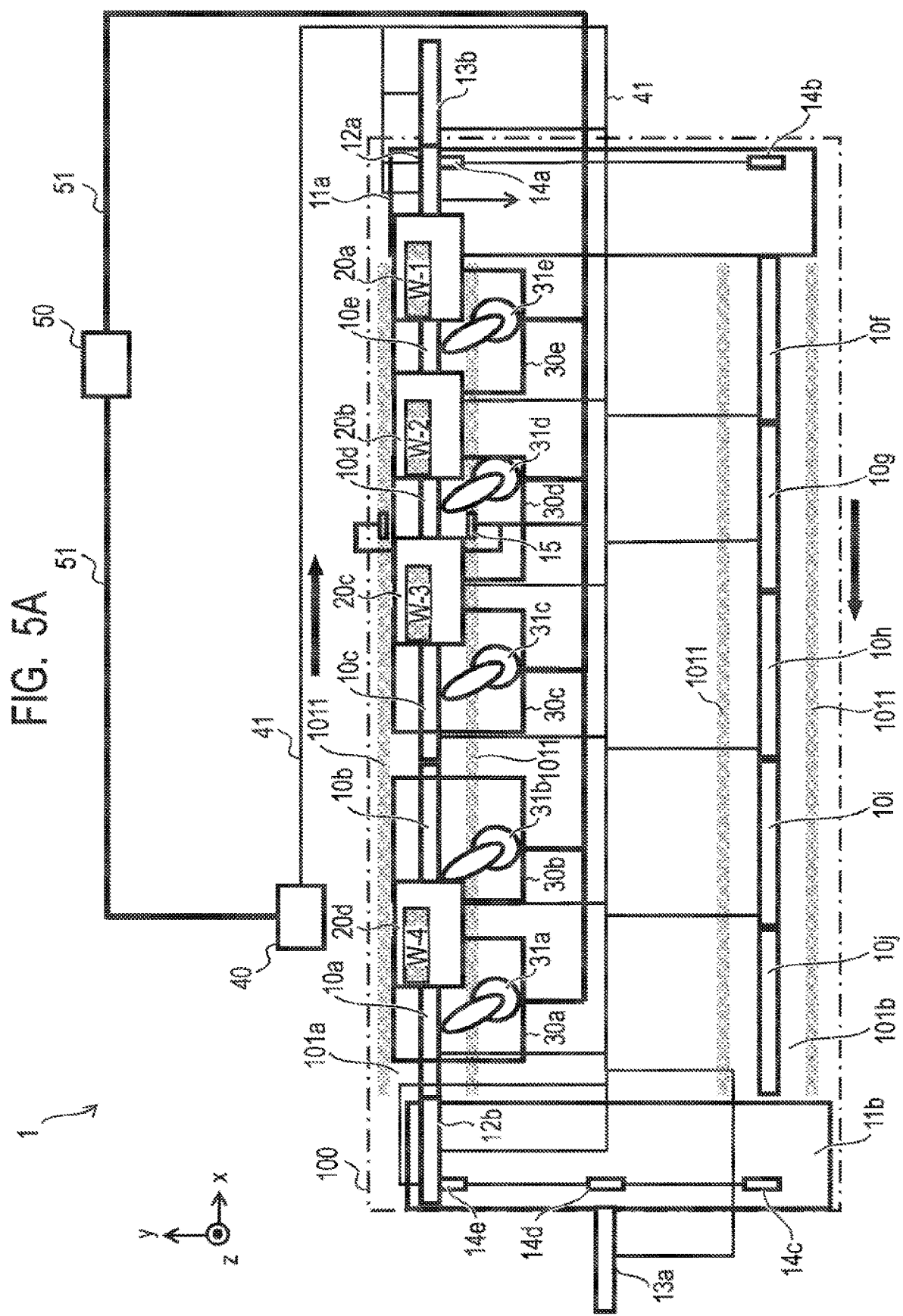
FIG. 5A is a schematic diagram illustrating a procedure of a carriage transfer process in the processing system according to the first embodiment of the present invention.

FIG. 5A illustrates a state where, after the completion of processing of the workpiece W at the processing stations 30a, 30c, 30d, and 30e installed along the forward transport path 101a, each of the carriages 20a, 20b, 20c, and 20d starts moving to the next process. That is, the carriage 20a starts moving after the completion of processing of the workpiece W-1 at the processing station 30e. The carriage 20b starts moving after the completion of processing of the workpiece W-2 at the processing station 30d. The carriage 20c starts moving after the completion of processing of the workpiece W-3 at the processing station 30c. The carriage 20d starts moving after the completion of processing of the workpiece W-4 at the processing station 30a.

First, the transport controller 40 detects from an output signal of the position detection sensor 14a that the linear transport module 12a of the carriage transfer apparatus 11a is in connection with the linear transport module 10e of the transport path 101a. In response, the transport controller 40 transmits, to the module controllers 110e and 112a, an instruction to drive the carriage 20a. The module controller 110e and 112a that have received this instruction to drive the carriage 20a control current conduction of the coils 19 of the linear transport modules 10e and 12a, respectively. Thereby, as illustrated in FIG. 5A, the module controllers 110e and 112a move the carriage 20a from a place on the linear transport module 10e to a place on the linear transport module 12a and then stop the carriage 20a.

Figure 5B:
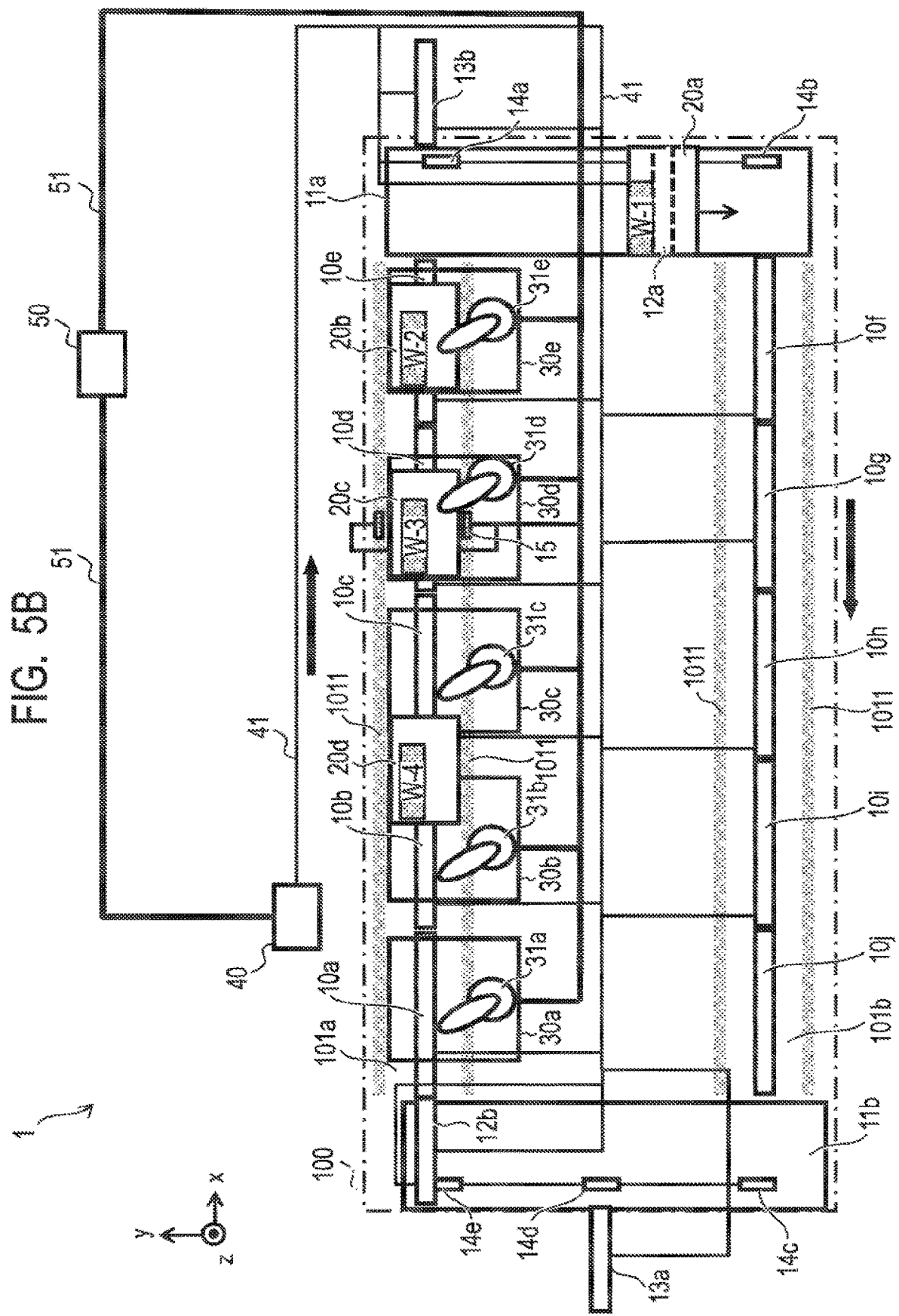
FIG. 5B is a schematic diagram illustrating the procedure of the carriage transfer process in the processing system according to the first embodiment of the present invention.

Next, the transport controller 40 detects from an output signal of the position detection sensor 214 that the carriage 20a has moved on the linear transport module 12a of the carriage transfer apparatus 11a. In response, the transport controller 40 transmits, to the apparatus controller 111a, an instruction to drive the linear transport module 12a in a direction from the transport path 101a side toward the transport path 11b side in the Y-axis direction (−Y-axis direction). The apparatus controller 111a that has received this instruction to drive the linear transport module 12a moves the linear transport module 12a of the carriage transfer apparatus 11a in the −Y-axis direction, as illustrated in FIG. 5B. Thereby, the apparatus controller 111a connects the linear transport module 12a to the linear transport module 10f of the reverse transport path 101b.

Subsequently, the transport controller 40 detects from an output signal of the position detection sensor 14b that the linear transport module 12a of the carriage transfer apparatus 11a is connected to the linear transport module 10f. In response, the transport controller 40 transmits, to the module controller 112a and 110f, an instruction to drive the carriage 20a. The module controllers 112a and 110f that have received this instruction to drive the carriage 20a control current conduction of the coils 19 of the linear transport modules 12a and 10f, respectively. Thereby, as illustrated in FIG. 5C, the module controllers 112a and 110f move the carriage 20a from a place on the linear transport module 12a to a place on the linear transport module 10f.

Figure 5D:
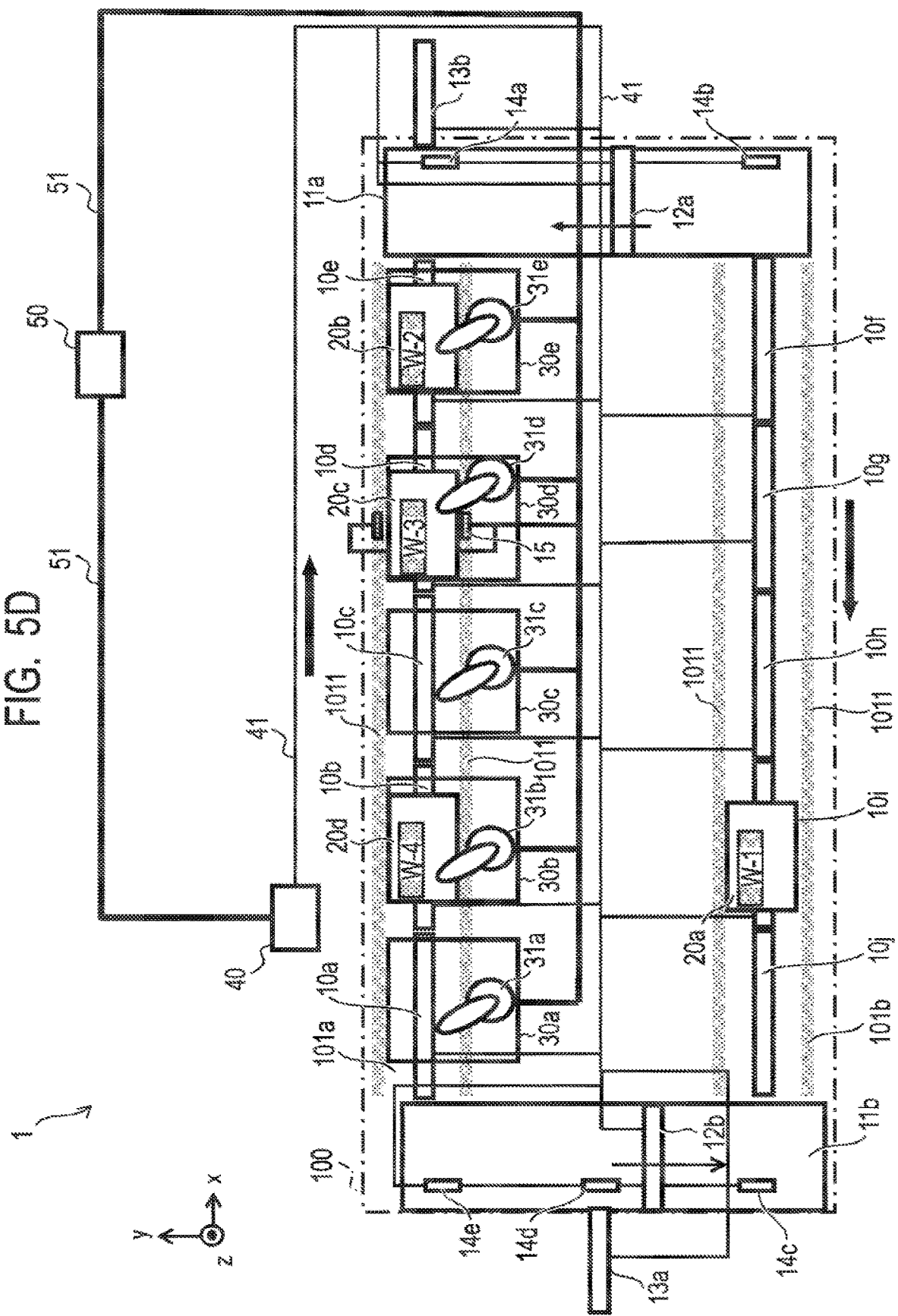
FIG. 5D is a schematic diagram illustrating the procedure of the carriage transfer process in the processing system according to the first embodiment of the present invention.
Figure 5E:
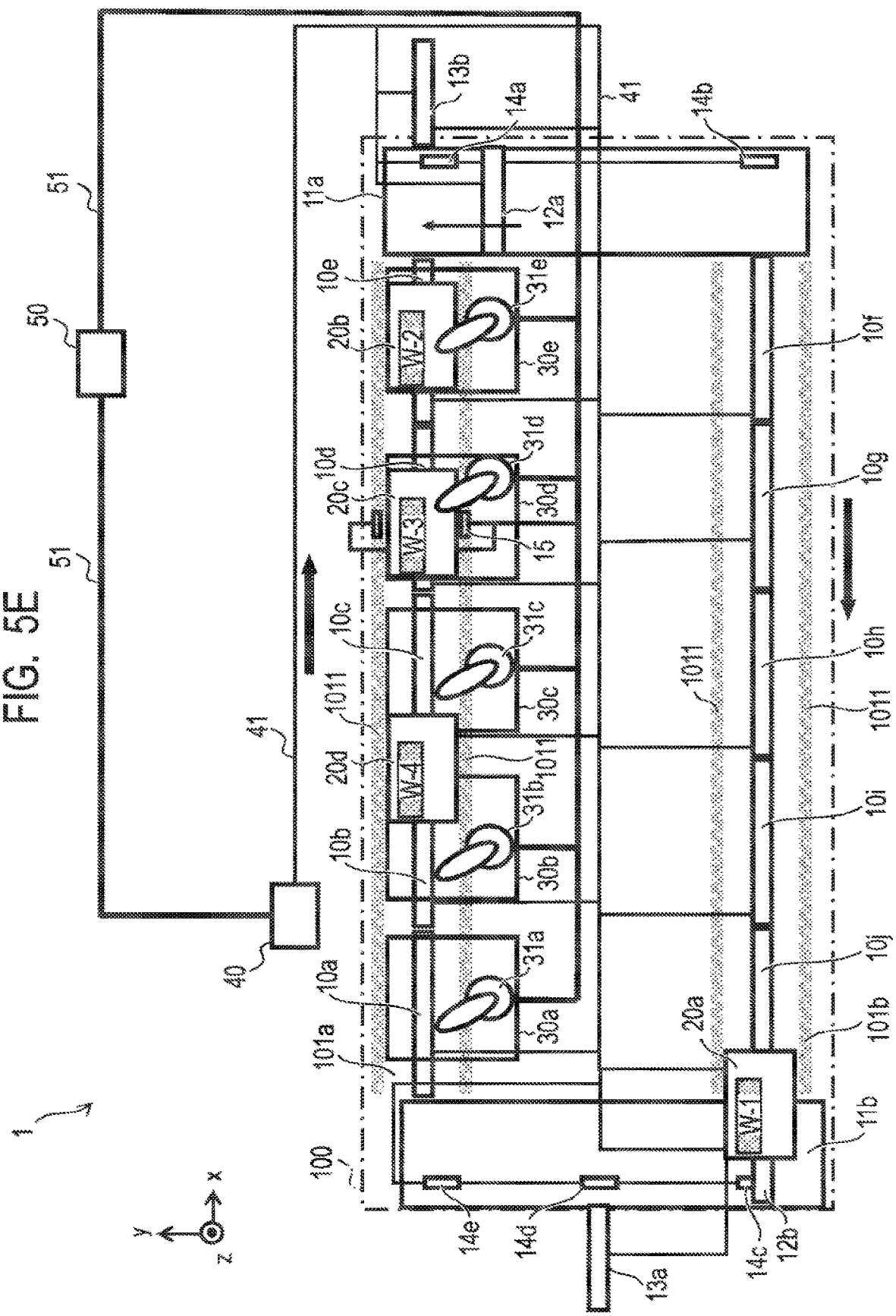
FIG. 5E is a schematic diagram illustrating the procedure of the carriage transfer process in the processing system according to the first embodiment of the present invention.

Note that, after the carriage 20a moves from the place on the linear transport module 12a to the place on linear transport module 10f, the transport controller 40 controls the linear transport module 12a of the carriage transfer apparatus 11a that has output the carriage 20a to return. That is, the transport controller 40 transmits, to the apparatus controller 111a, an instruction to drive the linear transport module 12a in a direction from the transport path 101b side toward the transport path 101a side in the Y-axis direction (+Y-axis direction). The apparatus controller 111a that has received this instruction to drive the linear transport module 12a moves the linear transport module 12a of the carriage transfer apparatus 11a in the +Y-axis direction, as illustrated in FIG. 5D and FIG. 5E. Thereby, the apparatus controller 111a again connects the linear transport module 12a to the linear transport module 10e of the forward transport path 101a.

As described above, the carriage 20a on which the workpiece W-1 that has been subjected to the processing process on the forward transport path 101a is mounted is transferred from the forward transport path 101a to the reverse transport path 101b. Since no processing process is performed on the reverse transport path 101b, the carriage 20a on the linear transport module 10f is collected subsequently. Thus, the transport controller 40 transmits, to the module controllers 110f to 110j and 112b, an instruction to drive the carriage 20a to the linear transport module 12b of the carriage transfer apparatus 11b. The module controllers 110f to 110j and 112b that have received this instruction to drive the carriage 20a control current conduction of the coils 19 of the linear transport modules 10f to 10j and 12b, respectively. Thereby, as illustrated in FIG. 5D, the module controllers 110f to 110j and 112b move the carriage 20a from a place on the linear transport module 10f toward a place on the linear transport module 12b.

At the time when motion of the carriage 20a toward the place on the linear transport module 12b of the carriage transfer apparatus 11b is started as illustrated in FIG. 5C, the linear transport module 12b is stopped at a stop position for connecting to the linear transport module 10a at the upstream end of the forward transport path 101a. That is, at this time, the linear transport module 12b of the carriage transfer apparatus 11b is not in connection with the linear transport module 10j at the downstream end of the reverse transport path 101b. Thus, the transport controller 40 transmits, to the apparatus controller 111b, an instruction to drive the linear transport module 12b in a direction from the transport path 101a side toward the transport path 101b side in the Y-axis direction (−Y-axis direction). The apparatus controller 111b that has received this instruction to drive the linear transport module 12b moves the linear transport module 12b in the −Y-axis direction and connects the linear transport module 12b to the linear transport module 10j of the reverse transport path 101b, as illustrated in FIG. 5D.

Here, the transport controller 40 takes the moving distance and speed of the carriage 20a and moving distance and speed of the linear transport module 12b into consideration and transmits the drive instruction directed to the module controllers 110f to 110j described above and the drive instruction directed to the apparatus controller 111b. That is, the transport controller 40 transmits the instruction to drive the carriage 20a directed to the module controllers 110f to 110j and drives the carriage 20a without having connection of the linear transport module 12b of the carriage transfer apparatus 11b and the linear transport module 10j. In such a way, by moving the carriage 20a without having connection of the linear transport module 12b and the linear transport module 10j, it is possible to reduce the entire process time. Further, the transport controller 40 controls the module controllers 110f to 110j and the apparatus controller 111b so that the linear transport module 12b connects to the linear transport module 10j before the carriage 20a passes by a predetermined position of the transport path 101b.

Next, the transport controller 40 detects from an output signal of the position detection sensor 14c that the linear transport module 12b of the carriage transfer apparatus 11b connects to the linear transport module 10j. In response, the transport controller 40 transmits, to the module controllers 110j and 112b, an instruction to drive the carriage 20a. The module controllers 110j and 112b that have received this instruction to drive the carriage 20a control current conduction of the coils 19 of the linear transport modules 10j and 12b, respectively. Thereby, as illustrated in FIG. 5E, the module controllers 110j and 112b move the carriage 20a from a place on the linear transport module 10j to a place on the linear transport module 12b and stops the carriage 20a. In such a way, the carriage 20a on which the processed workpiece W-1 is mounted is transferred from the forward transport path 101a to the reverse transport path 101b and collected. Note that the carriage 20a can be transferred and supplied to the forward transport path 101a by using the carriage transfer apparatus 11b with a workpiece W being again mounted thereon.

Note that, at the time illustrated in FIG. 5E, the linear transport module 12a of the carriage transfer apparatus 11a is moving in the +Y-axis direction toward the forward transport path 101a side and not in connection with the linear transport module 10e. Thus, the transport controller 40 does not transmit instructions to drive the carriages 20b and 20c. On the other hand, the subsequent carriage 20d is able to move to a stop position in the linear transport module 10c. Thus, the transport controller 40 transmits, to the module controllers 110b and 110c, an instruction to drive the carriage 20d.

Further, motion of the carriage 20 between the maintenance linear transport module 13 and the linear transport module 12 of the carriage transfer apparatus 11 can be performed in the same manner as the motion of the carriage 20 between the linear transport module 10 and the linear transport module 12 described above. The motion of the carriage 20 between the maintenance linear transport module 13a installed adjacently to the carriage transfer apparatus 11b and the linear transport module 12b of the carriage transfer apparatus 11b will be described below as an example.

The carriage 20 can be transferred from a place on the linear transport module 12b of the carriage transfer apparatus 11b to a place on the maintenance linear transport module 13a as illustrated below. Note that the carriage 20 can be moved and stopped on the linear transport module 12b in the same manner as described above, for example.

First, the transport controller 40 detects from an output signal of the position detection sensor 214 that the carriage 20 has moved to a place on the linear transport module 12b of the carriage transfer apparatus 11b. In response, the transport controller 40 transmits, to the apparatus controller 111b, an instruction to drive the linear transport module 12b in the Y-axis direction toward the maintenance linear transport module 13a side. The apparatus controller 111b that has received this instruction to drive the linear transport module 12b moves the linear transport module 12b of the carriage transfer apparatus 11b in the Y-axis direction and connects the linear transport module 12b to the maintenance linear transport module 13a.

Next, the transport controller 40 detects from an output signal of the position detection sensor 14d that the linear transport module 12b of the carriage transfer apparatus 11b has been connected to the maintenance linear transport module 13a. In response, the transport controller 40 transmits, to the module controllers 112b and 113a, an instruction to drive the carriage 20.

The module controllers 112b and 113a that have received this instruction to drive the carriage 20 control current conduction of the coils 19 of the linear transport modules 12b and 13a, respectively. Thereby, the module controllers 112b and 113a move the carriage 20 from a place on the linear transport module 12b to a place on the maintenance linear transport module 13a and then stop the carriage 20.

On the other hand, the carriage 20 can be transferred from a place on the maintenance linear transport module 13a to a place on the linear transport module 12b of the carriage transfer apparatus 11b as described below.

First, the transport controller 40 transmits, to the apparatus controller 111b, an instruction to drive the linear transport module 12b in the Y-axis direction toward the maintenance linear transport module 13a side on which the carriage 20 is stopped. The apparatus controller 111b that has received this instruction to drive the linear transport module 12b moves the linear transport module 12b of the carriage transfer apparatus 11b in the Y-axis direction and connects the linear transport module 12b to the maintenance linear transport module 13a.

Next, the transport controller 40 detects from an output signal of the position detection sensor 14d that the linear transport module 12b of the carrier transfer apparatus 11b is connected to the maintenance linear transport module 13a. In response, the transport controller 40 transmits, to the module controllers 113a and 112b, an instruction to drive the carriage 20. The module controllers 113a and 112b that have received this instruction to drive the carriage 20 control current conduction of the coils 19 of the linear transport modules 13a and 12b, respectively. Thereby, the module controllers 113a and 112b move the carriage 20 from a place on the maintenance linear transport module 13a to a place on the linear transport module 12b and then stop the carriage 20. Then, the carriage 20 on the linear transport module 12b can be transferred and supplied to the forward transport path 101a by the carriage transfer apparatus 11b, for example.

As discussed above, in the processing system 1 according to the present embodiment, the module controllers 110, 112, and 113 of the respective linear transport modules 10, 12, and 13 and the apparatus controller 111 of the carriage transfer apparatus 11 are under the control of the transport controller 40. Therefore, in the present embodiment, all the carriages 20 can be efficiently and safely controlled in accordance with the entire status of the processing system 1.

Further, when the linear transport module 12 of the carriage transfer apparatus 11 and the linear transport module 10 of the transport path 101 are connected to each other, it is necessary to position the linear transport module 12 with high accuracy in the Y-axis direction with respect to the linear transport module 10 as described above. In the present embodiment, the position detection sensor 14 is used to correct a position shift to realize accurate positioning of the linear transport module 12 in the Y-axis direction. In the following, a case where the linear transport module 12b of the carriage transfer apparatus 11b is connected to the linear transport module 10j of the reverse transfer path 101b as illustrated above in FIG. 5D will be described as an example. Note that, for the case of other connection, it is possible to correct a position shift and perform connection in the same manner. Further, also for the case of connecting the maintenance linear transport module 13 to the linear transport module 12, it is possible to correct a position shift and perform connection in the same manner.

The apparatus controller 111b moves the linear transport module 12b in the −Y-axis direction and causes the linear transport module 12b to stop at a target stop position for connection to the linear transport module 10j of the reverse transport path 101b, as described above. A position shift may occur in the Y-axis direction between the stopped linear transport module 12b and the linear transport module 10j.

At this time, the transport controller 40 calculates a position displacement in the Y-axis direction between the stopped linear transport module 12b and the linear transport module 10j based on an output signal from the position detection sensor 14c. Specifically, a position displacement in the Y-axis direction between the guiderail 9 of the linear transport module 12b and the guiderail 9 of the linear transport module 10j is calculated.

Next, the transport controller 40 transmits, to the apparatus controller 111b, a correction drive instruction for performing correction-drive of the linear transport module 12b to correct a position shift. The correction drive instruction is to instruct driving and moving the linear transport module 12b by a correction motion amount corresponding to a position displacement in a direction to cancel the calculated position displacement. In this way, the transport controller 40 corrects the position where the linear transport module 12b connects to the linear transport module 10j so as to reduce a position displacement.

Note that, in the case of an excessively large position displacement, there may be a failure of the carriage transfer apparatus 11b or the like, or even when there is no failure, correction of the position shift may reduce the process efficiency in the processing system 1. Accordingly, when a position displacement exceeds a predetermined threshold, a process of notifying that the threshold is exceeded can be performed, instead of correction of the position shift at the connection position. In this case, the transport controller 40 can be configured to output a notification signal indicating that the position displacement exceeds a predetermined threshold and transmit the notification signal to the system controller 50 via the whole-system serial communication network 51. The system controller 50 that has received the notification signal can temporarily suspend the processing system 1 or perform an alert process such as alert display or the like to the operator.

The apparatus controller 111b that has received the correction drive instruction described above moves the linear transport module 12b of the carriage transfer apparatus 11b by a correction motion amount in a direction to cancel the position displacement. In this way, the apparatus controller 111b corrects a position shift and connects the linear transport module 12b to the linear transport module 10j. In such a way, in the present embodiment, when connecting the linear transport module 12b of the carriage transfer apparatus 11b to the linear transport module 10j, it is possible to position the linear transport module 12b with high accuracy in the Y-axis direction with respect to the linear transport module 10j. Further, in the present embodiment, the module controllers 110, 112, and 113, the apparatus controller 111, and the position detection sensor 14 are connected to the transport controller 40 by the transport-system serial communication network 41 that is a single communication network as described above. Thus, in the present embodiment, it is possible to correct a position shift at a high speed and transfer the carriage 20 at a high speed.

In the present embodiment, the transport controller 40 can sense a position displacement of the connection part of the linear transport module 12 of the carriage transfer apparatus 11 as a position variation of the linear transport module 12 itself and control it as position correction of the carriage transfer apparatus 11. Further, in the present embodiment, an alert may be generated when it is recognized that a position displacement is above a predetermined value.

As discussed above, in the present embodiment, damage on the transport path 101 or the carriage 20 when the carriage 20 is transferred can be reduced, and the carriage 20 can be transferred at a high speed.

Note that the above-described position displacement between the linear transport module 12 of the carriage transfer apparatus 11 and the linear transport module 10 of the transport path 101 may vary due to time degradation or the like. Specifically, the position displacement may increase with time. The same applies to the position displacement between the linear transport module 12 of the carriage transfer apparatus 11 and the maintenance linear transport module 13. In this case, the transport controller 40 may monitor an output signal of the position detection sensor 14 in the carriage transfer apparatus 11. This enables the transport controller 40 to perform correction driving on the linear transport module 12 by suitably calculating a correction drive amount of the linear transport module 12 of the carriage transfer apparatus 11 in accordance with a position displacement that varies due to time degradation or the like. Therefore, in this case, it is possible to position the linear transport module 12 of the carriage transfer apparatus 11 with respect to the linear transport modules 10 and 13 always at high positioning accuracy in accordance with a varying position displacement.

Second Embodiment

A second embodiment of the present invention will be described by using FIG. 6A to FIG. 7. Note that the same components as those in the first embodiment described above are labeled with the same reference numerals, and the description thereof will be omitted or simplified.

Figure 6A:
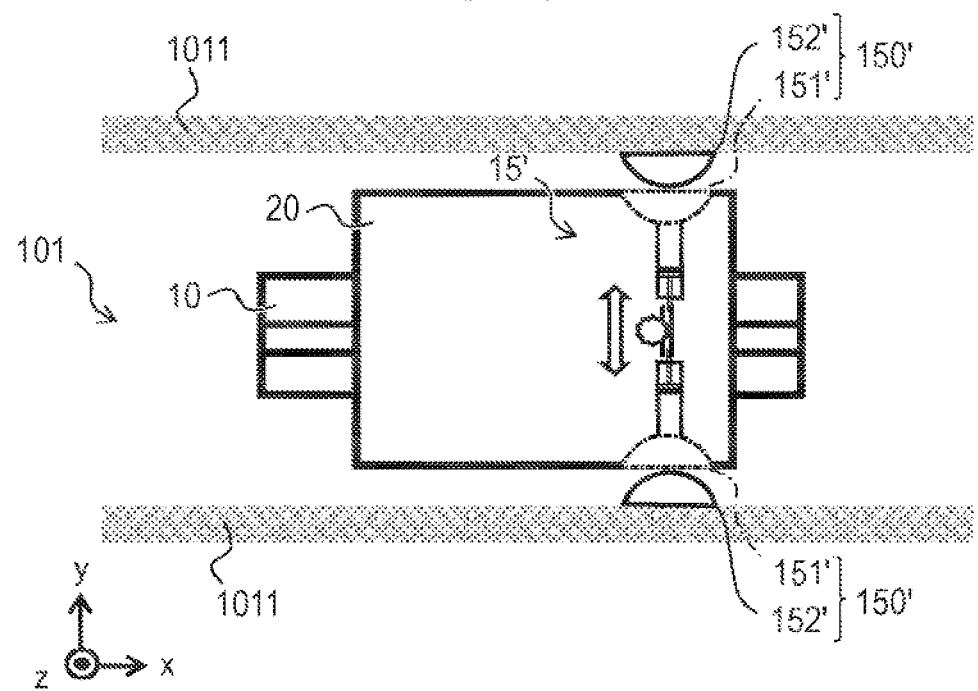
FIG. 6A is a schematic diagram illustrating a configuration of a carriage fixing mechanism according to a second embodiment of the present invention.
Figure 6B:
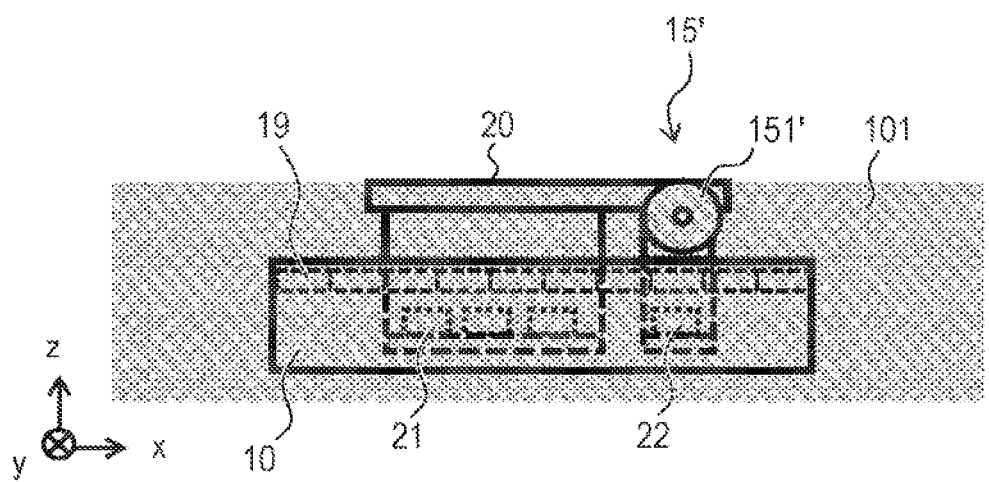
FIG. 6B is a schematic diagram illustrating a configuration of the carriage fixing mechanism according to the second embodiment of the present invention.
Figure 7:
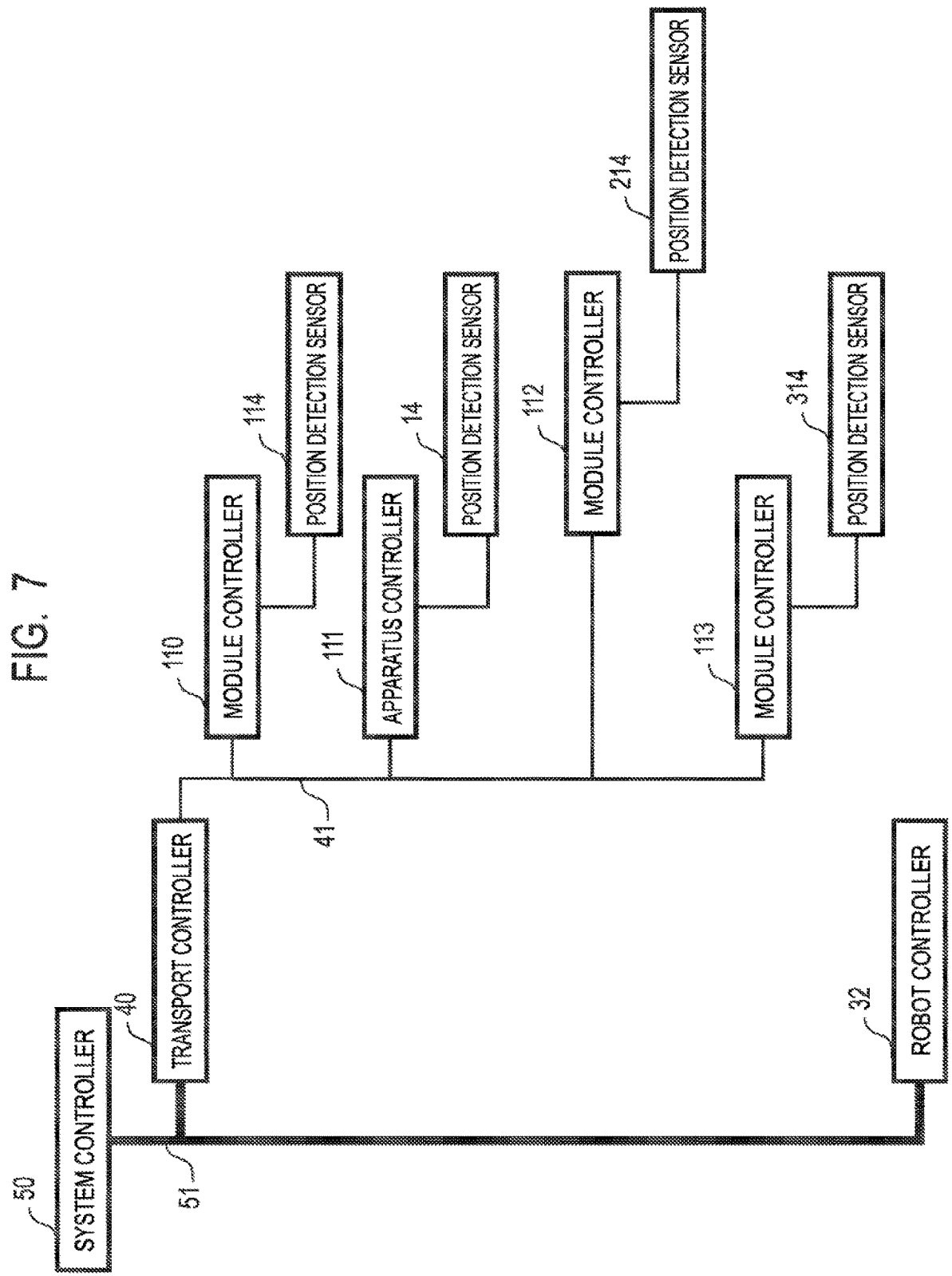
FIG. 7 is a control block diagram illustrating a control configuration of a processing system according to the second embodiment of the present invention.

FIG. 6A and FIG. 6B are schematic diagrams illustrating a configuration of carriage fixing mechanism 15' according to the present embodiment, which are a top view, when viewed from the top, and a side view, when viewed from the side, of the carriage fixing mechanism 15' according to the present embodiment and the carriage 20 fixed thereby, respectively. FIG. 7 is a control block diagram illustrating a control configuration of a processing system according to the present embodiment.

While the carriage fixing mechanism 15' according to the present embodiment is to fix the carriage 20 to the transport path 101 at a predetermined stop position on the transport path 101 in the same manner as the carriage fixing mechanism 15 according to the first embodiment, the installation location thereof is different from that in the first embodiment. That is, the difference between the present embodiment and the first embodiment is that, while the carriage fixing mechanism 15 according to the first embodiment is installed on the transport path 101, the carriage fixing mechanism 15' according to the present embodiment is installed on the carriage 20.

As illustrated in FIG. 6A and FIG. 6B, the carriage fixing mechanism 15' according to the present embodiment has a pair of fixing units 150' installed on the carriage 20. Each of the fixing units 150' has a fixing pad 151' and a fixing actuator 152'. The fixing pad 151' is configured to be able to be pressed against the fence 1011 of the transport path 101 outward in the Y-axis direction of the carriage 20 to support itself. The fixing actuator 152' is an actuator that drives the fixing pad 151' in the Y-axis direction. In addition to the permanent magnets 21 for causing the carriage 20 to travel, permanent magnets 22 installed to the carriage 20 are connected to the fixing actuator 152'. Each permanent magnet 22 is a permanent magnet that functions as a force receiving unit for driving the fixing actuator 152' by electromagnetic force generated between the permanent magnet 22 and the coils 19 of the linear transport module 10. Note that, instead of the permanent magnet 22, a ferromagnetic material such as an iron core can be used as the force receiving unit.

The electromagnetic force generated between the permanent magnets 22 for receiving force and the coils 19 drives the fixing actuator 152' as drive force via conversion from rotational motion into linear motion by a transmission mechanism such as a rack and pinion, for example. Note that the fixing actuator 152' is driven under the instruction from the module controller 110.

The carriage fixing mechanism 15' installed on the carriage 20 drives and causes the fixing actuators 152' of a pair of fixing units 150' to extend outward in the Y-axis direction of the carriage 20. This causes the carriage fixing mechanism 15' to support the pair of fixing pads 151' against the fences 1101 on both sides of the transport path 101 to fix the carriage 20 at that place.

In the first embodiment, since the carriage fixing mechanism 15 is installed on the transport path 101, the position at which the carriage 20 is fixed by the carriage fixing mechanism 15 is determined in the design of the transport path 101. In contrast, in the present embodiment, the carriage fixing mechanism 15' is installed on the carriage 20, and the position at which the carriage 20 is fixed by the carriage fixing mechanism 15' can be changed by a change in the current conduction control of the coils 19 of the linear transport module 10. Therefore, in the present embodiment, a position at which the carriage 20 is fixed by the carriage fixing mechanism 15' can be set with great flexibility or can be changed. When multiple types of products are produced in the same processing system, a place where processing is performed or external force that is applied to the workpiece is often different according to the type of product to be produced. In this regard, in the present embodiment, with only change of software control, it is possible to change the position at which the carriage 20 is fixed by the carriage fixing mechanism 15'. Therefore, the present embodiment has an advantage of being able to reduce suspended time of the processing system required for changing the arrangement.

As discussed above, in the present embodiment, the carriage fixing mechanism 15' is installed on the carriage 20, which can ensure flexibility in determination of the fixing position of the carriage 20. According to the present embodiment, even when correction of a fixing position of the carriage 20 is needed, this can be addressed by only software change of a carriage stop instruction and a carriage fixing instruction, and no hardware change is necessary. Therefore, in the present embodiment, the number of correction steps for correcting the fixing position of the carriage 20 can be reduced.

Further, in the present embodiment, the fixing actuators 152' of the carriage fixing mechanism 15' are driven by current conduction control of the coils 19 of the linear transport module 10, as described above. Thus, unlike the control configuration of the first embodiment illustrated in FIG. 4, the carriage fixing mechanism 15' is not connected to the input/output control port of the system controller 50 in the present embodiment as illustrated in FIG. 7.

The control of the carriage fixing mechanism 15' according to the present embodiment is performed as described below. First, information on the processing station 30 where the carriage 20 needs to be fixed is notified to the transport controller 40 from the system controller 50. The transport controller 40 transmits control information on the coils 19 for fixing the carriage 20 to the module controller 110 of the linear transport module 10 to which the carriage 20 has to be fixed. The module controller 110 controls current conduction of the coils 19 according to the received control information and drives the carriage fixing mechanism 15' to fix the carriage 20.

Note that the carriage fixing mechanism 15' according to the present embodiment can be used together with the carriage fixing mechanism 15 according to the first embodiment. With a use of both the mechanisms together, a position shift of the carriage 20 at a stop position can be avoided even in a process in which greater external force is applied.

Third Embodiment

A third embodiment of the present invention will be described by using FIG. 8 and FIG. 9. Note that the same components as those in the first and second embodiments described above are labeled with the same reference numerals, and the description thereof will be omitted or simplified.

Figure 8:
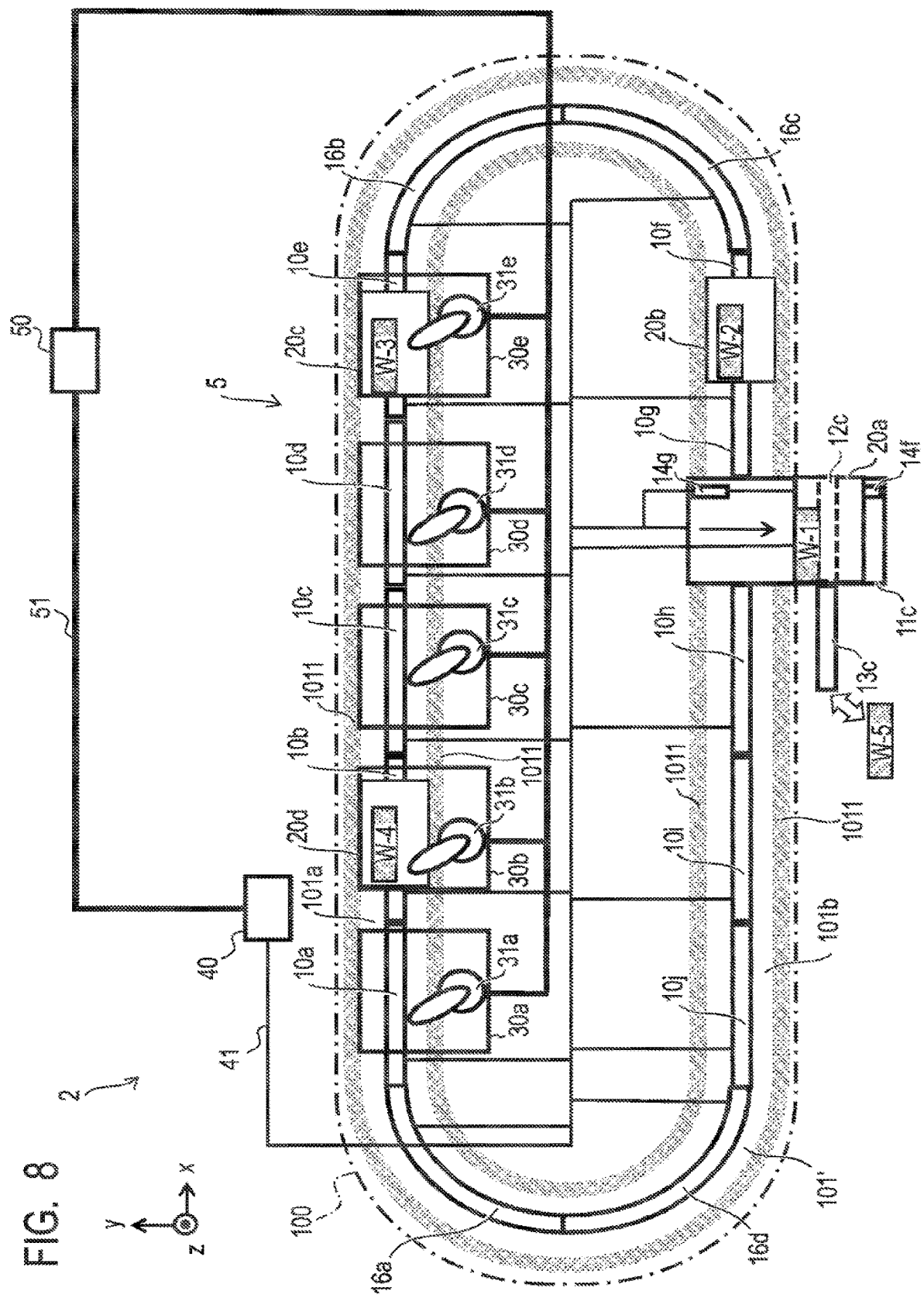
FIG. 8 is a schematic diagram illustrating the entire configuration of a processing system according to a third embodiment of the present invention.

FIG. 8 is a schematic diagram illustrating the entire configuration of a processing system 2 according to the present embodiment, which is a top view of the entire processing system 2 including a transport system 5 when viewed from the top.

In the first and second embodiments, a ring-shaped transport path is formed of the two transport paths 101a and 101b and the two carriage transfer apparatuses 11a and 11b connected to the both ends of the transport paths 101a and 101b. In contrast, in the present embodiment, curved transport modules 16 are used instead of the carriage transfer apparatuses 11 to form a closed looped, more specifically, an oval (elliptical) circulating transport path 101'. The present embodiment is different from the first and second embodiments in this feature.

As illustrated in FIG. 8, in the transport system 5 according to the present embodiment, curved transport modules 16b and 16c are installed instead of the carriage transfer apparatus 11a. The curved transport modules 16b and 16c are adjacent to each other to form a half-arc-shaped transport path. The end of the curved transport module 16b is connected to the end of the linear transport module 10e of the forward transport path 101a. The end of the curved transport module 16c is connected to the end of the linear transport module 10f of the reverse transport path 101b.

Further, in the transport system 5 according to the present embodiment, curved transport modules 16d and 16a are installed instead of the carriage transfer apparatus 11b. The curved transport modules 16d and 16a are adjacent to each other to form a half-arc-shaped transport path. The end of the curved transport module 16d is connected to the end of the linear transport module 10j of the reverse transport path 101b. The end of the curved transport module 16a is connected to the end of the linear transport module 10a of the forward transport path 101a.

Each curved transport module 16 is a curved transport module on which the carriage 20 moves on a curve, specifically, an arc. The curved transport module 16 has substantially the same configuration as the linear transport module 10 except that it has a curved guiderail 9 instead of the linear guiderail 9. In each curved transport module 16, likewise the linear transport module 10, current conduction of the coils 19 is controlled by the module controller 116 (see FIG. 9), and motion of the carriage 20 thereon is controlled.

As discussed above, in the transport system 5 according to the present embodiment, a closed-looped, that is, the closed transport path 101' having no end of the forward path and the reverse path is formed. Thus, in the present embodiment, drive control of the carriage 20 can be performed without requiring to check a connection state between the linear transport modules 10 and 12 according to the first embodiment. Therefore, the processing system 2 according to the present embodiment enables the carriage 20 to travel faster and safer than in the processing system 1 according to the first embodiment.

Specifically, in the first embodiment, for example, as illustrated in FIG. 5E, the linear transport module 10e and the linear transport module 12a of the carriage transfer apparatus 11a may not be connected to each other even though the process at the processing station 30e is finished. In this case, in order to move the carriage 20b on which the process on the processing station 30e is finished, it is necessary to stand by for establishment of connection between the linear transport modules 10e and 12a. In contrast, in the present embodiment, since it is not necessary to stand by for establishment of connection between the linear transport modules 10 and 12 as above, waste time in which the carriage 20 is in standby state can be eliminated.

On the other hand, in the transport system 5 according to the present embodiment, there is no end in the closed transport path 101'. Thus, in the transport system 5 according to the present embodiment, in order to enable connection between the maintenance linear transport module 13 and the transport path 101', a part of the linear transport module 10 of the transport path 101' is replaced with the linear transport module 12 of the carriage transfer apparatus 11.

Specifically, in the present embodiment, the carriage transfer apparatus 11c is installed so as to be arranged over the boundary of the processing operation area 100 with respect to the reverse transport path 101b, as illustrated in FIG. 8. The maintenance linear transport module 13c is installed so as to be adjacent to one side of the carriage transfer apparatus 11c outside the processing operation area 100.

The carriage transfer apparatus 11c has the movable linear transport module 12c that can move in the Y-axis direction in the same manner as the carriage transfer apparatuses 11a and 11b according to the first embodiment. The linear transport module 12c is formed to be able to function as a part of the linear transport module 10 of the reverse transport path 101b.

The linear transport module 12c of the carriage transfer apparatus 11e is configured to be able to move to a position for connecting to the linear transport modules 10g and 10h of the reverse transport path 101b. This allows the linear transport module 12c to form a part of the reverse transport path 101b. Further, the linear transport module 12c is configured to be able to move to a position for connecting to the maintenance linear transport module 13c. This enables the carriage 20 to transfer between the linear transport module 12c and the maintenance linear transport module 13c.

The maintenance linear transport module 13c is installed outside the processing operation area 100 including the transport path 101' in the same manner as the maintenance linear transport modules 13a and 13b according to the first embodiment. Thus, also with the maintenance linear transport module 13c, supply of the workpiece W to the carriage 20, collection of the carriage 20, or maintenance of the carriage 20 can be performed without suspension of a process operation in the same manner as with the maintenance linear transport modules 13a and 13b.

As discussed above, in the present embodiment, the maintenance linear transport module 3c can be connected to the closed transport path 101' without suspension of an operation process. Therefore, according to the present embodiment, even with the closed transport path 101', a particular carriage 20 can be accessed efficiently in a short time, and collection, supply, maintenance, or the like of the carriage 20 can be performed without suspension of other carriages 20.

Figure 9:
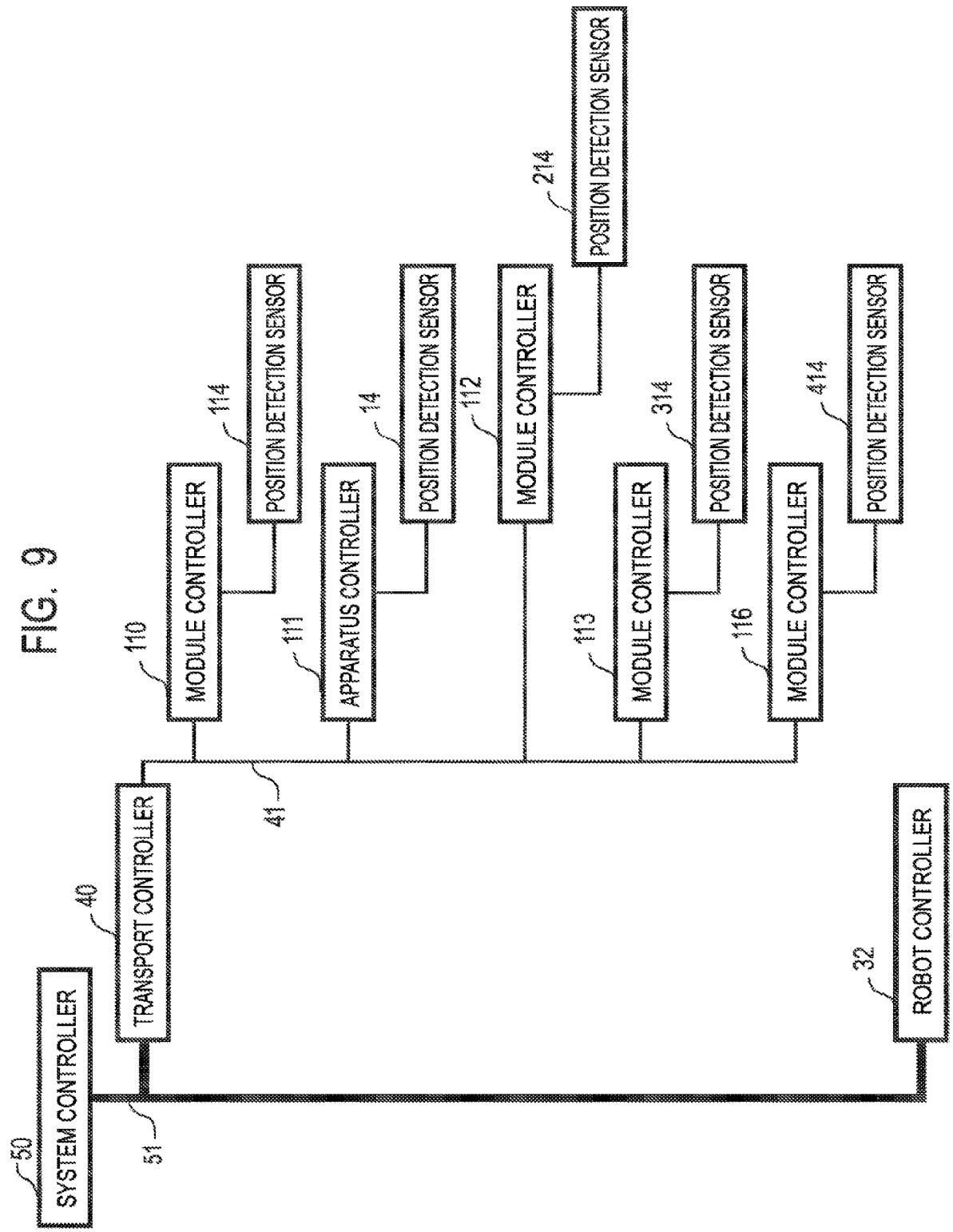
FIG. 9 is a control block diagram illustrating a control configuration of the processing system according to the third embodiment of the present invention.

FIG. 9 is a control block diagram illustrating a control configuration of the processing system 2 according to the present embodiment. Note that the control configuration illustrated in FIG. 9 is for a case of using the carriage fixing mechanism 15' installed on the carriage 20 likewise the control configuration of the second embodiment illustrated in FIG. 4. Also in the present embodiment, likewise the first embodiment, the carriage 20 can be fixed by using the carriage fixing mechanism 15 installed on the transport path 101' instead of or in addition to the carriage fixing mechanism 15'.

The present embodiment is different from the first embodiment in that, as illustrated in FIG. 9, a module controller 116 that controls a curved transport module 16 is connected to the transport controller 40 by the transport-system serial communication network 41. Each module controller 116 is provided to each of a plurality of curved transport modules 16. A position detection sensor 414 that detects the position in the transport direction of the carriage 20 on the corresponding curved transport module 16 is connected to each of the module controllers 116. The position detection sensor 414 as a position detection unit is not limited in particular but may be a linear encoder, for example. Note that the position detection sensor 414 is not illustrated in FIG. 8.

The module controller 116 controls current conduction of the coils 19 of the corresponding curved transport module 16 under the control thereof in accordance with an instruction from the transport controller 40. Thereby, the module controller 116 controls the motion of the carriage 20 on the corresponding curved transport module 16.

Further, the apparatus controller 111 is provided to the carriage transfer apparatus 11c in the same manner as the carriage transfer apparatuses 11a and 11b according to the first embodiment. Further, the module controller 112 is provided to the linear transport module 12c of the carriage transfer apparatus 11c in the same manner as the linear transport modules 12a and 12b according to the first embodiment. Further, the module controller 113 is provided to the maintenance linear transport module 13c in the same manner as the maintenance linear transport modules 13a and 13b according to the first embodiment.

Further, as the position detection sensor 14, a position detection sensor 14f that detects the position in the Y-axis direction of the linear transport module 12c connected to the maintenance linear transport module 13c is provided to the carriage transfer apparatus 11c. Further, as the position detection sensor 14, a position detection sensor 14g that detects the position in the Y-axis direction of the linear transport modules 12c respectively connected to the linear transport modules 10g and 10h of the reverse transport path 101b is provided to the carriage transfer apparatus 11c.

Motion of the carriage 20 between the maintenance linear transport module 13c and the linear transport module 12c of the carriage transfer apparatus 11c can be performed in the same manner as in the first embodiment. That is, this motion of the carriage 20 can be performed in the same manner as the motion of the carriage 20 between the maintenance linear transport module 13a and the linear transport module 12b of the carriage transfer apparatus 11b in the first embodiment.

Further, also in the present embodiment, likewise the first embodiment, it is possible to position the linear transport module 12c of the carriage transfer apparatus 11e accurately in the Y-axis direction with respect to the maintenance linear transport module 13c by position shift correction using the position detection sensor 14f. Further, likewise the first embodiment, it is possible to position the linear transport module 12c accurately in the Y-axis direction with respect to the linear transport modules 10g and 10h of the transport path 101b by position shift correction using the position detection sensor 14g.

Fourth Embodiment

A fourth embodiment of the present invention will be described by using FIG. 10. Note that the same components as those in the first to third embodiments described above are labeled with the same reference numerals, and the description thereof will be omitted or simplified.

Figure 10:
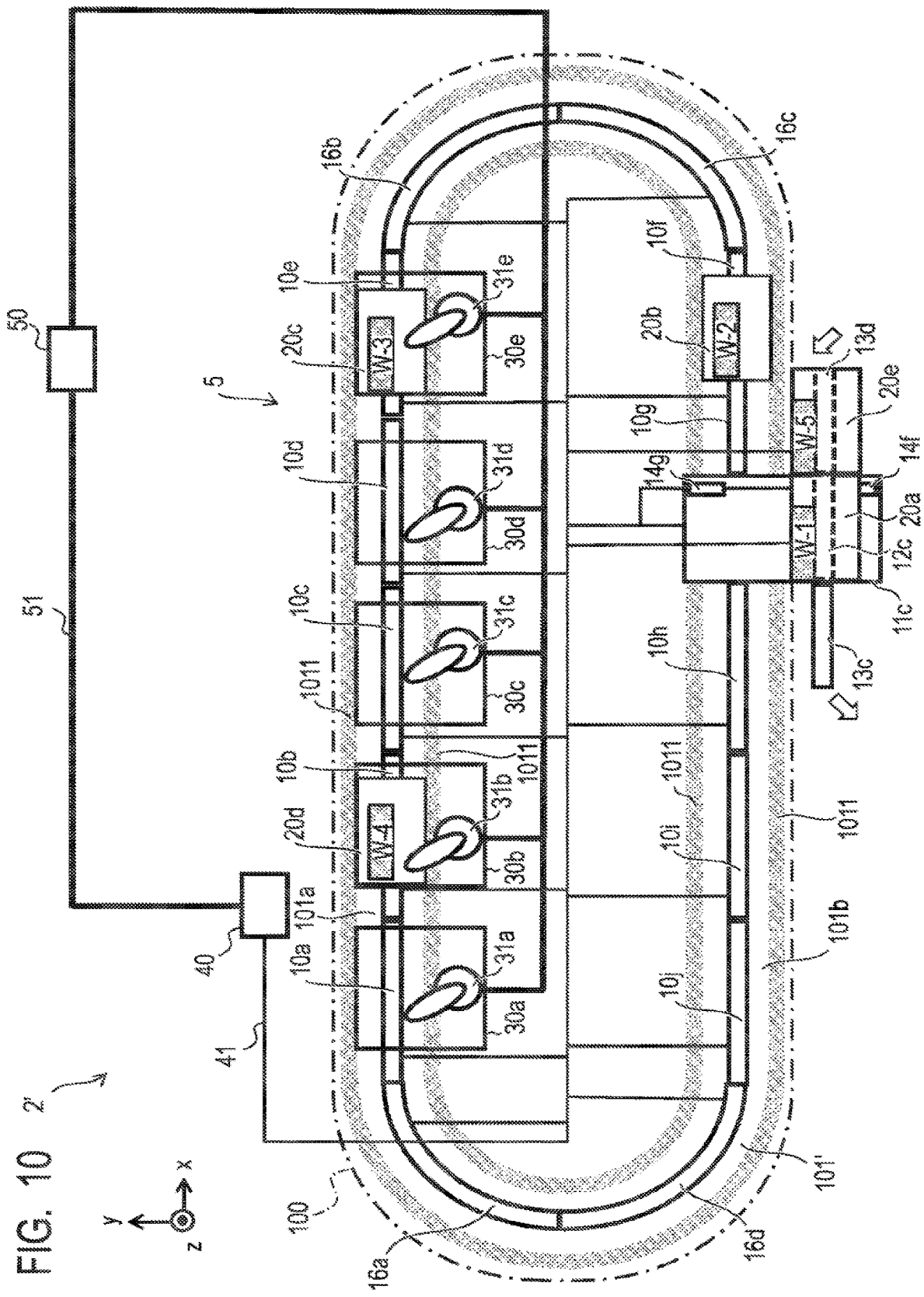
FIG. 10 is a schematic diagram illustrating the entire configuration of a processing system according to a fourth embodiment of the present invention.

FIG. 10 is a schematic diagram illustrating the entire configuration of a processing system 2' according to the present embodiment, which is a top view of the entire processing system 2' including a transport system 5 when viewed from the top. Note that, also in the present embodiment, the same control configuration as the control configuration illustrated in FIG. 9 can be employed.

The basic configuration of the processing system 2' according to the present embodiment is the same as the configuration of the processing system 2 according to the third embodiment. The processing system 2' according to the present embodiment is different from the processing system 2 according to the third embodiment is that, in the connection position to the maintenance linear transport module 13c, the linear transport module 12c of the carriage transfer apparatus 11c can also connect to another maintenance linear transport module 13d. That is, in the transport system 5 according to the present embodiment, the maintenance linear transport modules 13c and 13d are able to connect to both the ends of the linear transport module 12c.

In the transport system 5 according to the present embodiment, as illustrated in FIG. 10, the other maintenance linear transport module 13d is installed outside the processing operation area 100. Another maintenance linear transport module 13d is installed so as to be adjacent to the other side of the carriage transfer apparatus 11c that is opposite to the side where the maintenance linear transport module 13c is installed. The module controller 113 is provided to the maintenance linear transport module 13d in the same manner as the maintenance linear transport module 13c.

The linear transport module 12c of the carriage transfer apparatus 11c is configured such that, at a stop position where one end of linear transport module 12c is connected to the maintenance linear transport module 13c, the other end can be connected to the other maintenance linear transport module 13d. That is, in the present embodiment, the linear transport module 12c is configured to be able to connect to the maintenance linear transport modules 13c and 13d at both the ends thereof at the same stop position. This enables the carriage 20 to transfer between the linear transport module 12c and either the maintenance linear transport module 13c or 13d.

As discussed above, in the transport system 5 according to the present embodiment, the linear transport module 12c of the carriage transfer apparatus 11c can connect to both the two maintenance linear transport modules 13c and 13d at the same time at a single stop position. Thereby, in the present embodiment, the motion of the carriage 20 described below is possible. In the present embodiment, since the linear transport module 12c of the carriage transfer apparatus 11c connects to both of the two maintenance linear transport modules 13c and 13d at the same time, this enables operation in a shorter time without needing manual operation.

For example, a carriage 20e on which a workpiece W-5 to be processed is mounted is prepared on the maintenance linear transport module 13d in advance. On the other hand, the carriage 20a on which the processed workpiece W-1 is mounted is collected to the maintenance linear transport module 13c. At this timing of collection of the carriage 20a, the carriage 20e on which the workpiece W-5 is mounted is moved to the linear transport module 12c of the carriage transfer apparatus 11c. The carriage 20e moved to the linear transport module 12c is supplied to the transport path 101' by the carriage transfer apparatus 11c. The carriage 20e supplied to the transport path 101' is moved to the reverse transport path 101a, and the workpiece W-5 is processed. In such a way, in the present embodiment, since the workpiece W to be processed can be supplied at a timing when the processed workpiece W is collected, the workpiece W can be collected and supplied efficiently in a shorter time.

Fifth Embodiment

A fifth embodiment of the present invention will be described by using FIG. 11. Note that the same components as those in the first to fourth embodiments described above are labeled with the same reference numerals, and the description thereof will be omitted or simplified.

Figure 11:
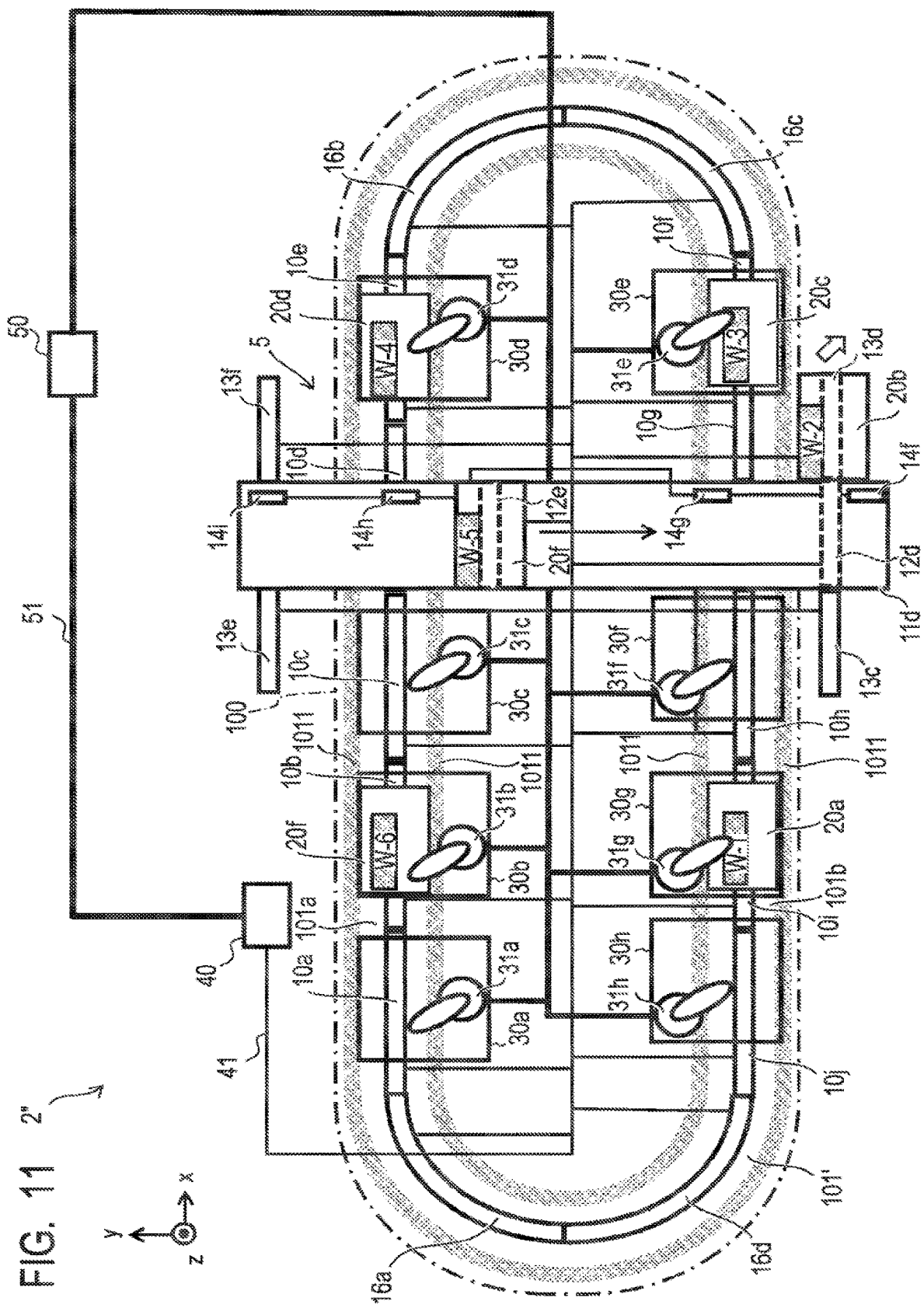
FIG. 11 is a schematic diagram illustrating the entire configuration of a processing system according to a fifth embodiment of the present invention.

FIG. 11 is a schematic diagram illustrating the entire configuration of a processing system 2" according to the present embodiment, which is a top view of the entire processing system 2" including a transport system 5 when viewed from the top. Note that, also in the present embodiment, the same control configuration as the control configuration illustrated in FIG. 9 can be employed.

The basic configuration of the processing system 2" according to the present embodiment is the same as the configuration of the processing systems 2 and 2' according to the third and fourth embodiments. The present embodiment is different from the third and fourth embodiments in that the carriage transfer apparatus 11d intersects with the transport path at two points and that the carriage transfer apparatus 11d has two linear transport modules 12d and 12e.

In the transport system 5 according to the present embodiment, as illustrated in FIG. 11, the carriage transfer apparatus 11d is installed so as to intersect with the forward and reverse transport paths 101a and 101b and be arranged over the boundary of the processing operation area 100 on respective sides of the transport paths 101a and 110b.

Further, in the present embodiment, the processing stations 30a to 30d are installed along the forward transport path 101a, and the processing stations 30e to 30h are installed along the reverse transport path 101b. The carriage transfer apparatus 11d intersects with the transport path 101a between the processing stations 30c and 30d. Further, the carriage transfer apparatus 11d intersects with the transport path 101b between the processing stations 30e and 30f.

The maintenance linear transport modules 13c and 13d are installed so as to be adjacent to the both sides of the carriage transfer apparatus 11d outside the processing operation area 100 on the transport path 110b side in the same manner as in the fourth embodiment. The maintenance linear transport modules 13e and 13f are installed so as to be adjacent to the both sides of the carriage transfer apparatus 11d outside the processing operation area 100 on the transport path 101a side in the same manner as the maintenance linear transport modules 13c and 13d.

The carriage transfer apparatus 11d has movable linear transport modules 12d and 12e that can move in the Y-axis direction. The carriage transfer apparatus 11d drives the linear transport modules 12d and 12e in the Y-axis direction by using single-axis actuators (not illustrated) separated from each other. The linear transport module 12d is configured to be able to function as a part of the linear transport module 10 of the reverse transport path 101b and configured to be able to function as a part of the linear transport module 10 of the forward transport path 101a. The linear transport module 12e is configured to be able to function as a part of the linear transport module 10 of the forward transport path 101a and configured to be able to function as a part of the linear transport module 10 of the reverse transport path 101b.

One linear transport module 12d of the carriage transfer apparatus 11d is configured to be able to move to a position for connecting to the linear transport modules 10g and 10h of the reverse transport path 101b. This allows the linear transport module 12d to form a part of the reverse transport path 101b. Further, the linear transport module 12d is configured to be able to move to a position for connecting to the linear transport modules 10c and 10d of the forward transport path 101a. This allows the linear transport module 12d to forma part of the forward transport path 101a. Further, the linear transport module 12d is configured to be able to move to a position for connecting to the maintenance linear transport modules 13c and 13d. This enables the carriage 20 to transfer between the linear transport module 12d and either the maintenance linear transport module 13c or 13d. Note that the stop position where the linear transport module 12d connects to the maintenance linear transport modules 13c and 13d is an evacuation position of the linear transport module 12d when another linear transport module 12e forms a part of the reverse transport path 101b.

The other linear transport module 12e of the carriage transfer apparatus 11d is configured to be able to move to a position for connecting to the linear transport modules 10c and 10d of the forward transport path 101a. This allows the linear transport module 12e to form a part of the forward transport path 101a. Further, the linear transport module 12e is configured to be able to move to a position for connecting to the linear transport modules 10g and 10h of the reverse transport path 101b. This allows the linear transport module 12e to form a part of the reverse transport path 101b. Further, the linear transport module 12e is configured to be able to move to a position for connecting to the maintenance linear transport modules 13e and 13f. This enables the carriage 20 to transfer between the linear transport module 12e and either the maintenance linear transport module 13e or 13f. Note that the stop position where the linear transport module 12e connects to the maintenance linear transport modules 13e and 13f is an evacuation position of the linear transport module 12e when another linear transport module 12d forms a part of the forward transport path 101a.

The apparatus controller 111 is provided to the carriage transfer apparatus 11d in the same manner as the carriage transfer apparatuses 11a and 11b according to the first embodiment. Further, the module controller 112 is provided to the linear transport modules 12d and 12e of the carriage transfer apparatus 11d in the same manner as the linear transport modules 12a and 12b according to the first embodiment. Further, the module controller 113 is provided to the maintenance linear transport modules 13c, 13d, 13e, and 13f, respectively, in the same manner as the maintenance linear transport modules 13a and 13b according to the first embodiment.

Further, as the position detection sensor 14, a position detection sensor 14f that detects the position in the Y-axis direction of the linear transport module 12d connected to the maintenance linear transport modules 13c and 13d is provided to the carriage transfer apparatus 11d. Further, as the position detection sensor 14, a position detection sensor 14g that detects the position in the Y-axis direction of the linear transport modules 12d respectively connected to the maintenance linear transport modules 10g and 10h of the reverse transport path 101b is provided to the carriage transfer apparatus 11d.

Further, as the position detection sensor 14, a position detection sensor 14h that detects the position in the Y-axis direction of the linear transport modules 12e respectively connected to the linear transport modules 10c and 10d of the forward transport path 101a is provided to the carriage transfer apparatus 11d. Further, as the position detection sensor 14, a position detection sensor 14i that detects the position in the Y-axis direction of the linear transport module 12e connected to the maintenance linear transport modules 13e and 13f is provided to the carriage transfer apparatus 11d.

Motion of the carriage 20 between the linear transport module 12d of the carriage transfer apparatus 11d and the maintenance linear transport modules 13c and 13d can be performed in the same manner as in the first embodiment. Motion of the carriage 20 between the linear transport module 12e of the carriage transfer apparatus 11d and the maintenance linear transport modules 13e and 13f can be performed in the same manner as in the first embodiment. That is, the motion of the carriage 20 can be performed in the same manner as the motion of the carriage 20 between the maintenance linear transport module 13a and the linear transport module 12b of the carriage transfer apparatus 11b in the first embodiment.

Further, also in the present embodiment, the linear transport modules 12d and 12e of the carriage transfer apparatus 11d can be accurately positioned in the same manner as in the first embodiment.

That is, in the same manner as in the first embodiment, one linear transport module 12d can be positioned accurately in the Y-axis direction with respect to the maintenance linear transport modules 13c and 13d by position shift correction using the position detection sensor 14f. Further, in the same manner as in the first embodiment, one linear transport module 12d can be positioned accurately in the Y-axis direction with respect to the linear transport modules 10g and 10h of the transport path 101b by position shift correction using the position detection sensor 14g. Furthermore, in the same manner as in the first embodiment, one linear transport module 12d can be positioned accurately in the Y-axis direction with respect to the linear transport modules 10c and 10d of the transport path 101a by position shift correction using the position detection sensor 14h.

Further, in the same manner as in the first embodiment, the other linear transport module 12c can be positioned accurately in the Y-axis direction with respect to the linear transport modules 10c and 10d of the transport path 101a by position shift correction using the position detection sensor 14h. Further, in the same manner as in the first embodiment, the other linear transport module 12e can be positioned accurately in the Y-axis direction with respect to the maintenance linear transport modules 13e and 13f by position shift correction using the position detection sensor 14i. Furthermore, in the same manner as in the first embodiment, the other linear transport module 12e can be positioned accurately in the Y-axis direction with respect to the linear transport modules 10g and 10h of the transport path 101b by position shift correction using the position detection sensor 14g.

In the processing system 2" according to the present embodiment, the carriage transfer apparatus 11d is located between the processing stations 30. This enables the processing system 2" according to the present embodiment to change the order of processing performed by the processing stations 30 or omit processing performed by some of the processing stations 30.

For example, when the processing processes by the processing stations 30d and 30e are not necessarily required for all the workpieces W, the carriage 20 on the transport path 101a is moved to the linear transport module 12e of the carriage transfer apparatus 11d after the completion of the process by the processing station 30c. Next, the linear transport module 12e is moved in the Y-axis direction toward the transport path 101b, and the linear transport module 12e is connected to the linear transport modules 10g and 10h of the transport path 101b at a position that can be detected by the position detection sensor 14g. Next, the carriage 20 on the linear transport module 12e is moved to the linear transport module 10h and sent to the processing station 30f. In this way, the processing processes by the processing stations 30d and 30e can be omitted.

In contrast, for example, the processing processes by the processing stations 30d and 30e can be continuously repeated for multiple times. In this case, after the completion of the processing process by the processing station 30e, the carriage 20 on the transport path 101b is moved to the linear transport module 12d of the carriage transfer apparatus 11d. Next, the linear transport module 12d is moved in the Y-axis direction toward the transport path 101a, and the linear transport module 12d is connected to the linear transport modules 10c and 10d of the transport path 101a at a position that can be detected by the position detection sensor 14h. Next, the carriage 20 on the linear transport module 12d is moved to the linear transport module 10d and again sent to the processing station 30d. In this way, the processing processes by the processing stations 30d and 30e can be repeated.

Furthermore, for example, the order of processing process performed by the processing stations 30e and 30d can be changed. In this case, after the completion of the processing process by the processing station 30c, the carriage 20 on the transport path 101a is moved to the linear transport module 12e of the carriage transfer apparatus 11d. Next, the linear transport module 12e is moved in the Y-axis direction toward the transport path 101b, and the linear transport module 12e is connected to the linear transport modules 10g and 10h of the transport path 101b at a position that can be detected by the position detection sensor 14g. Next, the carriage 20 on the linear transport module 12e is moved to the linear transport module 10g and sent to the processing station 30e. After the completion of the processing process by the processing station 30e, the carriage 20 is sent to the processing station 30d through the curved transport modules 16c and 16b. After the completion of the processing process by the processing station 30d, the carriage 20 on the transport path 101a is again moved to the linear transport module 12e of the carriage transfer apparatus 11d. Next, the linear transport module 12e is moved in the Y-axis direction toward the transport path 101b, and the linear transport module 12e is again connected to the linear transport modules 10g and 10h of the transport path 101b. Next, the carriage 20 on the linear transport module 12e is moved to the linear transport module 10h in turn and sent to the processing station 30C.

In short, in the present embodiment, it is possible to selectively connect a part between the processing stations 30c, 30d, 30e, and 30f via the carriage transfer apparatus 11d to move the carriage 20 on the connected part between them.

Further, in the present embodiment, the evacuation positions of the linear transport modules 12d and 12e of the carriage transfer apparatus 11d are provided outside the processing operation area 100, respectively. These evacuation positions serve as a connection position between the linear transport module 12d and the maintenance linear transport modules 13c and 13d and a connection position between the linear transport module 12e and the maintenance linear transport modules 13e and 13f. In the present embodiment, the evacuation position also serves as the connection position in such a way, and thereby the space of the installation place of the processing system 2″ can be reduced.

Sixth Embodiment

A sixth embodiment of the present invention will be described by using FIG. 12 and FIG. 13. Note that the same components as those in the first to fifth embodiments described above are labeled with the same reference numerals, and the description thereof will be omitted or simplified.

Figure 12:
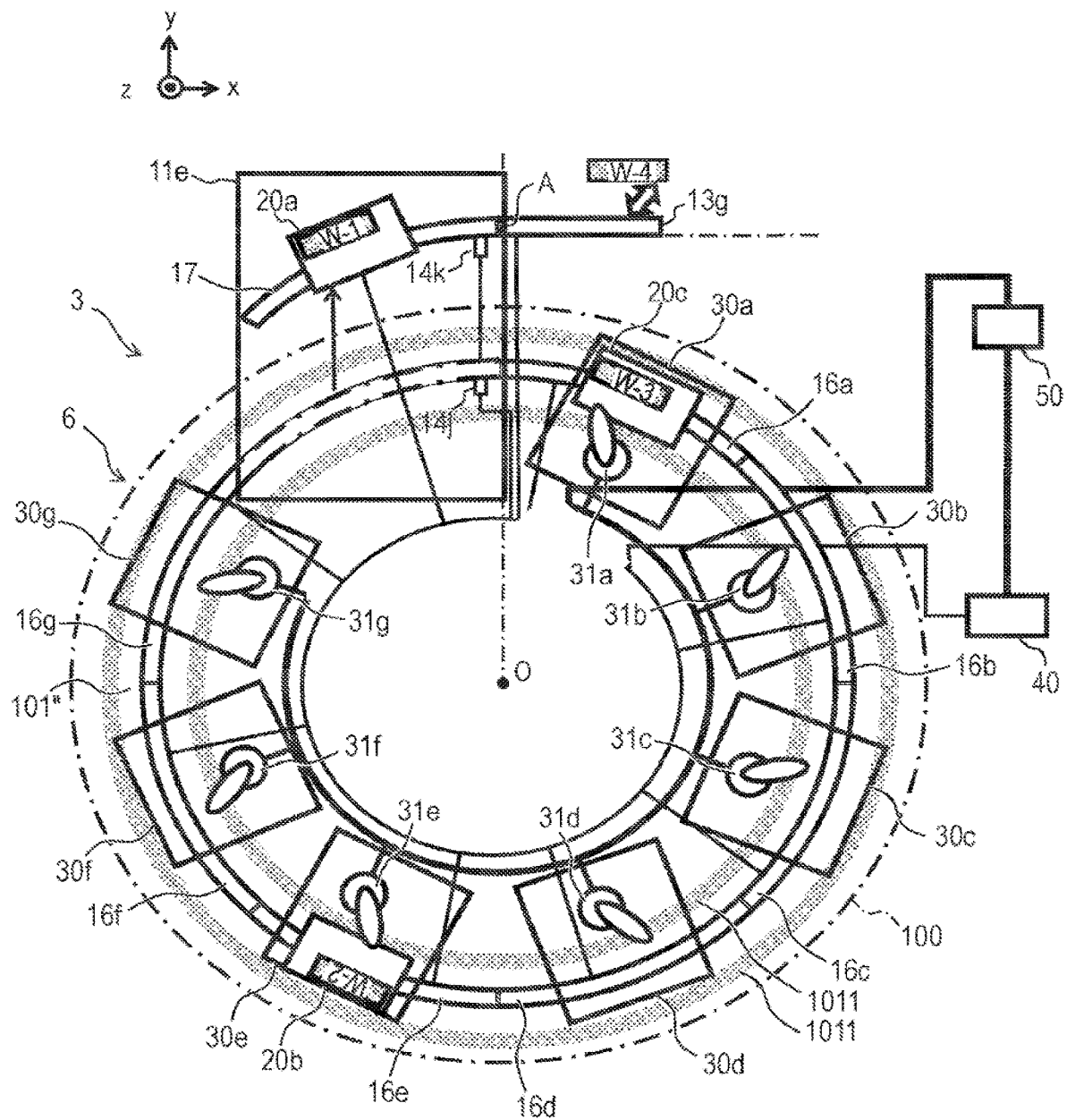
FIG. 12 is a schematic diagram illustrating the entire configuration of a processing system according to a sixth embodiment of the present invention.

FIG. 12 is a schematic diagram illustrating the entire configuration of a processing system 3 according to the present embodiment, which is a top view of the entire processing system 3 including a transport system 6 when viewed from the top. FIG. 13 is a control block diagram illustrating a control configuration of the processing system 3 according to the present embodiment.

In the transport system 6 included in the processing system 3 according to the present embodiment, a ring-shaped circulating transport path 101″ is configured in which a plurality of curved transport modules 16 having the same curvature as each other are connected. In the oval circulating transport path 101' according to the third to fifth embodiments, two types of transport modules, namely, the linear transport module 10 and the curve transport module 16 are connected. In contrast, in the ring-shaped circulating transport path 101″ according to the present embodiment, only one type of transport modules, namely, the curved transport modules 16 and 17 having the same curvature as each other are connected. Note that the curved transport module 17 of the plurality of curve transport modules 16 and 17 corresponds to the curved transport module 17 of the carriage transfer apparatus 11e.

Specifically, as illustrated in FIG. 12, the ring-shaped transport path 101″ is configured such that the curved transport modules 16a to 16g and 17 having the same curvature as each other are connected in a ring shape. In the present embodiment, since the curvature of the transport path 101″ is even, variation in the strength and the direction of external force applied to the carriage 20 traveling on the transport path 101″ can be suppressed to maintain the strength and the direction of the external force to be constant. Therefore, according to the present embodiment, influence of a position shift due to external force on the carriage 20 traveling on the transport path 101″ and the workpiece W mounted on the carriage 20 can be suppressed.

In the present embodiment, the processing stations 30a to 30g are installed along the ring-shaped transport path 101″. Further, the carriage transfer apparatus 11e is installed on the ring-shaped transport path 101″ so as to be arranged over the boundary of the processing operation area 100. The maintenance linear transport module 13g is installed outside the processing operation area 100 so as to be adjacent to one side of the carriage transfer apparatus 11e.

The carriage transfer apparatus 11e has a movable curved transport module 17 that can move. The carriage transfer apparatus 11e drives the curved transport module 17 in an OA direction described later by using a single-axis actuator (not illustrated). The curved transport module 17 has the same configuration as the curved transport module 16 of the transport path 101″ and has the same curvature as the curved transport module 16. In the curved transport module 17, likewise the curved transport module 16, current conduction of the coils 19 thereof is controlled by a module controller 117 (see FIG. 13), and motion of the carriage 20 thereon is controlled.

The curved transport module 17 of the carriage transfer apparatus 11e is configured to be able to function as a part of the curved transport module 16 of the transport path 101". That is, the curved transport module 17 is configured to be able to move to a position for connecting to the curved transport modules 16a and 16g of the transport path 101", This enables the curved transport module 17 to form a part of the transport path 101".

The carriage transfer apparatus 11e drives the curved transport module 17 in the OA direction that is a direction in which an end face A of the curved transport module 17 is connected to the center O of the transport path 101". In contrast, the maintenance linear transport module 13g is installed along a direction parallel to a tangential line of the ring-shaped transport path 101" that is a direction orthogonal to the OA direction. Note that, in FIG. 12, the OA direction is in the Y-axis direction, and the maintenance linear transport module 13g is installed in parallel to the X-axis direction that is a direction orthogonal to the OA direction.

Further, the curved transport module 17 of the carriage transfer apparatus 11e is configured to be able to move to a position for connecting to the maintenance linear transport module 13g installed adjacently to the carriage transfer apparatus 11e as described above. This enables the carriage 20 to transfer between the curved transport module 17 and the maintenance linear transport module 13g.

As described above, the maintenance linear transport module 13g is installed along the direction orthogonal to the OA direction. Thus, when the curved transport module 17 is connected to the maintenance linear transport module 13g, the carriage 20 travels on the connection part of both the transport modules 17 and 13g in the tangential line direction of the curved transport module 17. Therefore, in the present embodiment, it is possible to suppress external force applied to the carriage 20 when the transfer thereof between the transport modules 17 and 13g.

Figure 13:
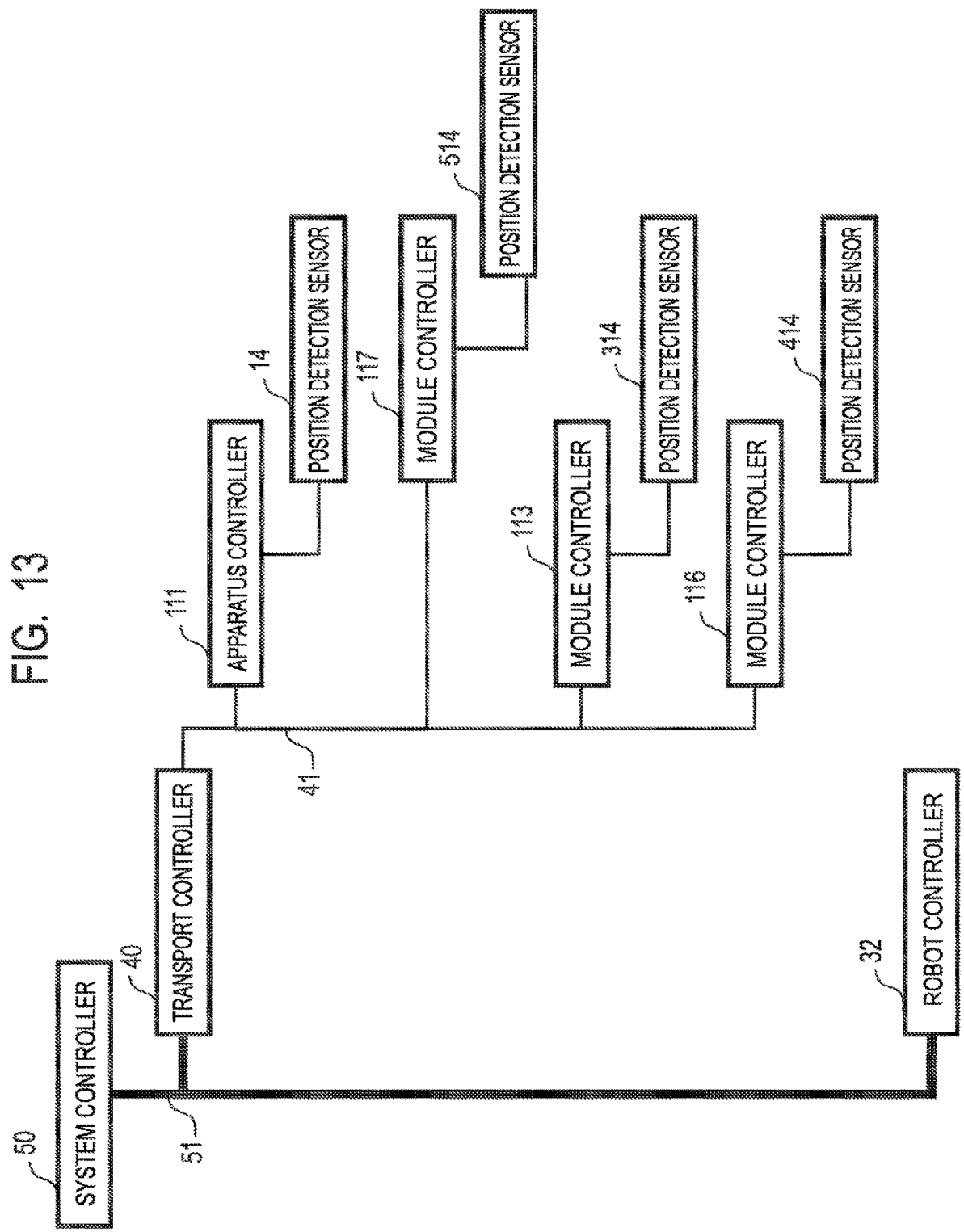
FIG. 13 is a control block diagram illustrating a control configuration of the processing system according to the sixth embodiment of the present invention.

FIG. 13 is a control block diagram illustrating a control configuration of the processing system 3 according to the present embodiment. Note that the control configuration illustrated in FIG. 13 is for a case of using the carriage fixing mechanism 15' installed on the carriage 20 in the same manner as the control configuration of the second embodiment illustrated in FIG. 4. Also in the present embodiment, the carriage 20 can be fixed by using the carriage fixing mechanism 15 installed on the transport path 101" instead of or in addition to the carriage fixing mechanism 15' in the same manner as the first embodiment.

In the present embodiment, since the linear transport module 10 is not used on the transport path 101", the module controller 110 that controls the linear transport module 10 is not provided as illustrated in FIG. 13.

Further, the apparatus controller 111 is provided to the carriage transfer apparatus 11e in the same manner as the carriage transfer apparatuses 11a and 11b according to the first embodiment.

A module controller 117 that controls the curved transport module 17 of the carriage transfer apparatus 11e is connected to the transport controller 40 by the transport-system serial communication network 41. A position detection sensor 514 that detects the position in the transport direction of the carriage 20 on the curved transport module 17 is connected to the module controller 117. The position detection sensor 514 as a position detection unit may be a linear encoder, for example, without being limited thereto in particular. Note that the position detection sensor 514 is not illustrated in FIG. 12.

The module controller 117 controls current conduction of the coils 19 of the curved transport module 17 in accordance with an instruction from the transport controller 40. Thereby, the module controller 117 controls the position of the carriage 20 on the curved transport module 17.

Further, as the position detection sensor 14, a position detection sensor 14j that detects the position in the OA direction of the curved transport module 17 connected to the curved transport module 16a of the transport path 101" is provided to the carriage transfer apparatus 11e. Further, as the position detection sensor 14, a position detection sensor 14k that detects the position in the OA direction of the curved transport module 17 connected to the maintenance linear transport module 13g is provided to the carriage transfer apparatus 11e.

The module controller 113 is provided to the maintenance linear transport module 13g in the same manner as the maintenance linear transport modules 13a and 13b according to the first embodiment.

Motion of the carriage 20 between the maintenance linear transport module 13g and the curved transport module 17 of the carriage transfer apparatus 11e can be performed in the same manner as in the first embodiment. That is, the motion of the carriage 20 can be performed in the same manner as the motion of the carriage 20 between the maintenance linear transport module 13a and the linear transport module 12b of the carriage transfer apparatus 11b in the first embodiment.

Further, also in the present embodiment, the curved transport module 17 of the carriage transfer apparatus 11e can be positioned accurately in the OA direction with respect to the maintenance linear transport module 13g by position shift correction using the position detection sensor 14k in the same manner as in the first embodiment. Further, the curved transport module 17 can be positioned accurately in the OA direction with respect to the curved transport module 16 of the transport path 101" by position shift correction using the position detection sensor 14j in the same manner as in the first embodiment.

Note that, while the case where the carriage transfer apparatus 11e and the maintenance linear transport module 13g are installed on the ring-shaped transport path 101" has been described in the present embodiment, the embodiment is not limited thereto. For example, the carriage transfer apparatus 11e and the maintenance linear transport module 13g can be installed also to the curved part of the oval transport path 101' according to the third embodiment in the same manner as in the present embodiment.

Seventh Embodiment

A seventh embodiment of the present invention will be described by using FIG. 14 and FIG. 15. Note that the same components as those in the first to sixth embodiments described above are labeled with the same reference numerals, and the description thereof will be omitted or simplified.

Figure 14:
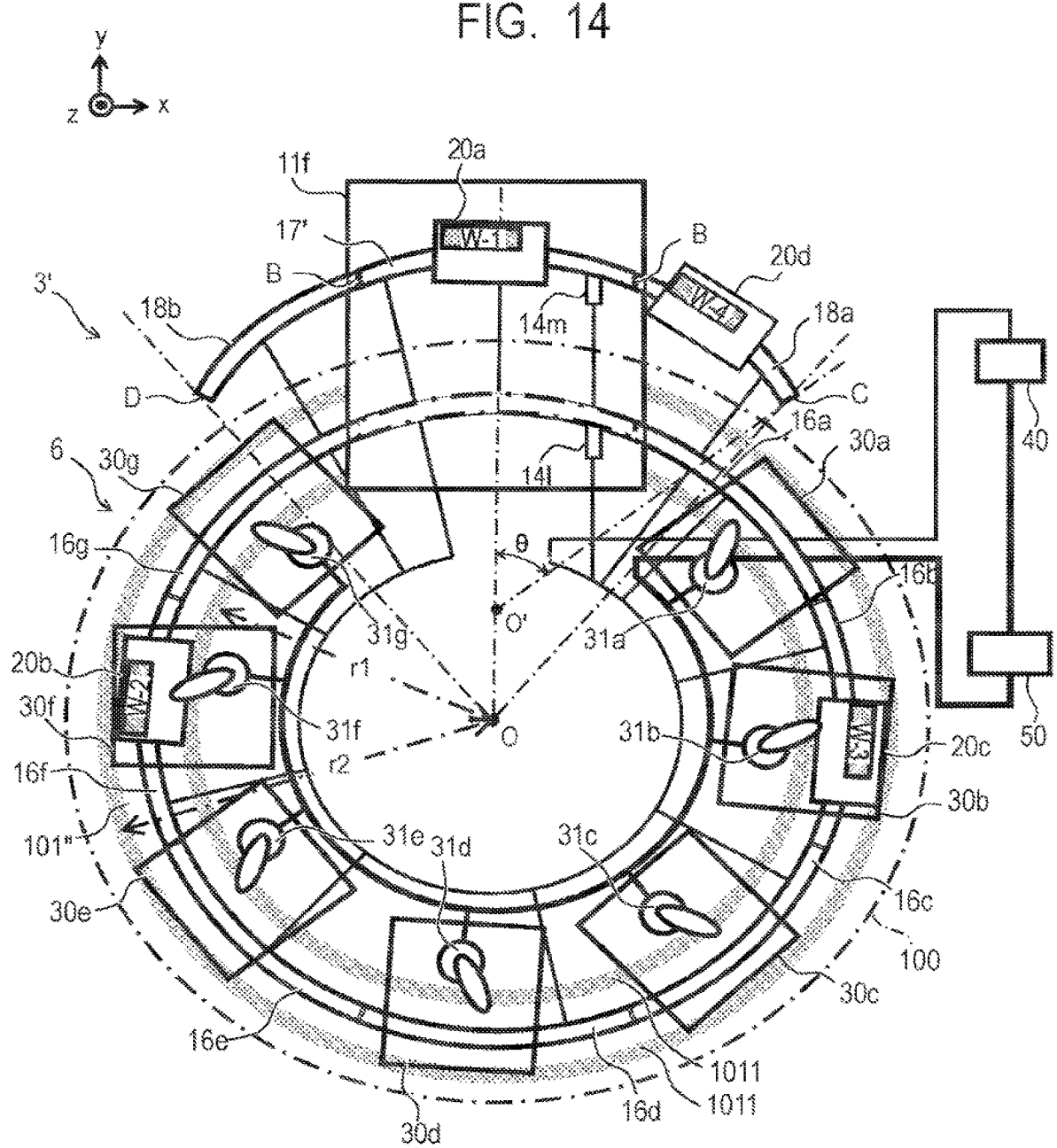
FIG. 14 is a schematic diagram illustrating the entire configuration of a processing system according to a seventh embodiment of the present invention.

FIG. 14 is a schematic diagram illustrating the entire configuration of a processing system 3' according to the present embodiment, which is a top view of the entire processing system 3' including a transport system 6 when viewed from the top. FIG. 15 is a control block diagram illustrating a control configuration of the processing system 3' according to the present embodiment.

The basic configuration of the processing system 3' according to the present embodiment is the same as the configuration of the processing system 3 according to the sixth embodiment. The processing system 3' according to the present embodiment is different from the processing system 3 according to the sixth embodiment in the shapes of the end face of a curved transport module 17' of the carriage transfer apparatus 11f and the maintenance transport module.

In the present embodiment, as illustrated in FIG. 14, the carriage transfer apparatus 11f is installed to the ring-shaped transport path 101" so as to be arranged over the boundary of the processing operation area 100. The maintenance curved transport modules 18a and 18b are installed so as to be adjacent to both sides of the carriage transfer apparatus 11f outside the processing operation area 100. Note that not both the maintenance curved transport modules 18a and 18b may be installed, and any one of the maintenance curved transport modules 18a and 18b may be installed.

The carriage transfer apparatus 11f has the movable curved transport module 17' that can move. The carriage transfer apparatus 11f drives the curved transport module 17' in a moving direction that is a predetermined radius direction of the ring-shaped transport path 101" by using a single-axis actuator (not illustrated). The curved transport module 17' has the same configuration as the curved transport module 16 forming the transport path 101" and has the same curvature as the curved transport module 16. In the curved transport module 17', current conduction of the coils 19 thereof is controlled by the module controller 117 (see FIG. 15) in the same manner as in the curved transport module 16, and motion of the carriage 20 thereon is controlled.

The curved transport module 17' of the carriage transfer apparatus 11f is configured to be able to function as a part of the curved transport module 16 forming the transport path 101". That is, the curved transport module 17' is configured to be able to move to a position for connecting to the curved transport modules 16a and 16g of the transport path 101".

In the present embodiment, both end faces B of the curved transport module 17' of the carriage transfer apparatus 11f are parallel to the moving direction of the curved transport module 17' driven by the carriage transfer apparatus 11f. On the other hand, end faces of the curved transport modules 16a and 16g of the transport path 101" that connect to the curved transport module 17' are also parallel to the moving direction of the curved transport module 17', respectively. This enables the curved transport module 17' to connect to the curved transport modules 16a and 16b in the present embodiment.

Further, the curved transport module 17' of the carriage transfer apparatus 11f is configured to be able to connect, at both the ends thereof, to the maintenance curved transport modules 18a and 18b installed adjacently to the carriage transfer apparatus 11f as described above. The maintenance curved transport modules 18a and 18b are installed outside the processing operation area 100 including the transport path 101". The curved transport module 17' is able to connect to the maintenance curved transport modules 18a and 18b at the same stop position. This enables the carriage 20 to transfer between the curved transport module 17' and either the maintenance curved transport module 18a or 18b. Each of the maintenance curved transport modules 18a and 18b has the same configuration as the curved transport module 16 forming the transport path 101" and has the same curvature as the curved transport module 16. In each of the maintenance curved transport modules 18a and 18b, the current conduction thereof is controlled by a module controller 118 (see FIG. 15), and motion of the carriage 20 thereon is controlled in the same manner as in the curved transport module 16.

Also in the present embodiment, in the same manner as in the processing system 2' according to the fourth embodiment, the curved transport module 17' of the carriage transfer apparatus 11f can be connected to the two maintenance curved transport modules 18a and 18b at a single stop position. Thereby, also in the present embodiment, it is possible to collect and supply the workpiece W efficiently in a short time in the same manner as in the fourth embodiment.

As discussed above, in order that the curved transport module 17' moves in a straight direction on a plane and from the inside to the outside of a circle to connect to the maintenance curved transport modules 18a and 18b at the same position, it is necessary that both the end faces B of the curved transport module 17' be parallel to the moving direction thereof as described above. That is, with a curved transport module being shaped such that each of both the end faces forms an arc circumference parallel to the radius direction of the circle, connection to the maintenance curved transport module 18a or 18b is not possible.

Further, in order to install the maintenance curved transport modules 18a and 18b outside the processing operation area 100 so as not to interfere with the external shape of the transport path 101", that is, the processing operation area 100, a distance y and an angle θ are required to satisfy a predetermined condition. Here, the distance y is a distance by which the curved transport module 17' of the carriage transfer apparatus 11f is moved from the transport path 101" to connect to the maintenance curved transport modules 18a and 18b. Further, the angle θ is an angle that is half the angle CO'D which is formed by the respective centers of the end faces C and D outside the maintenance curved transport modules 18a and 18b and the center O' spaced apart from the center O of the ring-shaped transport path 101" by the distance y in the moving direction of the curved transport module 17'. The condition that the distance y and the angle θ have to satisfy is expressed by Equation (1):

$$y(y+2r_1 \cos \theta) \geq r_2^2 - r_1^2 \qquad (1)$$

where $r_1$ is an inner radius of the transport path 101" defined by the fence 1011 inside the transport path 101", and $r_2$ is an outer radius of the transport path 101" defined by the fence 1011 outside the transport path 101".

Note that, in the sixth embodiment, unlike the present embodiment, the maintenance linear transport module 13g is a linear transport module and is installed along a direction parallel to the tangential line direction of the transport path 101". Thus, in the sixth embodiment, the maintenance linear transport module 13g can be installed in a position where the curved transport module 17 of the carriage transfer apparatus 11e can be connected to the maintenance linear transport module 13g at a position that does not interfere with the processing operation area 100.

Further, while the case where the carriage transfer apparatus 11f and the maintenance curved transport modules 18a and 18b are installed on the ring-shaped transport path 101" has been described in the present embodiment, the embodiment is not limited thereto. For example, in the same manner as the present embodiment, the carriage transfer apparatus 11f and the maintenance curved transport modules 18a and 18b can be installed to the curved part of the oval transport path 101' according to the third embodiment.

Figure 15:
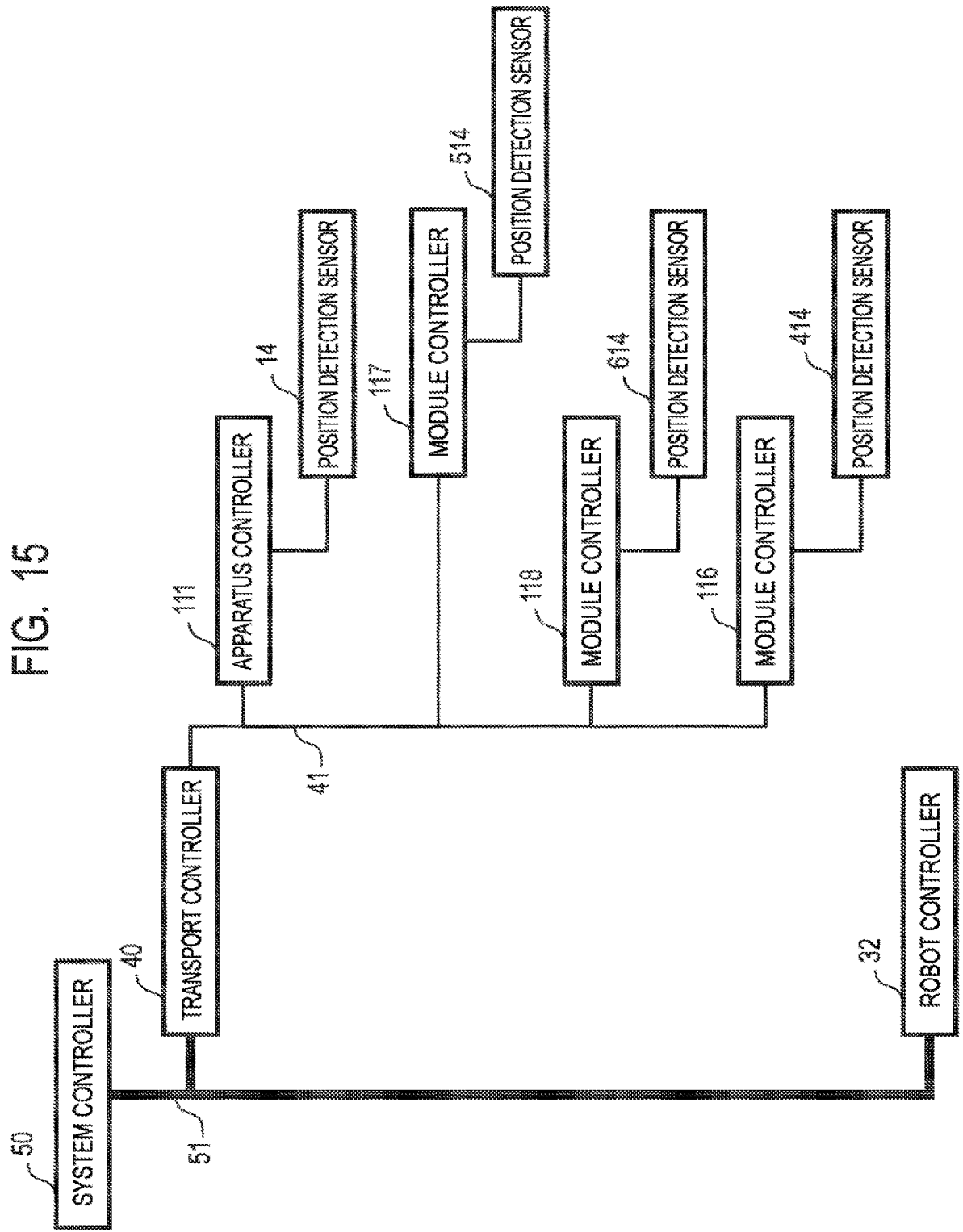
FIG. 15 is a control block diagram illustrating a control configuration of the processing system according to the seventh embodiment of the present invention.

FIG. 15 is a control block diagram illustrating a control configuration of the processing system 3' according to the present embodiment. Note that the control configuration illustrated in FIG. 15 is a case of using the carriage fixing mechanism 15' installed in the carriage 20 in the same manner as the control configuration of the second embodiment illustrated in FIG. 4. Also in the present embodiment, the carriage 20 can be fixed by using the carriage fixing mechanism 15 installed on the transport path 101" instead of or in addition to the carriage fixing mechanism 15' in the same manner as the first embodiment.

The apparatus controller 111 is provided to the carriage transfer apparatus 11f in the same manner as the carriage transfer apparatus 11e according to the sixth embodiment. The module controller 117 is provided to the curved transport module 17' of the carriage transfer apparatus 11f in the same manner as the curved transport module 17 according to the sixth embodiment.

As the position detection sensor 14, a position detection sensor 14l that detects the position in the moving direction of the curved transport module 17' is connected to the curved transport modules 16a and 16g of the transport path 101" is provided to the carriage transfer apparatus 11f. Further, as the position detection sensor 14, a position detection sensor 14m that detects the position in the moving direction of the curved transport module 17' is connected to the maintenance curved transport modules 18a and 18g is provided to the carriage transfer apparatus 11f.

Each module controller 118 that controls each of the maintenance curved transport modules 18a and 18b is connected to the transport controller 40 by the transport-system serial communication network 41. Each position detection sensor 614 that detects the position in the transport direction of the carriage 20 on each of the maintenance curved transport modules 18a and 18b is connected to each module controllers 118. The position detection sensor 614 as a position detection unit may be a linear encoder, for example, without being limited thereto in particular. Note that the position detection sensor 614 is not illustrated in FIG. 14.

Motion of the carriage 20 between the maintenance curved transport modules 18a and 18b and the curved transport module 17' of the carriage transfer apparatus 11f can be performed in the same manner as in the first embodiment. That is, the motion of the carriage 20 can be performed in the same manner as the motion of the carriage 20 between the maintenance linear transport module 13a and the linear transport module 12b of the carriage transfer apparatus 11b in the first embodiment.

Further, also in the present embodiment, the curved transport module 17' of the carriage transfer apparatus 11f can be positioned accurately in the moving direction with respect to the maintenance curved transport modules 18a and 18b by position shift correction using the position detection sensor 14m in the same manner as in the first embodiment. Further, the curved transport module 17' can be positioned accurately in the moving direction with respect to the curved transport module 16 of the transport path 101" by position shift correction using the position detection sensor 14l in the same manner as in the first embodiment.

Eighth Embodiment

Figure 16:
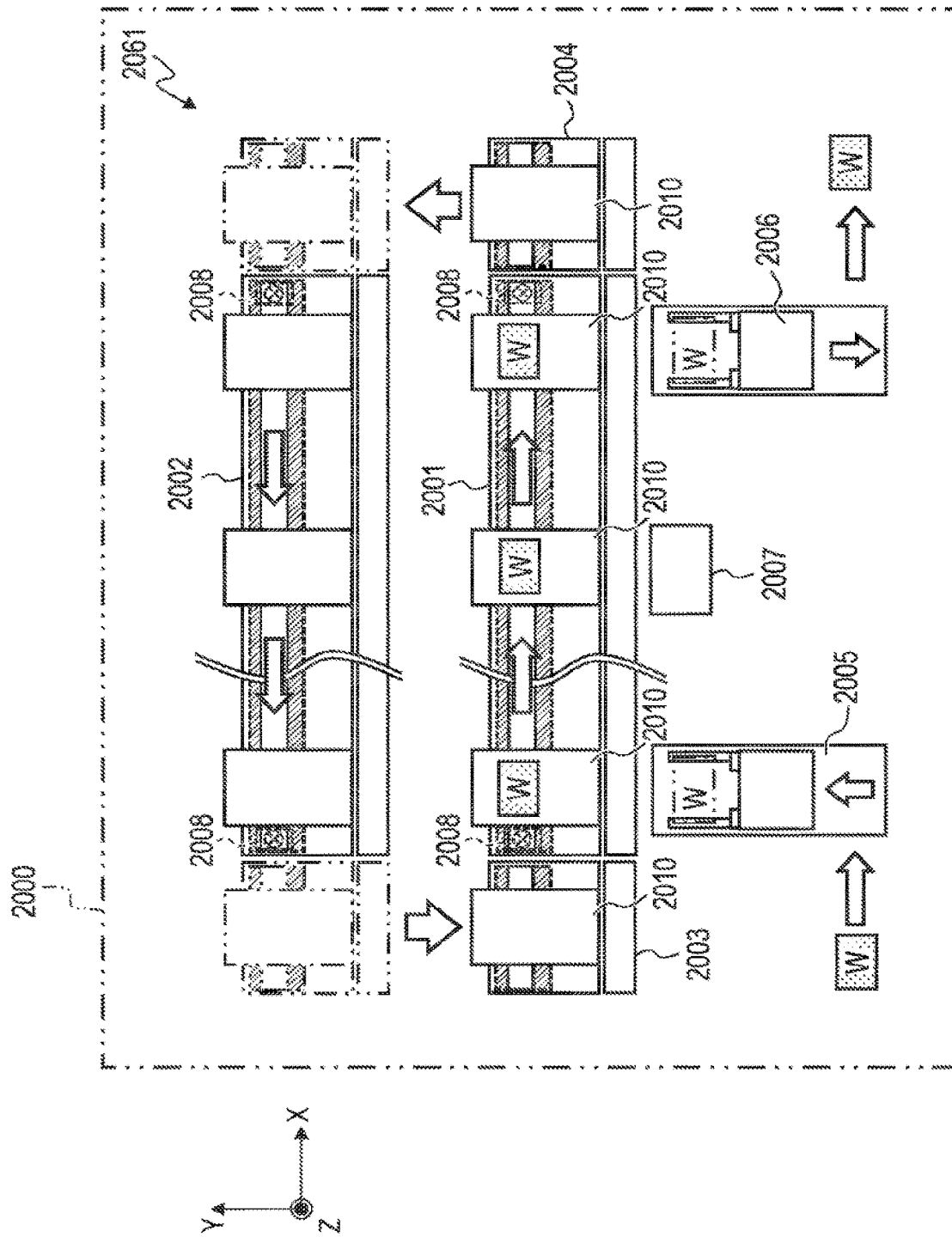
FIG. 16 is a schematic diagram illustrating the entire configuration of a processing system according to an eighth embodiment of the present invention.

An eighth embodiment of the present invention will be described by using FIG. 16 to FIG. 24B. First, the entire configuration of a processing system according to the present embodiment will be described by using FIG. 16. FIG. 16 is a schematic diagram illustrating the entire configuration of the processing system including a transport system according to the present embodiment, which is a top view of the whole processing system when viewed from the top.

As illustrated in FIG. 16, a processing system 2000 according to the present embodiment has a transport apparatus forward path 2001, a transport apparatus reverse path 2002, a carriage transfer apparatus 2003, a carriage transfer apparatus 2004, a workpiece input apparatus 2005, a workpiece output apparatus 2006, a processing apparatus 2007, blocking apparatuses 2008, and transport carriages 2010. The processing system 2000 according to the present embodiment includes a transport system 2061 that transports workpieces W that are process objects to be processed and positions the workpieces W on the transport carriages 2010. The transport system 2061 has the transport apparatus forward path 2001, the transport apparatus reverse path 2002, the carriage transfer apparatus 2003, the carriage transfer apparatus 2004, and the blocking apparatuses 2008. The transport apparatus forward path 2001, the transport apparatus reverse path 2002, the carriage transfer apparatus 2003, and the carriage transfer apparatus 2004 form a transport path of the transport carriages 2010.

Coordinate axes and directions of an X-axis, a Y-axis, and a Z-axis of an XYZ coordinate system that is a rectangular coordinate system used in the following description are now defined. First, the X-axis is defined as an axis in the transport direction of the transport carriage 2010 transported horizontally. Further, an axis orthogonal to a frame 2062 placed horizontally described later, that is, an axis in the perpendicular direction is defined as the Z-axis, and an axis orthogonal to the X-axis and the Z-axis is defined as the Y-axis. In the XYZ coordinate system where the coordinate axes are defined as above, a direction in the X-axis is defined as an X-direction, and, of the X-direction, the same direction as the transport direction of the transport carriage 2010 on the transport apparatus forward path 2001 is defined as a +X-direction and the opposite direction to the +X-direction is a −X-direction. Further, a direction in the Y-axis is defined as a Y-direction, and, of the Y-direction, the direction from the right side to the left side with respect to the +X-direction is defined as a +Y-direction and the opposite direction to the +Y-direction is a −Y-direction. Further, a direction in the Z-axis is defined as a Z-direction, and, of the Z-direction, the direction from the transport path side to the transport carriage 2010 side, that is, the perpendicular upward direction is defined as a +Z-direction and the direction from the transport carriage 2010 side to the transport path side, that is, the perpendicular downward direction is defined as a −Z-direction.

In the processing system 2000, the transport apparatus forward path 2001 and the transport apparatus reverse path 2002, which form linear transport paths for transporting the transport carriage 2010, respectively, are installed in parallel to each other. The transport carriage 2010 that is a carriage is transported along the transport apparatus forward path 2001 and the transport apparatus reverse path 2002. The carriage transfer apparatus 2003 is installed at the most upstream of the transport apparatus forward path 2001. Further, the carriage transfer apparatus 2004 is installed at the most downstream of the transport apparatus forward path 2001. The transport carriage 2010 transported along the transport apparatus forward path 2001 is transferred to the transport apparatus reverse path 2002 by the carriage transfer apparatus 2004. Further, the transport carriage 2010 transported along the transport apparatus reverse path 2002 is transferred to the transport apparatus forward path 2001 by the carriage transfer apparatus 2003. That is, the transport carriage 2010 is circulated and transported along the transport path including the transport apparatus forward path 2001 and the transport apparatus reverse path 2002. Note that a single transport carriage 2010 may be installed or a plurality of transport carriages 2010 may be installed.

In the upstream of the transport apparatus forward path 2001, the workpiece input apparatus 2005 that is a workpiece supply apparatus for supplying and loading a workpiece W on the transport carriage 2010 is installed. In the downstream of the transport apparatus forward path 2001, the workpiece output apparatus 2006 that picks out a workpiece W from the transport carriage 2010 for output is installed.

One or a plurality of processing apparatuses 2007 are installed between the workpiece input apparatus 2005 and the workpiece output apparatus 2006. The plurality of processing apparatuses 2007 are installed at predetermined intervals. Each processing apparatus 2007 applies a predetermined processing operation such as assembly of a component or application to a workpiece W fixed on the transport carriage 2010. Note that the processing apparatus 2007 is not limited in particular, and any processing apparatus that applies various processing operations to a workpiece W can be used. A process of applying a processing operation to the workpiece W by using the processing apparatus 2007 is performed in such a way, and thereby an article such as an electronic device is manufactured. An article to be manufactured is not limited to a particular object, and any article may be manufactured. Various articles can be manufactured by a manufacturing method of an article using the processing system 2000 according to the present embodiment.

The transport carriage 2010 is a carriage sequentially transported among the workpiece input apparatus 2005, the processing apparatus 2007, and the workpiece output apparatus 2006 installed at predetermined intervals with respect to the transport apparatus forward path 2001. A workpiece W is supplied to the workpiece input apparatus 2005 and then input to the transport carriage 2010. Next, after the workpiece W is positioned and fixed on the transport carriage 2010, a predetermined processing operation is applied by the processing apparatus 2007 to the workpiece W on the transport carriage 2010. After the completion of all the processing operations performed by the processing apparatuses 2007, the workpiece W is picked out from the top of the transport carriage 2010 by the workpiece output apparatus 2006.

The blocking apparatuses 2008 are provided to both the ends of the transport apparatus forward path 2001 and the transport apparatus reverse path 2002, respectively. That is, the blocking apparatus 2008 is provided to a connection part to the carriage transfer apparatus 2003 that is one end of the transport apparatus forward path 2001. Further, the blocking apparatus 2008 is provided to the connection part to the carriage transfer apparatus 2004 that is the other end of the transport apparatus forward path 2001. Further, the blocking apparatus 2008 is provided to a connection part to the carriage transfer apparatus 2004 that is one end of the transport apparatus reverse path 2002. Further, the blocking apparatus 2008 is provided to the connection part to the carriage transfer apparatus 2003 that is the other end of the transport apparatus reverse path 2002. As described later, the blocking apparatus 2008 prevents the transport carriage 2010 from jumping out of or dropping from the transport path when the carriage transfer apparatuses 2003 and 2004 are not connected.

Next, the general configuration of the transport apparatus forward path 2001, the transport apparatus reverse path 2002, the carriage transfer apparatuses 2003 and 2004, and the transport carriage 2010 in the transport system 2061 will be described by using FIG. 17A and FIG. 17B.

Figure 17B:
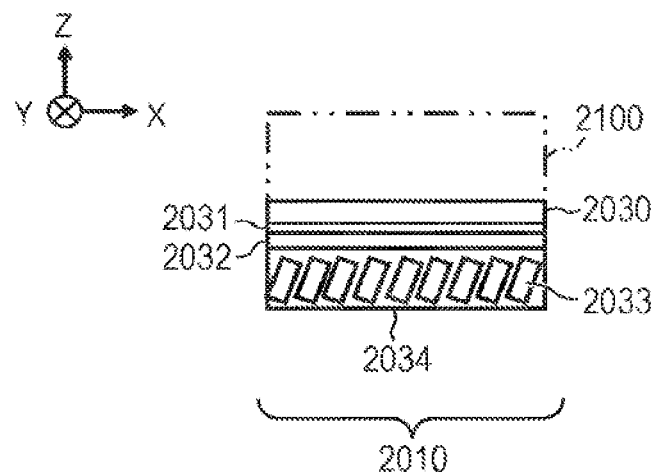
FIG. 17B is a schematic diagram illustrating a configuration of the transport system according to the eighth embodiment of the present invention.

FIG. 17A is a diagram of the transport apparatus forward path 2001 viewed from the Y-direction. FIG. 17B is a diagram of the transport carriage 2010 viewed from the Y-direction.

The transport apparatus forward path 2001 is configured as modules, which has a plurality of transport modules 2011. The processing system 2000 has a plurality of lower-level controllers 2043 communicably connected to the plurality of transport modules 2011, the carriage transfer apparatus 2003, and the carriage transfer apparatus 2004, respectively. The lower-level controllers 2043 functions as a control unit that controls the transport modules 2011 to be connected or the carriage transfer apparatuses 2003 and 2004 including carriage transfer modules 2039.

Note that, in FIG. 17A, for simplified illustration, two transport modules 2011 are illustrated, and two lower-level controllers 2043a and 2043b are illustrated as lower-level controllers 2043 connected to respective transport modules 2011. Further, lower-level controllers 2043c and 2043d are illustrated as the lower-level controllers 2043 connected to the carriage transfer apparatus 2003. Further, lower-level controllers 2043e and 2043f are illustrated as the lower-level controllers 2043 connected to the carriage transfer apparatus 2004. The plurality of lower-level controllers 2043 are connected to a lower-level controller network 2042.

The processing system 2000 further has a middle-level controller 2041 and a higher-level controller 2040. The middle-level controller 2041 is communicably connected to the plurality of lower-level controllers 2043 via the lower-level controller network 2042. The middle-level controller 2041 functions as a control unit that controls the plurality of lower-level controllers 2043. Furthermore, the higher-level controller 2040 that functions as a control unit that transmits an operation instruction to the middle-level controller 2041 is connected to the middle-level controller 2041.

As illustrated in FIG. 17A, the transport modules 2011 are installed on a horizontal installation face of the frame 2062. Each of the transport module 2011 has a transport module casing 2015, encoders 2012a, 2012b, and 2012c, carriage drive coils 2013, and guiderails 2014. Further, a power source (not illustrated) is connected to the lower-level controller 2043.

The transport module casings 2015 are installed on the horizontal installation face of the frame 2062. The encoders 2012 are attached to a plurality of positions of the transport module casings 2015. The carriage drive coils 2013 are attached to the transport module casings 2015 in parallel to the X-direction. The guiderails 2014 are attached on the transport module casings 2015 in parallel to the X-direction.

As illustrated in FIG. 17B, the transport carriage 2010 has a carriage base 2030, a scale 2032, a plurality of permanent magnets 2033, a permanent magnet bracket 2034, a scale bracket 2031, a guide block 2035 (see FIG. 18, FIG. 19, or the like), and a workpiece positioning mechanism 2100. Note that, for simplified illustration, FIG. 17B depicts a configuration partially different from FIG. 18, FIG. 19, or the like.

The guide block 2035 is attached to the under face of the carriage base 2030. The permanent magnet bracket 2034 is attached to the under face of the carriage base 2030. The scale bracket 2031 is attached to the side face extending in the X-direction of the carriage base 2030. The plurality of permanent magnets 2033 are attached to the permanent magnet bracket 2034 so as to be aligned in the X-direction. The scale 2032 is attached to the scale bracket 2031.

The workpiece positioning mechanism 2100 is attached on the carriage base 2030. The workpiece positioning mechanism 2100 is for positioning a workpiece W on the transport carriage 2010 and fixing the workpiece W on the transport carriage 2010.

The guide block 2035 attached to the carriage base 2030 is guided by the guiderail 2014, and the transport carriage 2010 is arranged on the transport module 2011 so as to be movable in the X-direction. The scale 2032 is attached to the carriage base 2030 via the scale bracket 2031 and has a pattern used for position detection of the transport carriage 2010.

With a current being applied to the carriage drive coils 2013, electromagnetic force that drives the transport carriage 2010 is generated between the plurality of permanent magnets 2033 attached to the carriage base 2030 via the permanent magnet bracket 2034 and the carriage drive coils 2013 attached to the transport module casings 2015. The transport carriage 2010 is driven by electromagnetic force generated between the plurality of permanent magnets 2033 and the carriage drive coils 2013 and transported in the +X-direction on the transport apparatus forward path 2001. Accordingly, the transport system 2061 with a moving magnet (MM) type linear motor is configured in the present embodiment.

The encoders 2012 of the transport module 2011 are attached to the transport module casing 2015 such that the gap to the scale 2032 attached to the transport carriage 2010 is constant. The encoder 2012 can detect the position of the transport carriage 2010 in the X-direction as a relative position from the encoder 2012 by reading the pattern of the scale 2032.

The encoders 2012 are installed to positions so as to be able to detect the transport carriage 2010 located at any position on the transport module 2011.

The lower-level controller 2043 can calculate the position of the transport carriage 2010 on the transport module 2011 based on the output of the connected encoders 2012 and the positions where those encoders 2012 are installed. The lower-level controller 2043 can control a current amount applied to the carriage drive coils 2013 in accordance with the calculated position of the transport carriage 2010 or the like. This enables the lower-level controller 2043 to transport the transport carriage 2010 up to a predetermined position at a predetermined speed and stop it.

Further, the lower-level controller 2043 can use the encoders 2012 to detect that the transport carriage 2010 enters the connected transport module 2011 from the adjacent transport module 2011. The lower-level controller 2043 controls the transport carriage 2010 within the connected transport module 2011 in order to transport the transport carriage 2010 that has entered the connected transport module 2011 up to a predetermined position at a predetermined speed and stop it.

Each of the lower-level controllers 2043 has a communication function for communicating information with the middle-level controller 2041. The lower-level controller 2043 communicates with the middle-level controller 2041 for position information or the like on the transport carriage 2010 detected by the encoders 2012 belonging to the lower-level controller 2043.

The middle-level controller 2041 can transmit instructions for operating the transport carriage 2010 to each of the lower-level controllers 2043. This enables the middle-level controller 2041 to control the plurality of transport carriages 2010.

Note that the transport apparatus reverse path 2002 has the same configuration as the above-described transport apparatus forward path 2001 except that the transport direction of the transport carriage 2010 is opposite to the transport direction in the transport apparatus forward path 2001.

Next, the configuration of the carriage transfer apparatus 2003 and the carriage transfer apparatus 2004 will be described. As illustrated in FIG. 17A, each of the carriage transfer apparatus 2003 and the carriage transfer apparatus 2004 has a carriage transfer actuator 2050 that is movable in the Y-direction and a module that is loaded on the carriage transfer actuator 2050 and has the same configuration as the transport module 2011.

The lower-level controller 2043c connected to the carriage transfer apparatus 2003 controls the carriage transfer actuator 2050 of the carriage transfer apparatus 2003. The lower-level controller 2043d connected to the carriage transfer apparatus 2003 controls a module having the same configuration as the transport module 2011 of the carriage transfer apparatus 2003 in a similar manner to the lower-level controllers 2043a and 2043b. Further, the lower-level controller 2043e connected to the carriage transfer apparatus 2004 controls the carriage transfer actuator 2050 of the carriage transfer apparatus 2004. The lower-level controller 2043f connected to the carriage transfer apparatus 2004 controls a module having the same configuration as the transport module 2011 of the carriage transfer apparatus 2004 in a similar manner to the lower-level controllers 2043a and 2043b.

The carriage transfer apparatus 2003 and the carriage transfer apparatus 2004 move between the transport apparatus forward path 2001 and the transport apparatus reverse path 2002 to transfer the transport carriage 2010, respectively. The carriage transfer apparatus 2004 transfers, from the transport apparatus forward path 2001 to the transport apparatus reverse path 2002, the transport carriage 2010 transported along the transport apparatus forward path 2001. The carriage transfer apparatus 2003 transfers, from the transport apparatus reverse path 2002 to the transport apparatus forward path 2001, the transport carriage 2010 transported along the transport apparatus reverse path 2002.

The higher-level controller 2040 controls the entire processing system 2000 and is communicably connected to a controller (not illustrated) that is for the processing apparatus 2007 and controls the processing apparatus 2007 or the like in addition to the middle-level controller 2041. The higher-level controller 2040 controls the operation of each apparatus and the order of operations in the processing system 2000.

Figure 18:
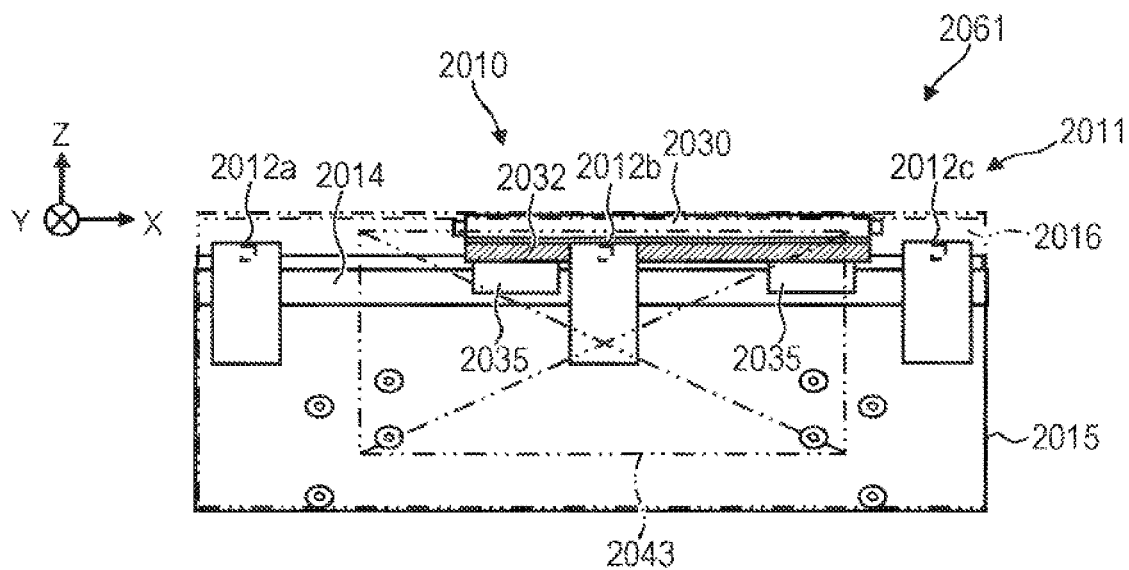
FIG. 18 is a front view illustrating a fundamental configuration of the transport system before implementing the eighth embodiment of the present invention.
Figure 19:
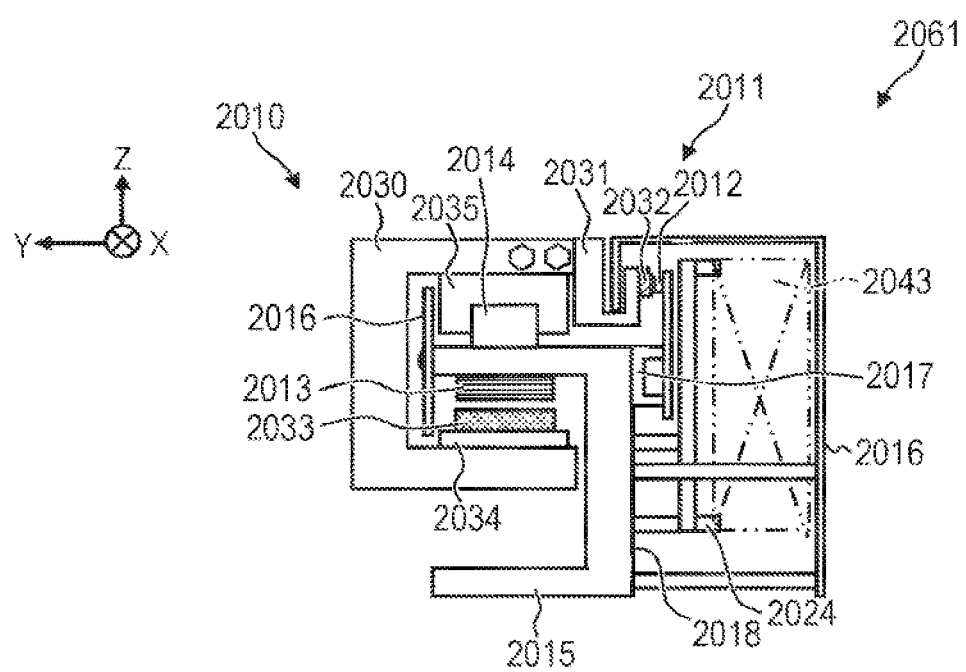
FIG. 19 is a sectional view illustrating a fundamental configuration of the transport system before implementing the eighth embodiment of the present invention.

Next, a fundamental configuration of the transport carriage 2010 and the transport module 2011 before implementing the present embodiment will be described in detail by using FIG. 18 and FIG. 19. FIG. 18 is a front view illustrating a fundamental configuration of the transport system 2061 before implementing the present embodiment, which is a view of the transport carriage 2010 and the transport module 2011 when viewed from the Y-direction. FIG. 19 is a sectional view illustrating a fundamental configuration of the transport system 2061 before implementing the present embodiment, which is a view of the transport carriage 2010 and the transport module 2011 when viewed from the X-direction.

As illustrated in FIG. 18 and FIG. 19, three encoders 2012a, 2012b, and 2012c are installed in the transport module 2011. Each encoder 2012 is installed on an encoder attachment face 2018 provided on the transport module casing 2015 via an encoder bracket 2017.

The encoders 2012a, 2012b, and 2012c are installed so as to be aligned in the X-direction. The encoder 2012b is installed at the center in the X-direction of the transport module 2011, and the encoders 2012a and 2012c are installed at both the ends of the transport module 2011, respectively. The attachment interval of the encoder 2012a and 2012b and the attachment interval of the encoder 2012b and encoder 2012c are shorter than the length of the scale 2032 provided to the transport carriage 2010. This allows the position of the transport carriage 2010 to be detected by any of the encoders 2012a, 2012b, and 2012c at any position on the transport module 2011.

The transport module casing 2015 has a side-opened recess structure. The guiderail 2014 is installed on the upper face of the transport module casing 2015. The carriage drive coils 2013 are installed on the upper inner wall of the transport module casing 2015. The guiderail 2014 and the carriage drive coils 2013 are arranged back to back via the transport module casing 2015.

The lower-level controller 2043 that controls the transport module 2011 is installed to the transport module casing 2015 thereof via the lower-level controller bracket 2024. The lower-level controller 2043 is connected by wirings (not illustrated) to the encoders 2012 and the carriage drive coils 2013 installed to the same transport module 2011.

A cover 2016 is installed to the transport module 2011. The cover 2016 is installed to protect the guiderail 2014, the carriage drive coils 2013, the encoders 2012, and the lower-level controller 2043.

On the other hand, the carriage base 2030 has the side-opened recess structure in the transport carriage 2010. The carriage base 2030 is arranged so as to engage with the transport module casing 2015 with the opened sides thereof facing each other.

Tow guide blocks 2035 are installed in series in the transport direction on the upper inner wall of the carriage base 2030. Each guide block 2035 is guided movably in the X-direction by the guiderail 2014 of the transport module 2011. The plurality of permanent magnets 2033 are installed so as to be aligned in the X-direction to the lower inner wall of the carriage base 2030 via the permanent magnet bracket 2034. The scale 2032 is installed to the carriage base 2030 via the scale bracket 2031. The scale 2032 is arranged at a position that can be detected by the encoders 2012 of the transport module 2011.

In the present embodiment, in the transport system 2061 having the transport carriage 2010 and the transport module 2011 having the above fundamental configuration illustrated in FIG. 18 and FIG. 19, the blocking apparatus 2008 is installed. The configuration including the blocking apparatus 2008 of the transport system 2061 according to the present embodiment will be described below in detail by using FIG. 20 to FIG. 22.

Figure 20:
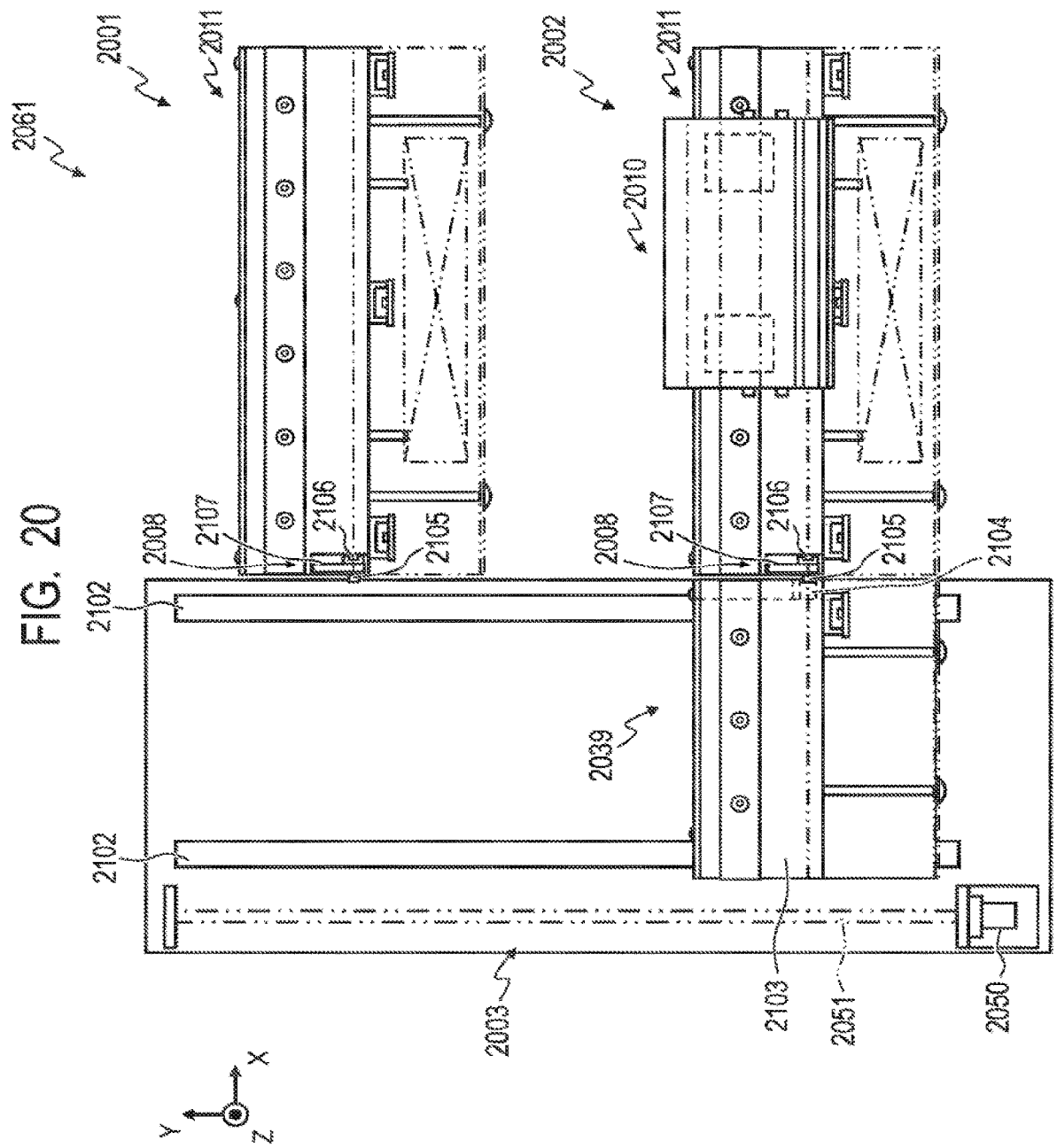
FIG. 20 is a top view illustrating a configuration including a blocking apparatus of the transport system according to the eighth embodiment of the present invention.
Figure 21:
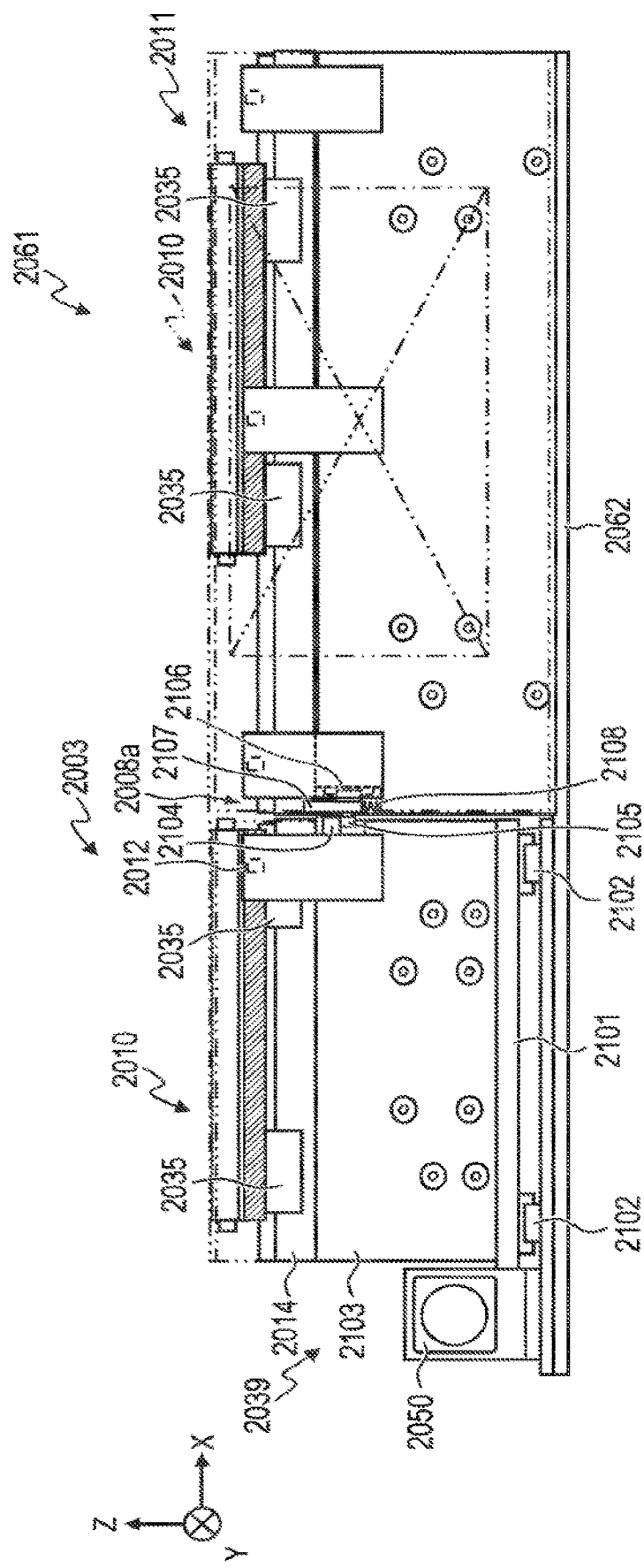
FIG. 21 is a front view illustrating a configuration including the blocking apparatus of the transport system according to the eighth embodiment of the present invention.
Figure 22:
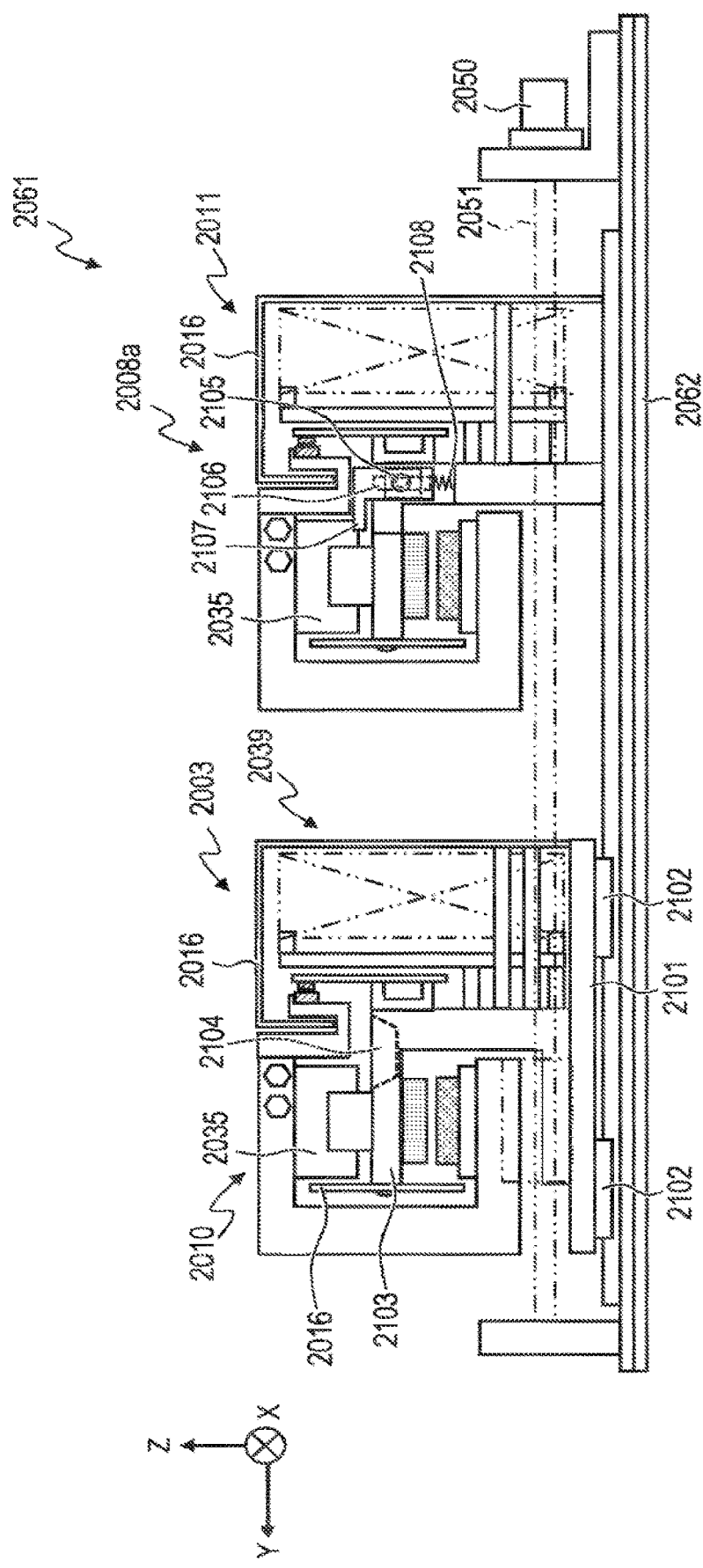
FIG. 22 is a side view illustrating a configuration including the blocking apparatus of the transport system according to the eighth embodiment of the present invention.

FIG. 20 and FIG. 22 illustrate the configuration including the carriage transfer apparatus 2003, the transport carriage 2010, the transport modules 2011, and the blocking apparatuses 2008 of the transport system 2061 according to the present embodiment. FIG. 20 is a top view of the transport system 2061 when viewed from the Z-direction according to the present embodiment. FIG. 21 is a front view of the transport system 2061 when viewed from the Y-direction according to the present embodiment. FIG. 22 is a side view of the transport system 2061 when viewed from the X-direction according to the present embodiment. Note that the position of the carriage transfer apparatus 2003, that is, the position of a carriage transfer apparatus base 2101 and a carriage transfer apparatus casing 2103 is different between FIGS. 20 and 21 and FIG. 22.

The transport carriage 2010 illustrated in FIG. 20, FIG. 21, and FIG. 22 has the same configuration as the above fundamental configuration before implementing the present embodiment illustrated in FIG. 18 and FIG. 19. On the other hand, while that the blocking apparatuses 2008 are provided to the connection part to the carriage transfer apparatus 2003, the transport module 2011 has the same configuration as the above fundamental configuration before implementing the present embodiment illustrated in FIG. 18 and FIG. 19 except that the blocking apparatuses 2008 are provided.

The blocking apparatus 2008 is to obstruct and prevent movement of the carriage toward the outside of the transport module 2011 when the carriage transfer module 2039 is not connected to the end of the transport module 2011. As illustrated in FIG. 20 to FIG. 22, each blocking apparatus 2008 has a cam follower 2105, a linear motion guide 2106, a blocking stopper 2107, and a spring 2108. The blocking apparatus 2008 is configured to operate by an interlock mechanism including the cam follower 2105 and a cam plate 2104. While the cam follower 2105, the linear motion guide 2106, the blocking stopper 2107, and the spring 2108 are provided to the transport module 2011, the cam plate 2104 is provided to the carriage transfer module 2039.

The linear motion guide 2106 is provided at the end of the transport module 2011. The linear motion guide 2106 guides the blocking stopper 2107 so that the blocking stopper 2107 operates in the Z-axis direction. The transport module 2011 is adapted to connect to the carriage transfer apparatus 2003 at the end thereof to which the linear motion guide 2106 is provided.

The blocking stopper 2107 is attached to the linear motion guide 2106. The blocking stopper 2107 is able to operate along the linear motion guide 2106 at a position for obstruction the movement of the transport carriage 2010 and at a position for not obstructing the movement of the transport carriage 2010 on the transport module 2011.

Further, the spring 2108 is arranged between the blocking stopper 2107 and the transport module 2011. The blocking stopper 2107 receives pushing force toward the side of the position for obstructing and preventing the movement of the transport carriage 2010 and pushed by the spring 2108 arranged between the blocking stopper 2107 and the transport module 2011. Further, the cam follower 2105 used for operating the blocking stopper 2107 as described later is installed to the blocking stopper 2107.

Note that the spring 2108 may be installed in any manner as long as it applies force to the blocking stopper 2107 toward the side of the position for obstructing and preventing the movement of the transport carriage 2010 to push the blocking stopper 2107. The spring 2108 may be installed other than between the blocking stopper 2107 and the transport module 2011, and may be installed between the blocking stopper 2107 and the frame 2062, for example. Furthermore, instead of the spring 2108, a pushing member that pushes the blocking stopper 2107 by utilizing an elastic member other than a spring, for example, magnetic force, air pressure, or the like may be used as long as it can apply pushing force in a desired direction to the blocking stopper 2107.

Here, the position for obstructing and preventing the movement of the transport carriage 2010 is a position where the blocking stopper 2107 and the transport carriage 2010 come into contact with and interfere with each other, and in the present embodiment, a position where the blocking stopper 2107 comes into contact with and interferes with the guide block 2035 of the transport carriage 2010. The blocking stopper 2107 comes into contact with and interferes with a part of the transport carriage 2010, and thereby the movement of the transport carriage 2010 on the transport module 2011 is obstructed and prevented. Further, the position for not obstructing the movement of the transport carriage 2010 is a position where the blocking stopper 2107 and the transport carriage 2010 do not interfere with each other.

On the other hand, as illustrated in FIG. 20 to FIG. 22, the carriage transfer apparatus 2003 has the carriage transfer module 2039. The carriage transfer module 2039 is a transport module having the same configuration as the transport module 2011. The carriage transfer module 2039 is configured to be able to move to the position for being able to connect to the end of the transport module 2011. Further, the carriage transfer module 2039 is configured so that the transport carriage 2010 can move to and from the connected transport module 2011 and transfer and transport the transport carriage 2010 to and from the connected transport module 2011.

The carriage transfer module 2039 is installed on the carriage transfer apparatus base 2101. The carriage transfer apparatus base 2101 is installed on the linear motion guide 2102 so as to be movable along the linear motion guide 2102 provided in the Y-direction adjacently to the end of the transport apparatus forward path 2001 and the transport apparatus reverse path 2002. The carriage transfer actuator 2050 and a ball screw 2051 used for driving the carriage transfer module 2039 are provided to the carriage transfer module 2039 on the carriage transfer apparatus base 2101. The carriage transfer module 2039 is movable in the Y-direction in FIG. 20 to FIG. 22 by using the carriage transfer actuator 2050 and the ball screw 2051.

The carriage transfer apparatus casing 2103 that is a casing of the carriage transfer module 2039 is installed on the carriage transfer apparatus base 2101. The cam plate 2104 is attached to the end on the transport module 2011 side of the carriage transfer apparatus casing 2103. The carriage transfer apparatus casing 2103 is adapted to connect to the transport module 2011 at the end to which the cam plate 2104 is attached.

The cam plate 2104 is a cam that engages with the cam follower 2105. The cam plate 2104 is adapted to engages with the cam follower 2105 provided to the end of the transport module 2011 when the carriage transport apparatus casing 2103 is connected to the end of the transport module 2011 to push down the cam follower 2105. The cam plate 2104 has legs that are a pair of opposing sides at both ends in the Y-direction and has a trapezoidal shape in which the lower end has a narrower width in the Y-direction, for example.

The cam plate 2104 is adapted to push down the cam follower 2105 by coming in contact with the cam follower 2105 and moving in the Y-direction. By the cam follower 2105 being pushed down, the blocking stopper 2107 to which the cam follower 2105 is attached is also pushed down against pushing force of the spring 2108. Here, the cam plate 2104 and the cam follower 2105 are attached to each other in a positional relationship in which, when the cam follower 2105 is pushed down by the cam plate 2104, the blocking stopper 2107 can be operated to a position for not obstructing the movement of the transport carriage 2010. Alternatively, the shape of the cam plate 2104 and the positional relationship of the cam plate 2104 and the com follower 2105 are configured to enable the operation of the blocking stopper 2107 described above. Note that, while the shape of the cam plate 2104 is a trapezoid in the present embodiment, the shape of the cam plate 2104 may be other shapes such as an arc, a groove, or the like.

On the other hand, when the carriage transfer apparatus casing 2103 is not connected to the transport module 2011, the cam plate 2104 does not push down the cam follower 2105. Thus, the blocking stopper 2107 to which the cam follower 2105 is attached is located in a position for obstructing the movement of the transport carriage 2010.

In such a way, the blocking apparatus 2008 interlocks with the motion of the carriage transfer module 2039 of the carriage transfer apparatus 2003 by the interlocking mechanism including the cam plate 2104 and the cam follower 2105. Thereby, the blocking apparatus 2008 operates so as to switch a state of obstructing the movement of the transport carriage 2010 toward the outside of the transport module 2011 to and from a state of not obstructing such movement.

Note that the blocking apparatus 2008 is provided also at the end of the transport module 2011 on the carriage transfer apparatus 2004 side in the same manner as the blocking apparatus 2008 described above.

In the transport system 2061, there is a period of absence of the carriage transfer module 2039 in which the carriage transfer apparatus casing 2103 of the carriage transfer module 2039 is not connected to the end of the transport module 2011. Even during the absence of the carriage transfer module 2039, a transfer operation of the transport carriage 2010 to the carriage transfer module 2039 may occur due to an erroneous operation, the transport carriage 2010 being out of control, or the like. The situation of the transport carriage 2010 being out of control may be caused by malfunction of a program that controls motion of the transport carriage 2010.

In contrast, in the present embodiment, the blocking apparatus 2008 is provided at the end of the transport module 2011 forming the transport path. The blocking apparatus 2008 has the blocking stopper 2107 located in a position for obstructing the movement of the transport carriage 2010 toward the outside of the transport module 2011 during the absence of the carriage transfer module 2039.

Therefore, in the present embodiment, even when a transfer operation of the transport carriage 2010 to the carriage transfer module 2039 occurs during the absence of the carriage transfer module 2039, the blocking apparatus 2008 can obstruct the movement of the transport carriage 2010 out of the transport module 2011. Therefore, according to the present embodiment, it is possible to prevent the transport carriage 2010 from jumping out of or dropping from the transport module 2011 forming a transport path.

Figure 23B:
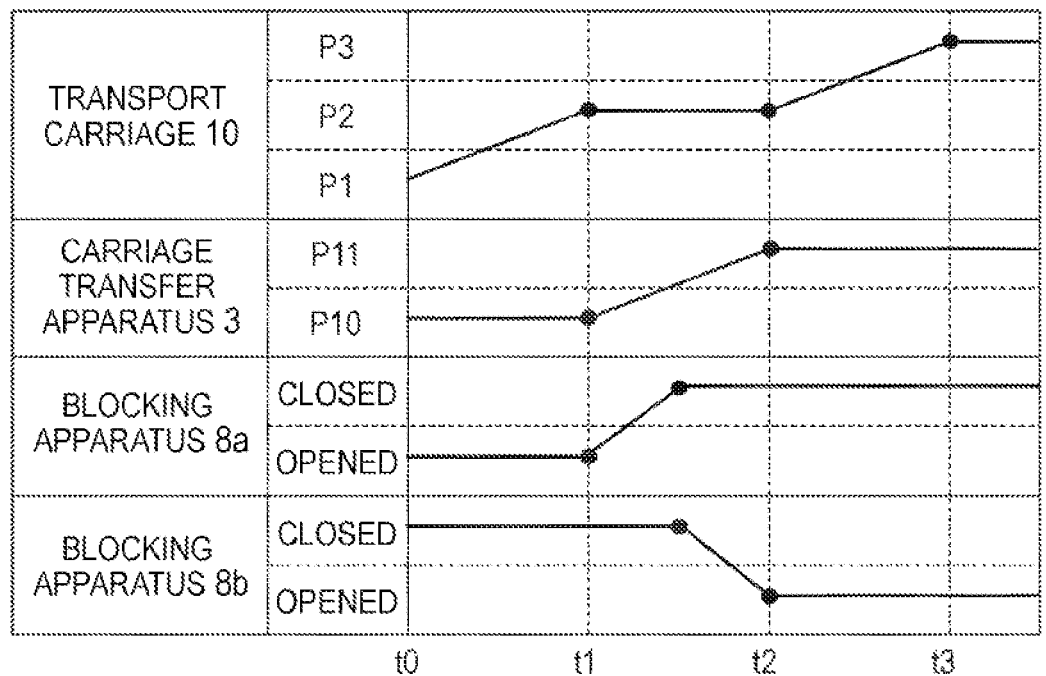
FIG. 23B is a diagram illustrating a part of a timing chart illustrating an operation of the transport system according to the eighth embodiment of the present invention.
Figure 24A:
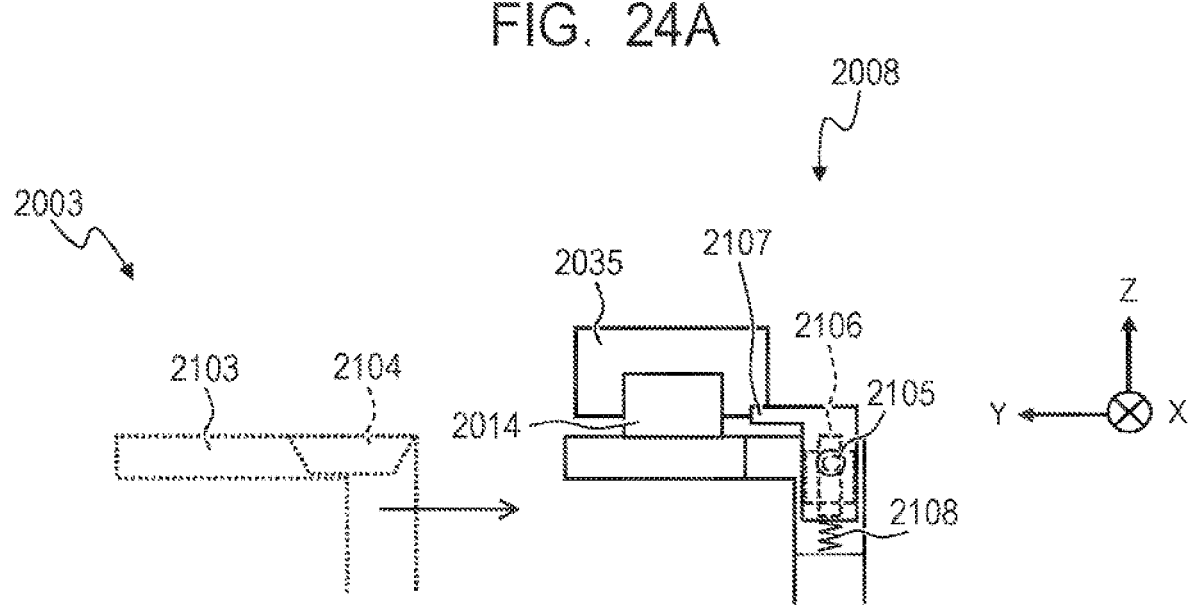
FIG. 24A is schematic diagram illustrating an operation of the blocking apparatus in the transport system according to the eighth embodiment of the present invention.
Figure 24B:
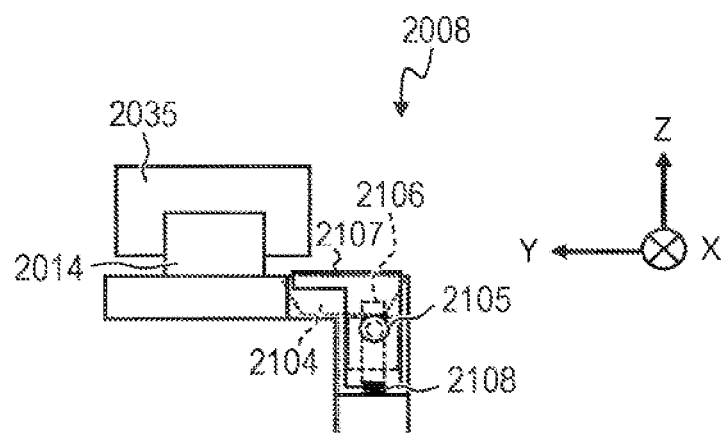
FIG. 24B is a schematic diagram illustrating an operation of the blocking apparatus in the transport system according to the eighth embodiment of the present invention.

Next, the operation of the transport system 2061 including the operation of the blocking apparatus 2008 will be described by using FIG. 23A to FIG. 24B. FIG. 23A is a top view illustrating a stop position of the transport carriage 2010 in the transport system 2061 according to the present embodiment. FIG. 23B is a diagram illustrating a part of the timing chart illustrating the operation of the transport system 2061 according to the present embodiment. FIG. 24A and FIG. 24B are schematic diagrams illustrating the operation of the blocking apparatus 2008 in the transport system 2061 according to the present embodiment.

FIG. 23A corresponds to FIG. 20 and illustrates stop positions P1, P2, and P3 of the transport carriage 2010 and illustrates stop positions P10 and P11 of the carriage transfer module 2039 in the carriage transfer apparatus 2003. Further, FIG. 23A illustrates transport modules 2011a and 2011b as the transport module 2011 adjacent to the carriage transfer apparatus 2003 and illustrates blocking apparatuses 2008a and 2008b provided to the ends of the transport modules 2011*a* and 2011*b* as the blocking apparatus 2008, respectively. The stop position P10 of the carriage transfer module 2039 is a position where the carriage transfer module 2039 connects to the end of the transport module 2011*a*. The stop position P11 of the carriage transfer module 2039 is a position where the carriage transfer module 2039 connects to the end of the transport module 2011*b*. FIG. 23B illustrates a timing chart when the transport carriage 2010 moves from the stop position P1 on the transport module 2011*a* to the stop position P3 on the transport module 2011*b* via the stop position P2 on the carriage transfer module 2039.

Note that an initial state is a state at the time t0. In the initial state, the transport carriage 2010 has stopped at the stop position P1, the carriage transfer module 2039 has stopped at the stop position P10, the blocking apparatus 2008*a* is opened, and the blocking apparatus 2008*b* is closed. Here, each of the blocking apparatus 2008*a* and the blocking apparatus 2008*b* has the cam plate 2104, the cam follower 2105, the linear motion guide 2106, the blocking stopper 2107, and the spring 2108 and is operated by the cam plate 2104, as described above by the illustration of FIG. 20 to FIG. 22. The opened state of the blocking apparatus 2008 refers to a state where the blocking stopper 2107 is located in the position for not obstructing the movement of the transport carriage 2010 as described above. The closed state of the blocking apparatus 2008 refers to a state where the blocking stopper 2107 is located in a position for obstructing the movement of the transport carriage 2010.

The transport carriage 2010 is driven by the transport module 2011 controlled by the lower-level controller 2043 to move on the transport path under the control of the middle-level controller 2041 that has received an operation instruction from the higher-level controller 2040.

First, during the time t0 to the time t1, the transport carriage 2010 that has stopped at the stop position P1 on the transport module 2011*a* moves to the stop position P2 on the carriage transfer module 2039. At this time, the carriage transfer module 2039 of the carriage transfer apparatus 2003 has stopped at the stop position P10 and has been connected to the end of the transport module 2011*a*. Thus, the blocking apparatus 2008*a* has been opened. Thus, movement of the transport carriage 2010 is not obstructed by the blocking apparatus 2008*a* and is able to move from the stop position P1 to the stop position P2.

Next, during the time t1 to the time t2, the carriage transfer module 2039 on which the transport carriage 2010 has stopped moves from the stop position P10 to the stop position P11 and connects to the end of the transport module 2011 at the stop position P11. During this period from the time t to the time t2, the blocking apparatuses 2008*a* and 2008*b* also interlocks with the motion of the carriage transfer module 2039 of the carriage transfer apparatus 2003. That is, the blocking apparatus 2008*a* gradually closes as the carriage transfer module 2039 moves away from the stop position P10, and the blocking apparatus 2008*a* is closed before the carriage transfer module 2039 stops at the stop position P11. By the blocking apparatus 2008*a* being closed, it is possible to prevent the subsequent transport carriage 2010 from jumping out of or dropping from the end of the transport module 2011*a* to which the carriage transfer module 2039 is not connected. On the other hand, the blocking apparatus 2008*b* is gradually opened as the carriage transfer module 2039 approaches the stop position P11, and blocking apparatus 2008*b* is opened before the carriage transfer module 2039 stops at the stop position P11.

Next, during the time t2 to the time t3, the transport carriage 2010 moves from the stop position P2 on the carriage transfer module 2039 to the stop position P3 on the transport module 2011*b*. At this time, the carriage transfer module 2039 has stopped at the stop position P11 and has been connected to the end of the transport module 2011*b*. Thus, the blocking apparatus 2008*b* is opened as described above. This enables the transport carriage 2010 to move from the stop position P2 to the stop position P3 without the movement thereof being obstructed by the blocking apparatus 2008*a*.

FIG. 24A and FIG. 24B illustrate the operation of the blocking apparatus 2008. FIG. 24A illustrates a closed state of the blocking apparatus 2008. FIG. 24B illustrates an opened state of the blocking apparatus 2008.

As illustrated in FIG. 24A and FIG. 24B, in the closed blocking apparatus 2008, the blocking stopper 2107 is pushed up along the linear motion guide 2106 by the spring 2108. Since being located in a position of interfering with, for example, the guide block 2035 of the transport carriage 2010, the blocking stopper 2107 pushed up by the spring 2108 is adapted to obstruct the movement of the transport carriage 2010. The blocking stopper 2107 located in a position for obstructing the movement of the transport carriage 2010 comes into contact and interferes with the guide block 2035 of the transport carriage 2010, and thereby the closed blocking apparatus 2008 stops the transport carriage 2010.

When the carriage transfer module 2039 of the carriage transfer apparatus 2003 moves in the −Y-direction and comes close to the closed blocking apparatus 2008, the cam plate 2104 attached to the carriage transfer apparatus casing 2103 of the carriage transfer module 2039 comes close to the cam follower 2105. Then, when the carriage transfer module 2039 further moves in the −Y-direction and thereby the cam plate 2104 comes into contact with the cam follower 2105, the cam follower 2105 moves in accordance with the shape of the cam plate 2104. The cam follower 2105 is pushed down by the cam plate 2104 and moves in the −Z-direction. Thus, the blocking stopper 2107 to which the cam follower 2105 is attached also moves in the −Z-direction along the linear motion guide 2106 while contracting the spring 2108 against pushing force of the spring 2108. In this way, the blocking stopper 2107 moves in the −Z-direction, and thereby moves from the position for obstructing the movement of the transport carriage 2010 to the position for not obstructing the movement of the transport carriage 2010, as illustrated in FIG. 24B. As a result, the blocking apparatus 2008 is opened.

Note that, when the carriage transfer module 2039 of the carriage transfer apparatus 2003 moves in the +Y-direction and moves away from the opened blocking apparatus 2008, the blocking apparatus 2008 moves in a manner opposite to the above-described case illustrated in FIG. 24A and FIG. 24B. Further, the case where the carriage transfer module 2039 of the carriage transfer apparatus 2003 moves has been described above, and when the carriage transfer module 2039 of the carriage transfer apparatus 2004 moves, the corresponding blocking apparatus 2008 moves in the same manner as described above.

As discussed above, in the present embodiment, when the carriage transfer module 2039 of the carriage transfer apparatus 2003 or 2004 and the end of the transport module 2011 is not connected to each other, the blocking apparatus 2008 is closed. Thus, even when transfer operation of the transport carriage 2010 to the carriage transfer apparatus 2003 or 2004 occurs due to an erroneous operation, the transport carriage 2010 being out of control, or the like, it is possible to prevent the transport carriage 2010 from jumping out or dropping. Further, since the blocking apparatus 2008 interlocks with the operation of the operation of the carriage transfer module 2039 of the carriage transfer apparatus 2003 or 2004, it is possible to ensure the operation of the blocking apparatus 2008 and prevent the transport carriage 2010 from jumping out or dropping.

As discussed above, according to the present embodiment, even when a transfer operation of the transport carriage 2010 to the carriage transfer module 2039 occurs in the absence of the carriage transfer module 2039, it is possible to prevent the transport carriage 2010 from jumping out of or dropping from the transport path.

Note that, while the case of the interlocking mechanism in which the cam plate 2104 and the cam follower 2105 are used as a mechanism for operating the blocking apparatus 2008 has been described above, the embodiment is not limited thereto. Other various mechanisms can be employed as an interlocking mechanism for operating the blocking apparatus 2008. For example, a rack and pinion mechanism in which a rack gear is used instead of the cam plate 2104 and a pinion gear is used instead of the cam follower 2105 may be used. With an interlocking mechanism using the combination of a rack gear and a pinion gear, it is possible to operate the blocking stopper 2107 between the position for obstructing the movement of the transport carriage 2010 and the position for not obstructing the movement by causing the blocking stopper 2107 to rotate and interlock with the motion of the carriage transfer module 2039.

Ninth Embodiment

A ninth embodiment of the present invention will be described by using FIG. 25 to FIG. 28. Note that the same components as those in the eighth embodiment described above are labeled with the same reference numerals, and the description thereof will be omitted or simplified.

Figure 25:
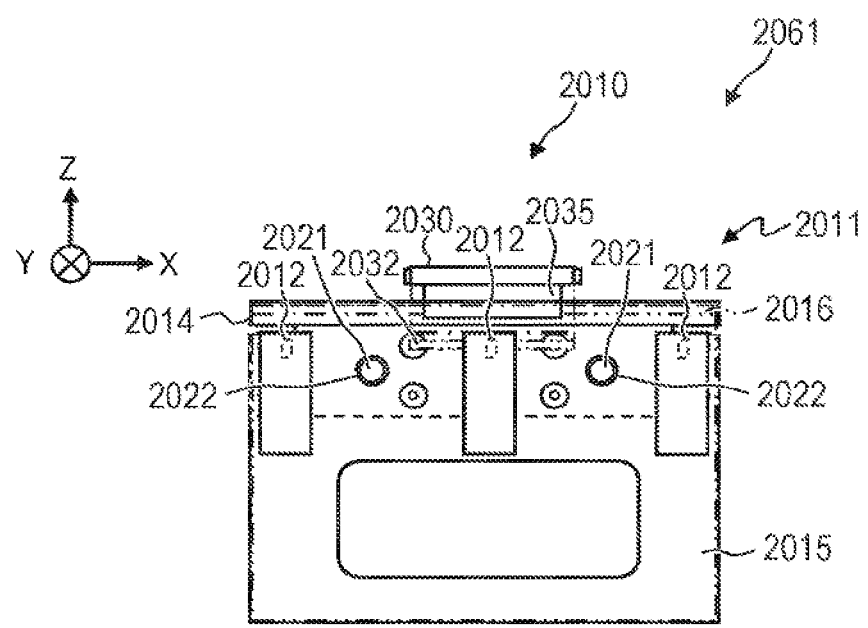
FIG. 25 is a front view illustrating a fundamental configuration of a transport system before implementing a ninth embodiment of the present invention.
Figure 26:
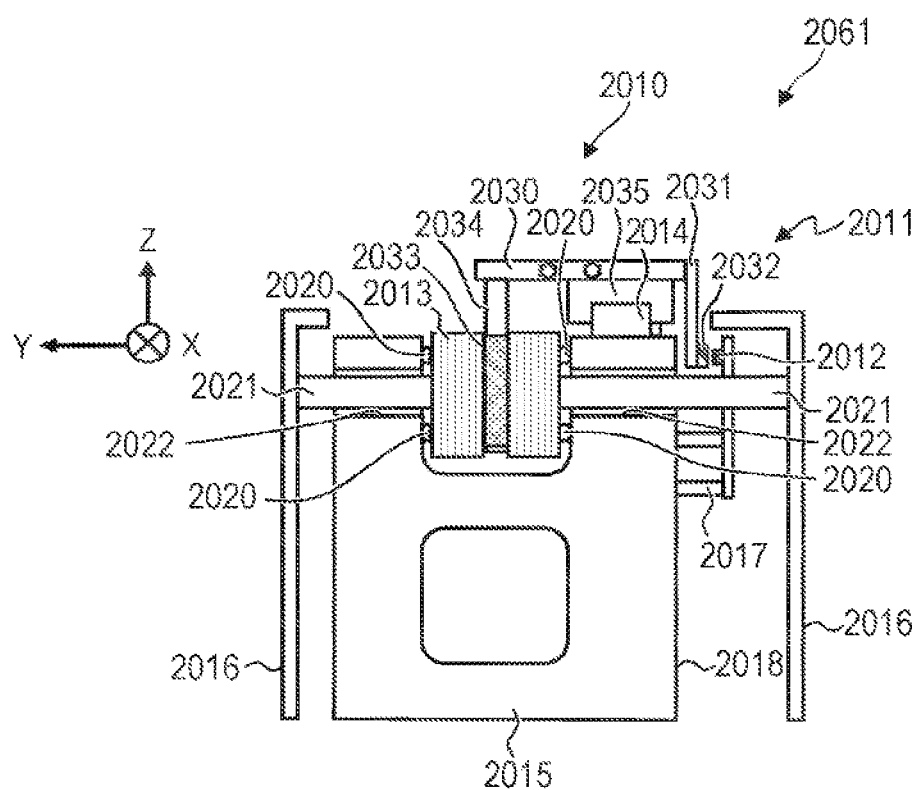
FIG. 26 is a sectional view illustrating a configuration the transport system before implementing the ninth embodiment of the present invention.

First, the fundamental configuration of the transport carriage 2010 and the transport module 2011 before implementing the present embodiment will be described by using FIG. 25 and FIG. 26. FIG. 25 is a font view illustrating the fundamental configuration of the transport system 2061 before implementing the present embodiment, which is a view of the transport carriage 2010 and the transport module 2011 when viewed from the Y-direction. FIG. 26 is a sectional view illustrating the fundamental configuration of the transport system 2061 before implementing the present embodiment, which is a view of the transport carriage 2010 and the transport module 2011 when viewed from the X-direction.

As illustrated in FIG. 25 and FIG. 26, in the present embodiment, the transport module 2011 has the transport module casing 2015 having a top-opened recess structure. The carriage drive coils 2013 including a pair of coil groups installed facing in the Y-direction spaced apart from each other are installed on the inner wall of the recess part of the transport module casing 2015. Further, the carriage drive coils 2013 are configured such that the permanent magnet 2033 and the permanent magnet bracket 2034 installed on the transport carriage 2010 moving on the transport module 2011 pass between the pair of coil groups.

The coil groups forming the carriage drive coils 2013 are installed via heat insulating spacers 2020 to the transport module casing 2015. Further, through holes 2022 reaching the carriage drive coils 2013 are provided in the transport module casing 2015. A cover support 2021 is installed through the through holes 2022 to the carriage drive coils 2013. The cover 2016 is installed to the outer end of the transport module casing 2015 of the cover support 2021.

The encoder 2012 is installed on the encoder attachment face 2018 provided to the transport module casing 2015 via the encoder bracket 2017. Further, the guiderail 2014 is provided on the top face on one side of the recess part of the transport module casing 2015.

The lower-level controller 2043 that controls the transport module 2011 is installed inside the frame 2062 (not illustrated) or the like and connected to the transport module 2011 via a cable or the like.

On the other hand, the transport carriage 2010 has the guide block 2035 and the permanent magnet bracket 2034 installed on the under face of the flat carriage base 2030 and the transport carriage 2010 and has T-shaped structure. The scale 2032 is installed on the side face of the carriage base 2030 via the scale bracket 2031.

In the present embodiment, in the transport system 2061 that has the transport carriage 2010 and the transport module 2011 having the above-described fundamental configuration illustrated in FIG. 25 and FIG. 26, the blocking apparatus 2008 is installed. The configuration including the blocking apparatus 2008 of the transport system 2061 according to the present embodiment will be described below by using FIG. 27 and FIG. 28.

Figure 27:
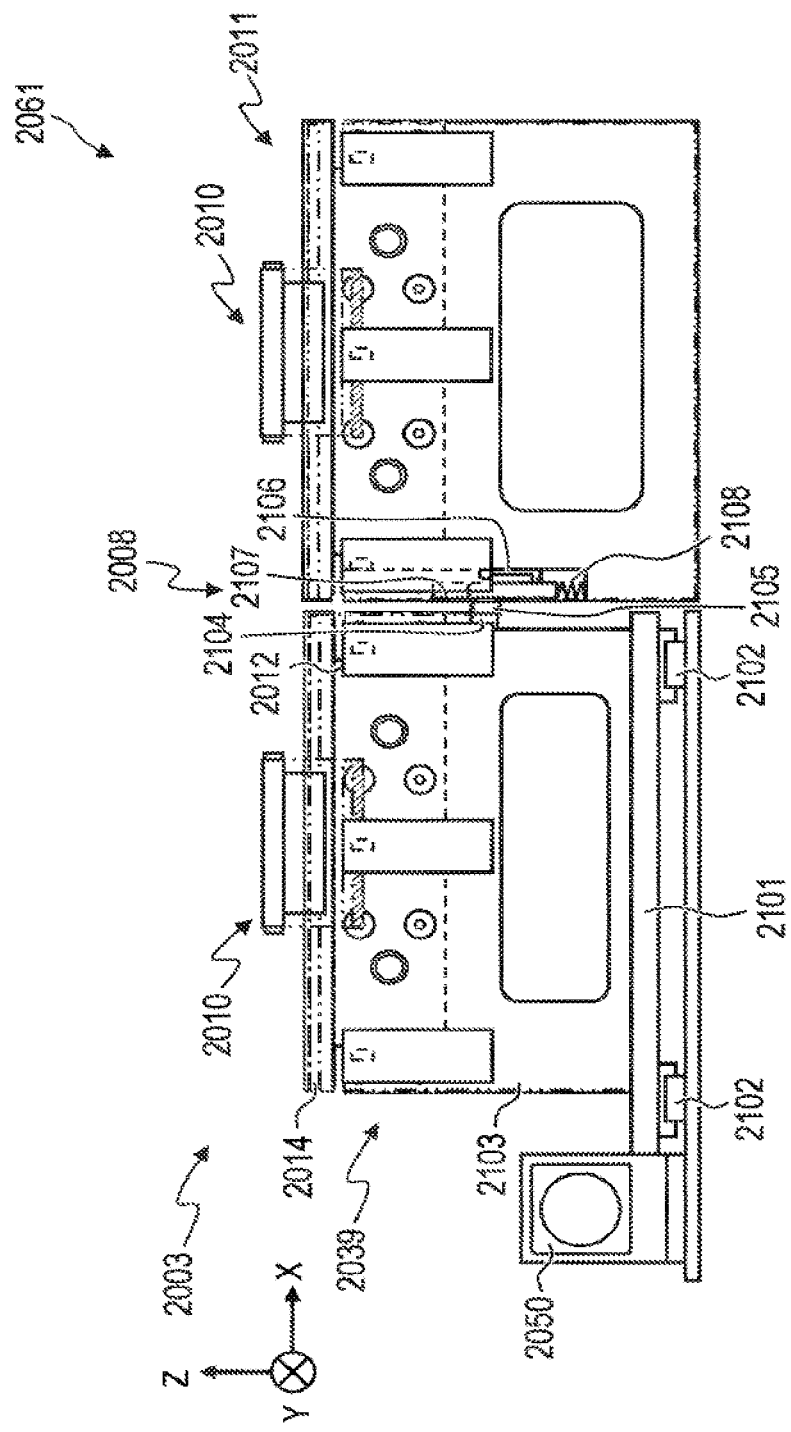
FIG. 27 is a front view illustrating a configuration of the transport system according to the ninth embodiment of the present invention.
Figure 28:
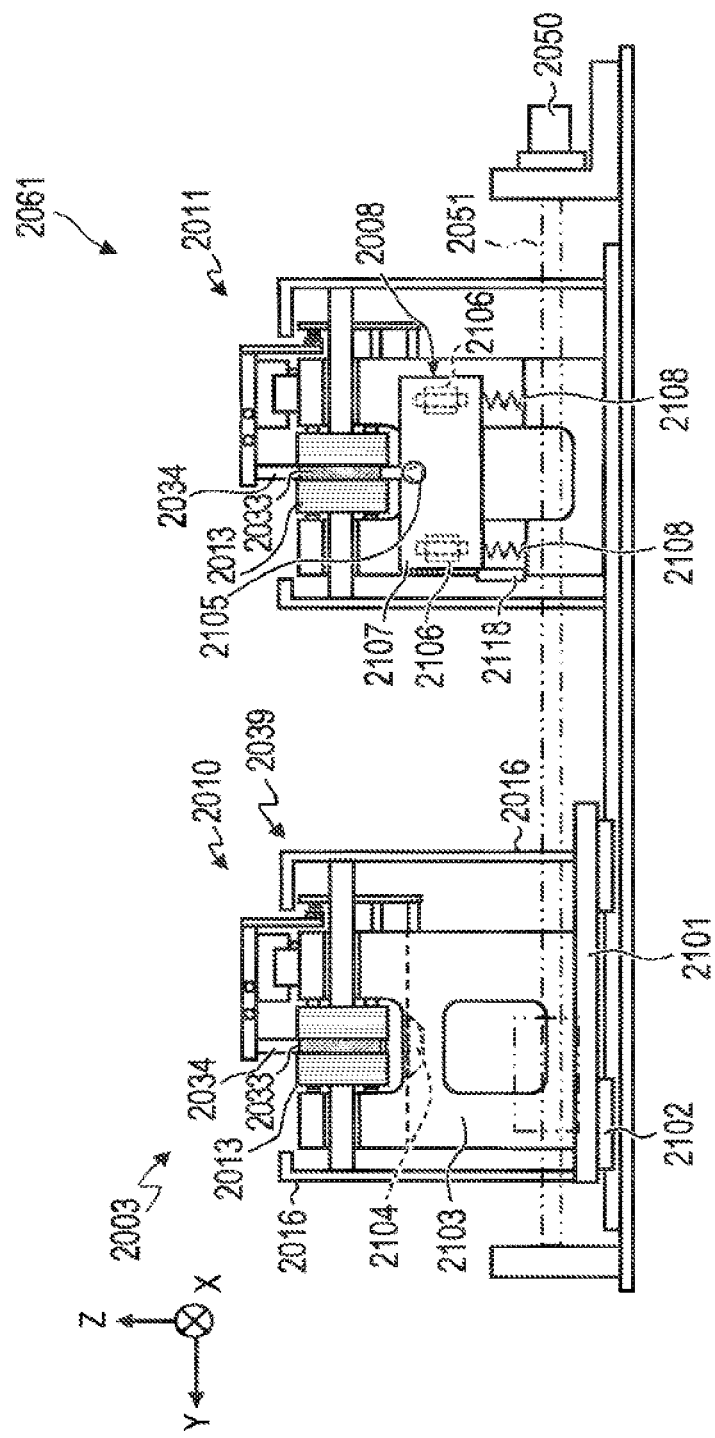
FIG. 28 is a side view illustrating a configuration of the transport system according to the ninth embodiment of the present invention.

FIG. 27 and FIG. 28 illustrate the configuration including the carriage transfer apparatus 2003, the transport carriage 2010, and the transport module 2011 of the transport system 2061 according to the present embodiment. FIG. 27 is a top view of the transport system 2061 according to the present embodiment when viewed from the Y-direction. FIG. 28 is a side view of the transport system 2061 according to the present embodiment when viewed from the X-direction.

The transport carriage 2010 illustrated in FIG. 27 and FIG. 28 has the same configuration as the fundamental configuration before implementing the previously described present embodiment illustrated in FIG. 25 and FIG. 26. On the other hand, the transport module 2011 has the blocking apparatus 2008 provided at the connection part to the carriage transfer module 2039 of the carriage transfer apparatus 2003 and has the same configuration as the previously described fundamental configuration before implementing the present embodiment except that the blocking apparatus 2008 is provided.

Also in the present embodiment, the blocking apparatus 2008 is configured to operate the blocking stopper 2107 by using the cam plate 2104 attached to the carriage transfer module 2039 of the carriage transfer apparatus 2003 and the cam follower 2105 installed to the blocking stopper 2107 in the same manner as in the eighth embodiment. Thus, features which distinguishes the present embodiment from the eighth embodiment will be described below.

In the eighth embodiment, when the blocking stopper 2107 is in a position for obstructing the movement of the transport carriage 2010, the blocking stopper 2107 and the guide block 2035 come into contact with and interfere with each other, and thereby the transport carriage 2010 is stopped. In contrast, in the present embodiment, when the blocking topper 2107 is in a position for obstructing the movement of the transport carriage 2010, the blocking stopper 2107 and the permanent magnet bracket 2034 come into contact with and interfere with each other, and thereby the transport carriage 2010 is stopped.

Furthermore, in the present embodiment, a blocking stopper detection unit 2118 that detects the position of the blocking stopper 2107 is installed near the blocking stopper 2107. Specifically, the blocking stopper detection unit 2118 detects which of the position for obstructing the movement of the transport carriage 2010 or the position for not obstructing the movement of the transport carriage 2010 the blocking stopper 2107 is located in. Thereby, it is possible to check the position of the blocking stopper 2107 when the carriage transfer module 2039 of the carriage transfer apparatus 2003 is not connected to the end of the transport module 2011. As the blocking stopper detection unit 2118, without being limited thereto, an object detection sensor such as a photoelectric sensor or the like that detects the presence or absence of an object, for example, can be used.

The blocking stopper detection unit 2118 is connected to the lower-level controller 2043, for example. Information on the detection result of the position of the blocking stopper 2107 is transmitted to the lower-level controller 2043 from the blocking stopper detection unit 2118. The lower-level controller 2043 can control the transport module 2011 to stop the transport carriage 2010 based on the information on the detection result of the position of the blocking stopper 2107 transmitted from the blocking stopper detection unit 2118. That is, the lower-level controller 2043 stops the transport carriage 2010 when the carriage transfer apparatus 2003 is not connected to the end of the transport module 2011 and when the blocking stopper 2107 is in a position for not obstructing the movement of the transport carriage 2010 due to breakage of the spring 2108 or the like. Thereby, even when the blocking apparatus 2008 is not normally operate, it is possible to prevent in advance the transport carriage 2010 from jumping out of or dropping from the transport path.

Note that, instead of the lower-level controller 2043, the middle-level controller 2041, the higher-level controller 2040, or other controllers may perform the same control as by the lower-level controller 2043 based on the detection result of the position of the blocking stopper 2107 by using the blocking stopper detection unit 2118.

Further, also in other embodiments including the eighth embodiment, the blocking stopper detection unit 2118 may be provided to perform the same control as in the present embodiment.

Note that, in the present embodiment and other embodiments including the eighth embodiment, the portion contacted with the blocking stopper 2107 or the blocking stopper 2107 of the transport carriage 2010 may be configured as below.

First, a portion of the transport carriage 2010 with which the blocking stopper 2107 contacts is not limited in particular and may be a carriage base 2030, for example, without being limited to the guide block 2035 in the eighth embodiment or the permanent magnet bracket 2034 in the present embodiment.

Furthermore, in order to suppress damage of the transport carriage 2010 due to the contact by the blocking stopper 2107, a component that absorbs impact, such as a shock absorber, may be attached to the blocking stopper 2107 or the portion with which the blocking stopper 2107 of the transport carriage 2010 contacts or both of them.

In addition, for example, the blocking stopper 2107 may be formed of a material such as a resin material whose strength is lower than the portion with which the blocking stopper 2107 of the transport carriage 2010 contacts. Thereby, the blocking stopper 2107 can be configured so that, when the blocking stopper 2107 and the transport carriage 2010 come into contact with each other, the blocking stopper 2107 side rather than the transport carriage 2010 is damaged. Such a configuration that suppresses damage of the transport carriage 2010 can be employed to the blocking stopper 2107. The blocking stopper 2107 can be configured as an easily replaceable component. Thus, the configuration in which the blocking stopper 2107 side is damaged allows quick recovery of the transport system 2061 compared to the case where the damaged transport carriage 2010 is repaired, replaced, or the like.

As discussed above, also in the present embodiment, in the same manner as in the eighth embodiment, even when a transfer operation of the transport carriage 2010 to the carriage transfer module 2039 occurs in the absence of the carriage transfer module 2039, it is possible to prevent the transport carriage 2010 from jumping out of or dropping from the transport path.

Tenth Embodiment

A tenth embodiment of the present invention will be described by using FIG. 29 and FIG. 30. Note that the same components as those in the eighth and ninth embodiments described above are labeled with the same reference numerals, and the description thereof will be omitted or simplified.

Figure 29:
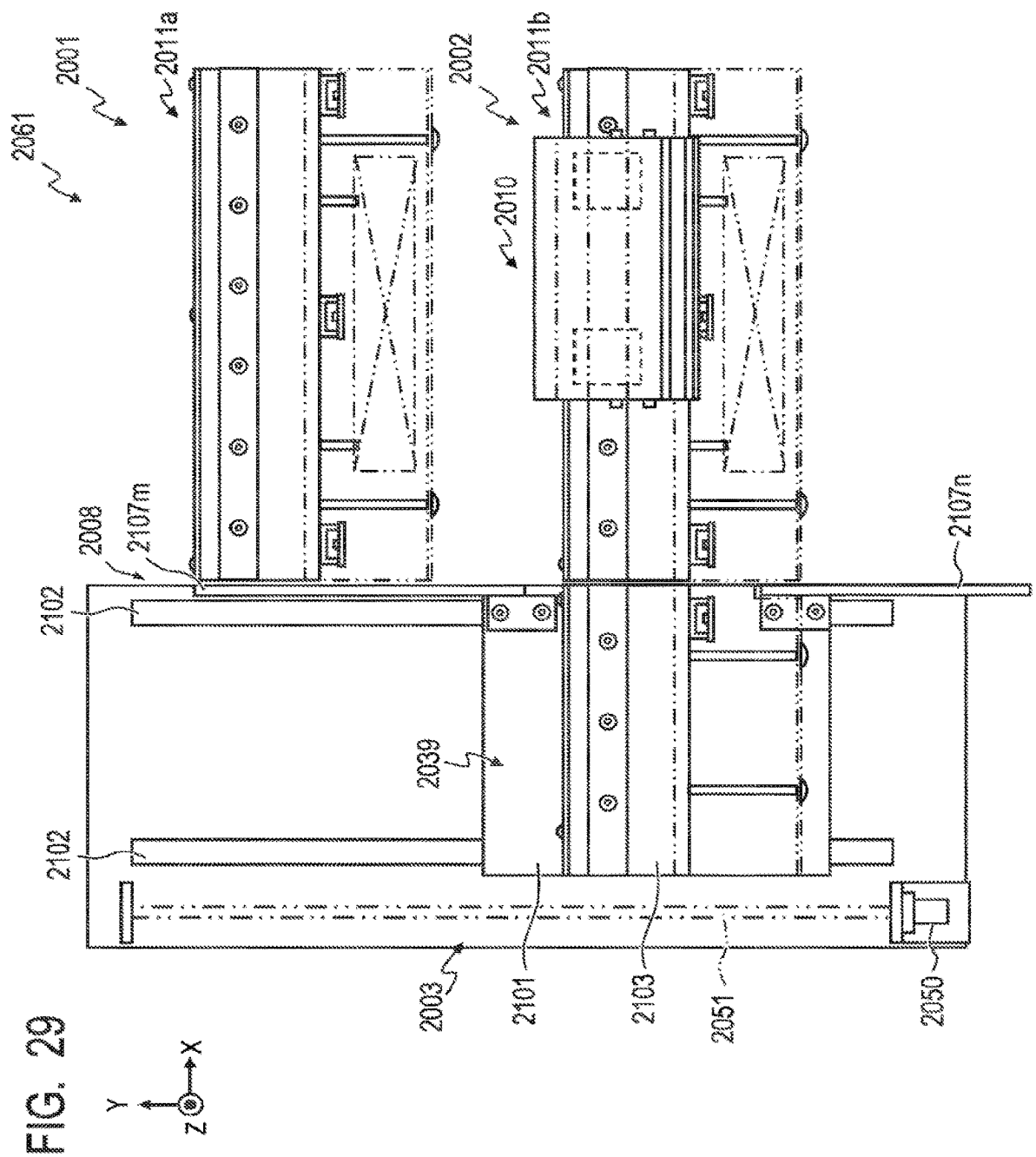
FIG. 29 is a top view illustrating a configuration of a transport system according to a tenth embodiment of the present invention.
Figure 30:
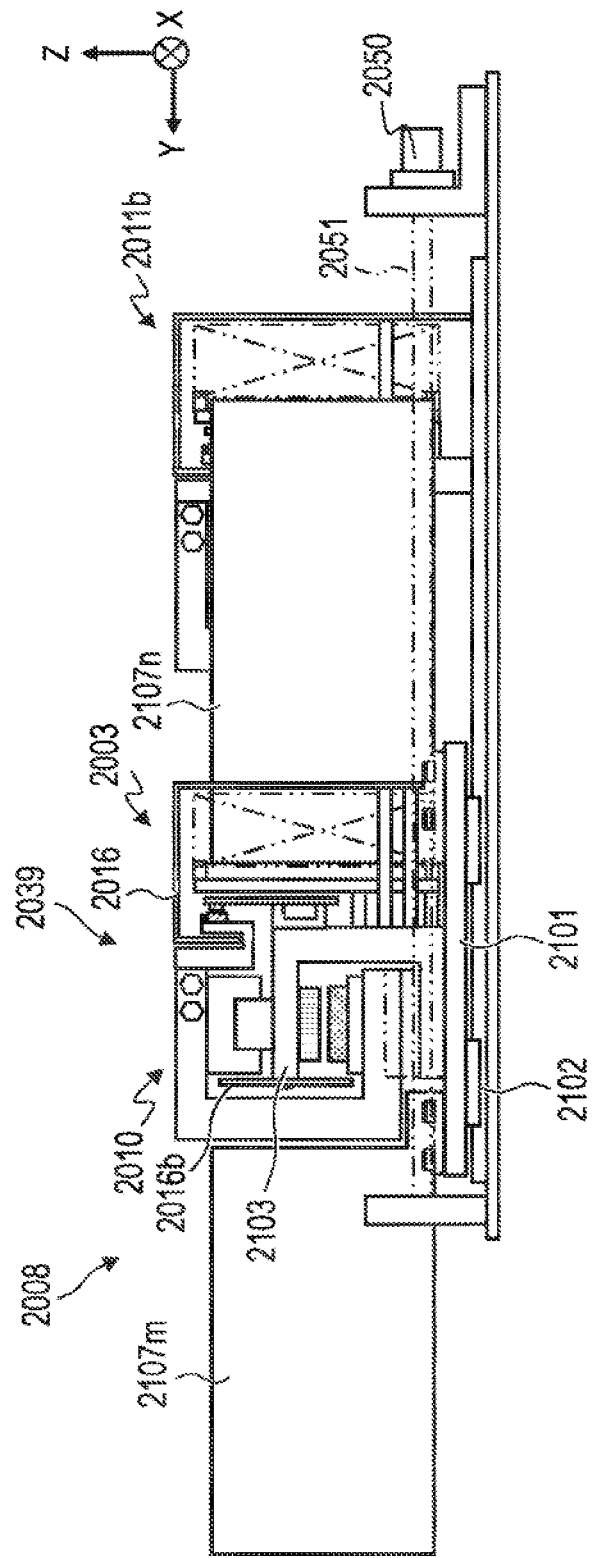
FIG. 30 is a side view illustrating a configuration of the transport system according to the tenth embodiment of the present invention.

FIG. 29 and FIG. 30 illustrate the configuration including the carriage transfer apparatus 2003, the transport carriage 2010, the transport module 2011, and the blocking apparatus 2008 of the transport system 2061 according to the present embodiment. FIG. 29 is a top view of the transport system according to the present embodiment when viewed from the Z-direction. FIG. 30 is a side view of the transport system according to the present embodiment when viewed from the X-direction. Note that the position of the carriage transfer apparatus 2003, that is, the positions of the carriage transfer apparatus base 2101 and the carriage transfer apparatus casing 2103 are different between FIG. 29 and FIG. 30.

The carriage transfer apparatus 2003, the transport carriage 2010, and the transport module 2011 illustrated in FIG. 29 and FIG. 30 are the same as those of the eighth embodiment. Thus, the blocking apparatus 2008 according to the present embodiment that makes difference from the eighth embodiment will be described below.

As illustrated in FIG. 29 and FIG. 30, the blocking apparatus 2008 according to the present embodiment is provided to the carriage transfer apparatus 2003. The blocking apparatus 2008 according to the present embodiment has blocking stoppers 2107m and 2107n. The blocking stoppers 2107m and 2107n are installed on the carriage transfer apparatus base 2101 that is movable in the Y-direction together with the carriage transfer module 2039 along the linear motion guide 2102.

Furthermore, as illustrated in FIG. 30, the blocking stoppers 2107m and 2107n are installed so as to be located on both the left side and the right side of the carriage transfer module 2039 of the carriage transfer apparatus 2003 when viewed in the X-direction in FIG. 30. Thereby, when being connected to the end of the transport modules 2011 on any one of the forward path side and the reverse path side, the carriage transfer module 2039 can obstruct the movement of the transport carriage 2010 on the other transport module 2011. That is, when the carriage transfer module 2039 is connected to the end of the transport module 2011b on the forward path side, movement of the transport carriage 2010 on the transport module 2011a on the reverse path side can be obstructed by the blocking stopper 2107m. On the other hand, when the carriage transfer module 2039 is connected to the end of the transport module 2011a on the reverse path side, movement of the transport carriage 2010 on the transport module 2011b on the forward path side can be obstructed by the blocking stopper 2107n.

However, the blocking stoppers 2107m and 2107n are installed so as not to obstruct the movement of the transport carriage 2010 from the transport module 2011 to the carriage transfer module 2039 which are connected to each other or from the carriage transport module 2039 to the transport module 2011 which are connected to each other.

The blocking stopper 2107 has such a shape that, when the carriage transfer module 2039 of the carriage transfer apparatus 2003 and the end of the transport module 2011 on any one of the forward path side and the reverse path side are connected to each other, reaches a position for obstructing the movement of the transport carriage 2010 on the other transport module 2011. Specifically, the blocking stopper 2107m has such a shape that, when the carriage transfer module 2039 is connected to the end of the transport module 2011b on the forward path side, reaches a position for obstructing the movement of the transport carriage 2010 on the transport module 2011a on the reverse path side. Further, the blocking stopper 2107n has such a shape that, when the carriage transfer module 2039 is connected to the end of the transport module 2011a on the reverse path side, reaches a position for obstructing the movement of the transport carriage 2010 on the transport module 2011b on the forward path side. Note that the shape of the blocking stoppers 2107m and 2107n is not limited as long as it can obstruct the movement of the transport carriage 2010 as illustrated above and may be a plate-like shape, a grid-like shape, a bar-like shape, or the like, for example.

In the present embodiment, the blocking stoppers 2107m and 2107n interlock with the motion of the carriage transfer module 2039 of the carriage transfer apparatus 2003 and move to a position for obstructing the movement of the transport carriage 2010 and a position for not obstructing the movement as descried below.

As illustrated in FIG. 29, the carriage transfer module 2039 of the carriage transfer apparatus 2003 is connected to the end of the transport module 2011b on the forward path side. From this state, the carriage transfer apparatus base 2101 of the carriage transfer apparatus 2003 and the carriage transfer module 2039 move in the +Y-direction in FIG. 29 from the transport module 2011b side to the transport module 2011a side by using the carriage transfer actuator 2050 and the ball screw 2051. In response, the blocking stoppers 2107m and 2107n also interlock with the motion of the carriage transfer apparatus base 2101 and the carriage transfer module 2039 and move in the +Y-direction from the transport module 2011b side to the transport module 2011a side.

As described above, as a result of interlocking motion of the carriage transfer apparatus base 2101, the carriage transfer module 2039, and the blocking stoppers 2107m and 2107n, the carriage transfer apparatus base 2101 leaves the end of the transport module 2011b. At the same time, the blocking stopper 2107n approaches the end of the transport module 2011b and obstructs the movement of the transport carriage 2010 on the transport module 2011b.

On the other hand, when the carriage transfer apparatus base 2101 and the carriage transfer module 2039 approach the end of the transport module 2011a, the blocking stopper 2107m leaves the end of the transport module 2011a. Once the carriage transfer module 2039 moves and connects to the end of the transport module 2011a in such a way, the blocking stopper 2107m is completely separated from the end of the transport module 2011a. As a result, the movement of the transport carriage 2010 between the carriage transfer module 2039 and the transport module 2011a is not obstructed.

As discussed above, also in the present embodiment, likewise the eighth embodiment, even when a transfer operation of the transport carriage 2010 to the carriage transfer module 2039 occurs in the absence of the carriage transfer module 2039, it is possible to prevent the transport carriage 2010 from jumping out of or dropping from the transport path.

Note that, while the case where the blocking stoppers 2107m and 2107n are installed to the carriage transfer apparatus base 2101 has been described above, the embodiment is not limited thereto. Each of the blocking stoppers 2107m and 2107n may be any stopper as long as it interlocks and moves with the carriage transfer module 2039 of the carriage transfer apparatus 2003. The blocking stoppers 2107m and 2107n may be installed on other portion of the carriage transfer apparatus 2003 than the carriage transfer apparatus base 2101, for example, the carriage transfer apparatus casing 2103 of the carriage transfer module 2039.

Furthermore, a portion to which the blocking stoppers 2107m and 2107n are installed is not limited to the carriage transfer apparatus 2003. For example, the blocking stoppers 2107m and 2107n may be installed to the frame 2062 via a linear motion guide. In this case, the blocking stoppers 2107m and 2107n can be configured to interlock with the carriage transfer apparatus 2003 by being connected to the carriage transfer module 2039 of the carriage transfer apparatus 2003 via the cam follower or the like.

Further, while the case where the blocking apparatus 2008 is provided to the carriage transfer apparatus 2003 has been described above, the blocking apparatus 2008 may be provided to the carriage transfer apparatus 2004 in the same manner.

Eleventh Embodiment

An eleventh embodiment of the present invention will be described by using FIG. 31 and FIG. 32. Note that the same components as those in the eighth to tenth embodiments described above are labeled with the same reference numerals, and the description thereof will be omitted or simplified.

Figure 31:
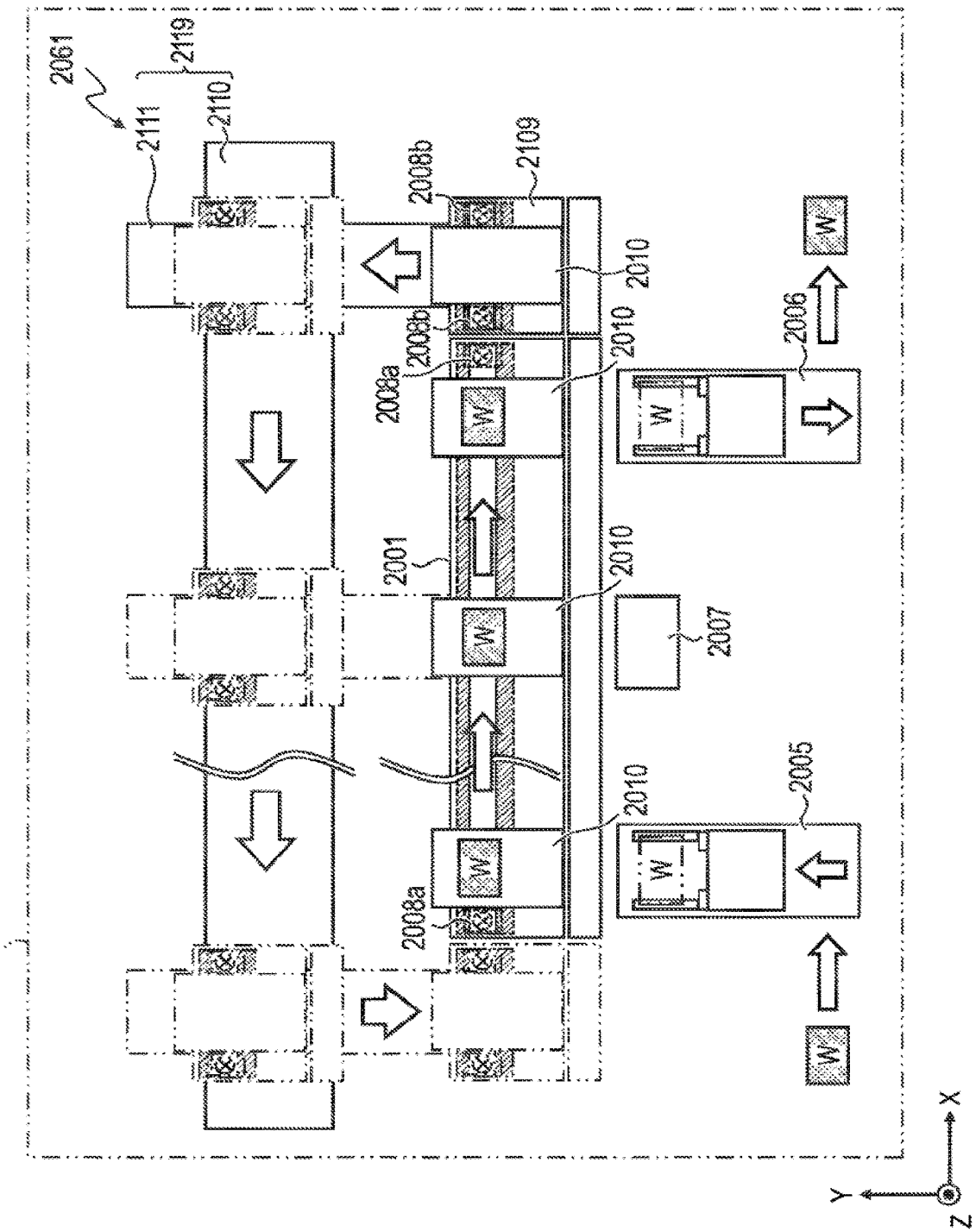
FIG. 31 is a schematic diagram illustrating a configuration of a processing system according to an eleventh embodiment of the present invention.

FIG. 31 is a schematic diagram illustrating the entire configuration of a processing system including a transport system according to the present embodiment, which is a top view of the entire processing system when viewed from the top. Further, FIG. 32 is a side view illustrating the configuration including a blocking apparatus of the transport system according to the present embodiment. Note that only the difference from the eighth embodiment will be described below.

As illustrated in FIG. 31, the transport system 2061 according to the present embodiment has the transport apparatus forward path 2001, a carriage transfer apparatus 2119, and the blocking apparatuses 2008. The carriage transfer apparatus 2119 has an X-axis mechanism 2110 and a Y-axis mechanism 2111. The transport apparatus forward path 2001 and the carriage transfer apparatus 2119 including the X-axis mechanism 2110 and the Y-axis mechanism 2111 form a transport path of the transport carriage 2010.

The carriage transfer apparatus 2119 further has a carriage transfer module 2109. The carriage transfer module 2109 has the same configuration as the transport module 2011 forming the transport apparatus forward path 2001. The carriage transfer module 2109 is able to connect to the end of the transport module 2011 on the most upstream side and the most downstream side on the transport apparatus forward path 2001 and transport with the transport carriage 2010 being transferred thereto.

In the carriage transfer apparatus 2119, the X-axis mechanism 2110 is configured to be able to move the carriage transfer module 2109 in the X-direction along the transport apparatus forward path 2001 with respect to the most upstream side or the most downstream side of the transport apparatus forward path 2001. Further, the Y-axis mechanism 2111 is configured to be able to move the carriage transfer module 2109 that has been moved by the X-axis mechanism 2110 to the most upstream side or the most downstream side of the transport apparatus forward path 2001 in the Y-direction so as to be adjacent to the end of the most upstream side or the most downstream side of the transport apparatus forward path 2001. The carriage transfer module 2109 that has been moved by the Y-axis mechanism 2111 so as to be adjacent to the end of the most upstream side or the most downstream side of the transport apparatus forward path 2001 is able to connect to the end of the adjacent transport module 2011 on the most upstream side or the most downstream side and transfer with the transport carriage 2010 being transported thereto.

Figure 32:
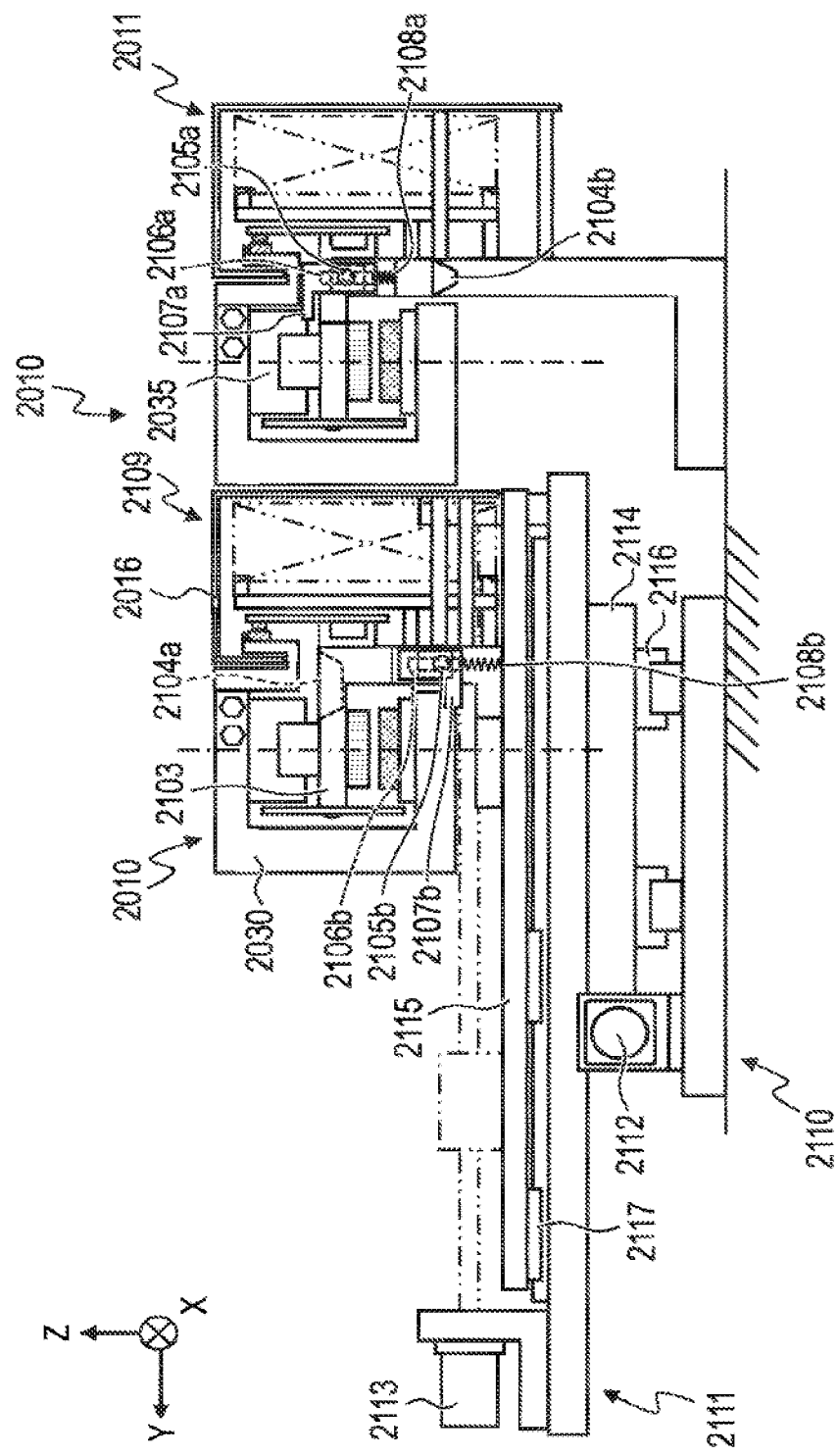
FIG. 32 is a side view illustrating a configuration including a blocking apparatus of a transport system according to the eleventh embodiment of the present invention.

As illustrated in FIG. 32, the X-axis mechanism 2110 has an X-axis actuator 2112, an X-axis linear motion guide 2116, and an X-axis base 2114. The Y-axis mechanism 2111 is installed on the X-axis base 2114. The X-axis mechanism 2110 uses the X-axis actuator 2112 to operate the X-axis base 2114 and the Y-axis mechanism 2111 installed on the X-axis base 2114 in the X-direction along the X-axis linear motion guide 2116 provided in parallel to the X-direction.

Further, the Y-axis mechanism 2111 has a Y-axis actuator 2113, a Y-axis linear motion guide 2117, and a Y-axis base 2115. The carriage transfer module 2109 is installed on the Y-axis base 2115. The Y-axis mechanism 2111 uses the Y-axis actuator 2113 to operate the Y-axis base 2115 and the carriage transfer module 2109 installed on the Y-axis base 2115 in the Y-direction along the Y-axis linear motion guide 2117 provided in parallel to the Y-direction.

As illustrated in FIG. 31, the transport carriage 2010 is transported along the transport apparatus forward path 2001 from the upstream to the downstream thereof (in the +X-direction in FIG. 31). The carriage transfer module 2109 is connected to the end of the transport module 2011 on the most downstream side of the transport apparatus forward path 2001. The transport carriage 2010 that has reached the most downstream side of the transport apparatus forward path 2001 transfers to the carriage transfer module 2109 at the most downstream side of the transport apparatus forward path 2001. The transport carriage 2010 that has transferred to the carriage transfer module 2109 stops on the carriage transfer module 2109.

Next, the transport carriage 2010 on the carriage transfer module 2109 is moved in the +Y-direction in FIG. 31 together with the carriage transfer module 2109 by the Y-axis mechanism 2111.

Next, the transport carriage 2010 on the carriage transfer module 2109 moves in the −X-direction in FIG. 31 together with the Y-axis mechanism 2111 and the carriage transfer module 2109 by using the X-axis mechanism 2110. At this time, the X-axis mechanism 2110 moves the Y-axis mechanism 2111, the carriage transfer module 2109, and the transport carriage 2010 up to the most upstream side on the transport apparatus forward path 2001.

Next, the transport carriage 2010 on the carriage transfer module 2109 moves in the −Y-direction in FIG. 31 together with the carriage transfer module 2109 by using the Y-axis mechanism 2111. The carriage transfer module 2109 that has move in such a way connects to the end of the transport module 2011 on the most upstream side of the transport apparatus forward path 2001. Next, the transport carriage 2010 on the carriage transfer module 2109 transfers to the transport module 2011 on the most upstream side of the transport apparatus forward path 2001. The transport carriage 2010 that has transferred to the transport module 2011 on the most upstream side of the transport apparatus forward path 2001 is again transported on the transport apparatus forward path 2001.

In this way, the transport carriage 2010 that has reached the most downstream side of the transport apparatus forward path 2001 is transferred to the most upstream side of the transport apparatus forward path 2001 by the X-axis mechanism 2110 and the Y-axis mechanism 2111 of the carriage transfer apparatus 2119 and thereby circulated and transported on the transport path including the transport apparatus forward path 2001. Note that, also in the transport system 2061 of the present embodiment, a single transport carriage may be installed or a plurality of transport carriages may be installed as previously described.

Further, the carriage transfer apparatus 2119 has the X-axis mechanism 2110 and the Y-axis mechanism 2111 that can move the carriage transfer module 2109 in the X-direction and the Y-direction in FIG. 31 and FIG. 32 but is not limited thereto. The carriage transfer apparatus 2119 may be any carriage transfer apparatus as long as it can move the carriage transfer module 2109 so as to be able to connect to both the most upstream side and the most downstream side of the transport apparatus forward path 2001. For example, the carriage transfer apparatus 2119 may be configured so that the carriage transfer module 2109 can move in two axis directions of the X-direction and the Z-direction in FIG. 31 and FIG. 32 or may be configured so that the carriage transfer module 2109 can move in three axis directions of the X-direction, the Y-direction, and the Z-direction in FIG. 31 and FIG. 32.

In the transport system 2061 according to the present embodiment described above, the blocking apparatuses 2008 are provided to both the ends of the carriage transfer module 2109 in addition to both the ends of the transport apparatus forward path 2001. Specifically, as the blocking apparatus 2008, blocking apparatuses 2008a are provided to both the ends of the transport apparatus forward path 2001, and blocking apparatus 2008b are provided to both the ends of the carriage transfer module 2109. That is, each blocking apparatus 2008 is provided to the connection part between the transport apparatus forward path 2001 and the carriage transfer module 2109. Thereby, when the transport apparatus forward path 2001 and the carriage transfer module 2109 are not connected to each other, it is possible to prevent the transport carriage 2010 from jumping out of or dropping from the transport apparatus forward path 2001. In addition, when the transport carriage 2010 on the carriage transfer module 2109 is transferred by the X-axis mechanism 2110 and the Y-axis mechanism 2111 of the carriage transfer apparatus 2119, it is possible to prevent the transport carriage 2010 from jumping out of or dropping from the carriage transfer module 2109.

Next, the configuration of the blocking apparatuses 2008 according to the present embodiment will be described. As the blocking apparatuses 2008 according to the present embodiment, there are blocking apparatuses 2008a provided for preventing the transport carriage 2010 from jumping out of or dropping from the transport apparatus forward path 2001 and blocking apparatuses 2008b provided for preventing the transport carriage 2010 from jumping out of or dropping from the carriage transfer module 2109.

As illustrated in FIG. 32, each of the blocking apparatuses 2008a at both the ends of the transport apparatus forward path 2001 has a cam follower 2105a, a linear motion guide 2106a, a blocking stopper 2107a, and a spring 2108a and is configured to operate by a cam plate 2104a in the same manner as the eighth embodiment. Each blocking apparatus 2008a has the same configuration as the blocking apparatus 2008 according to the eighth embodiment and operates in the same manner as the blocking apparatus 2008 according to the eighth embodiment. The blocking apparatuses 2008a at both the ends of the transport apparatus forward path 2001 can prevent the transport carriage 2010 from jumping out of or dropping from the transport apparatus forward path 2001 in the absence of the carriage transfer module 2109.

On the other hand, each of the blocking apparatuses 2008b at both the ends of the carriage transfer module 2109 has a cam follower 2105b, a linear motion guide 2106b, a blocking stopper 2107b, and a spring 2108b and is configured to operate by a cam plate 2104b. While the cam follower 2105b, the linear motion guide 2106b, the blocking stopper 2107b, and the spring 2108b are provided to the carriage transfer module 2109, the cam plate 2104b is installed to the transport module 2011.

The operation of each of the blocking apparatuses 2008b at both the ends of the carriage transfer module 2109 is the same as that of each of the blocking apparatuses 2008a at both the ends of the transport module 2011. That is, once the carriage transfer module 2109 connects to the end of the transport module 2011, the cam plate 2104b and the cam follower 2105b causes the blocking stopper 2107b to be in a position for not obstructing the movement of the transport carriage 2010 from a position for obstructing the movement of the transport carriage 2010. Note that the blocking stopper 2107b is adapted to interfere with the lower part of the carriage base 2030 of the transport carriage 2010 and obstruct and prevent the movement of the transport carriage 2010, for example, in a position for obstructing the movement of the transport carriage 2010. Each of the blocking apparatuses 2008b at both the ends of the carriage transfer module 2109 can prevent the transport carriage 2010 from jumping out of or dropping from the carriage transfer module 2109 when the transport carriage 2010 on the carriage transfer modules 2109 is transferred by the carriage transfer apparatus 2119.

As discussed above, also in the present embodiment, likewise the eighth embodiment, even when a transfer operation of the transport carriage 2010 to the carriage transfer module 2109 occurs in the absence of the carriage transfer module 2109, it is possible to prevent the transport carriage 2010 from jumping out of or dropping from the transport path. Further, in the present embodiment, in particular, when a transfer operation is performed by the carriage transfer apparatus 2119, it is possible to prevent the transport carriage 2010 from jumping out of or dropping from the carriage transfer module 2109.

Twelfth Embodiment

A twelfth embodiment of the present invention will be described by using FIG. 33 and FIG. 34. Note that the same components as those in the eighth to eleventh embodiments described above are labeled with the same reference numerals, and the description thereof will be omitted or simplified.

First, the configuration of the transport system according to the present embodiment will be described by using FIG. 33. FIG. 33 is a schematic diagram illustrating the configuration of the transport system according to the present embodiment, which is atop view of the entire transport system when viewed from the top. However, the configuration of the transport system according to the present embodiment is the same as the transport system according to the eighth embodiment except for the feature of the blocking apparatus 2008. In the present embodiment, as illustrated in FIG. 33, as the blocking apparatus 2008, blocking apparatuses 2008a and 2008b are installed at both the ends of the transport apparatus forward path 2001, and the blocking apparatuses 2008c and 2008d are installed at both the ends of the transport apparatus reverse path 2002. Note that FIG. 33 illustrates six transport carriages 2010a, 2010b, 2010c, 2010d, 2010e, and 2010f as the transport carriages 2010.

Each blocking apparatus 2008 according to the present embodiment is configured to use an air cylinder to operate the blocking stopper 2107. Note that the blocking apparatus 2008 may be adapted to use a drive source other than an air cylinder to operate the blocking stopper 2107 and, for example, may be adapted to use a linear motion electromotive actuator to operate the blocking stopper 2107. The blocking apparatus 2008 is connected to the middle-level controller 2041 in a controllable manner, for example. In this case, the blocking apparatus 2008 operates by being controlled by the middle-level controller 2041 and can operate so as to interlock with the motion of the carriage transfer module 2039 at the same timing as the blocking apparatus 2008 according to the eighth embodiment to switch a closed state and an opened state.

Next, the operation of the transport carriage 2010, the carriage transfer apparatuses 2003 and 2004, and the blocking apparatus 2008 will be described by using FIG. 33 and FIG. 34. FIG. 34 is a diagram illustrating a part of the timing chart illustrating the operation of the transport system according to the present embodiment.

Figure 33:
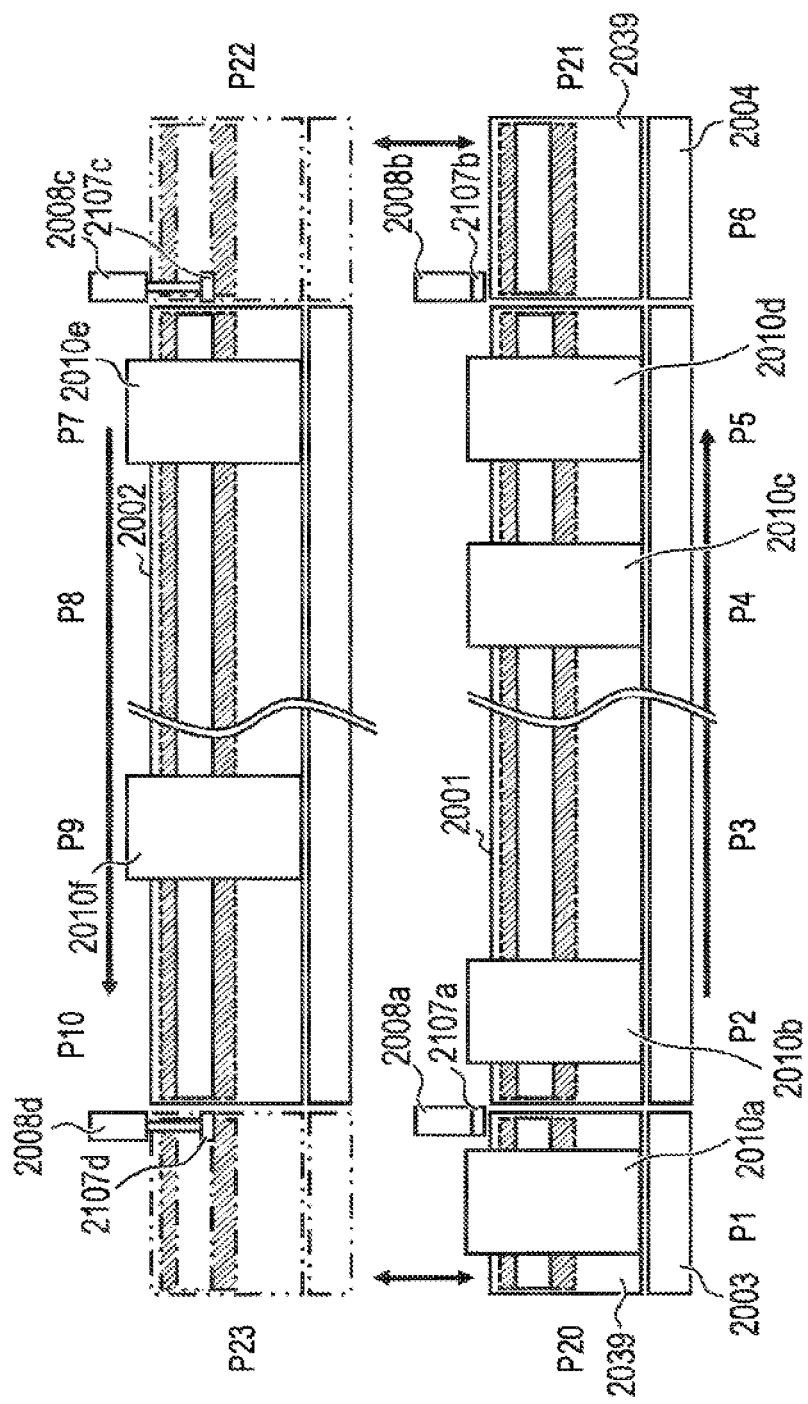
FIG. 33 is a schematic diagram illustrating the entire configuration of a transport system according to a twelfth embodiment of the present invention.
Figure 34:
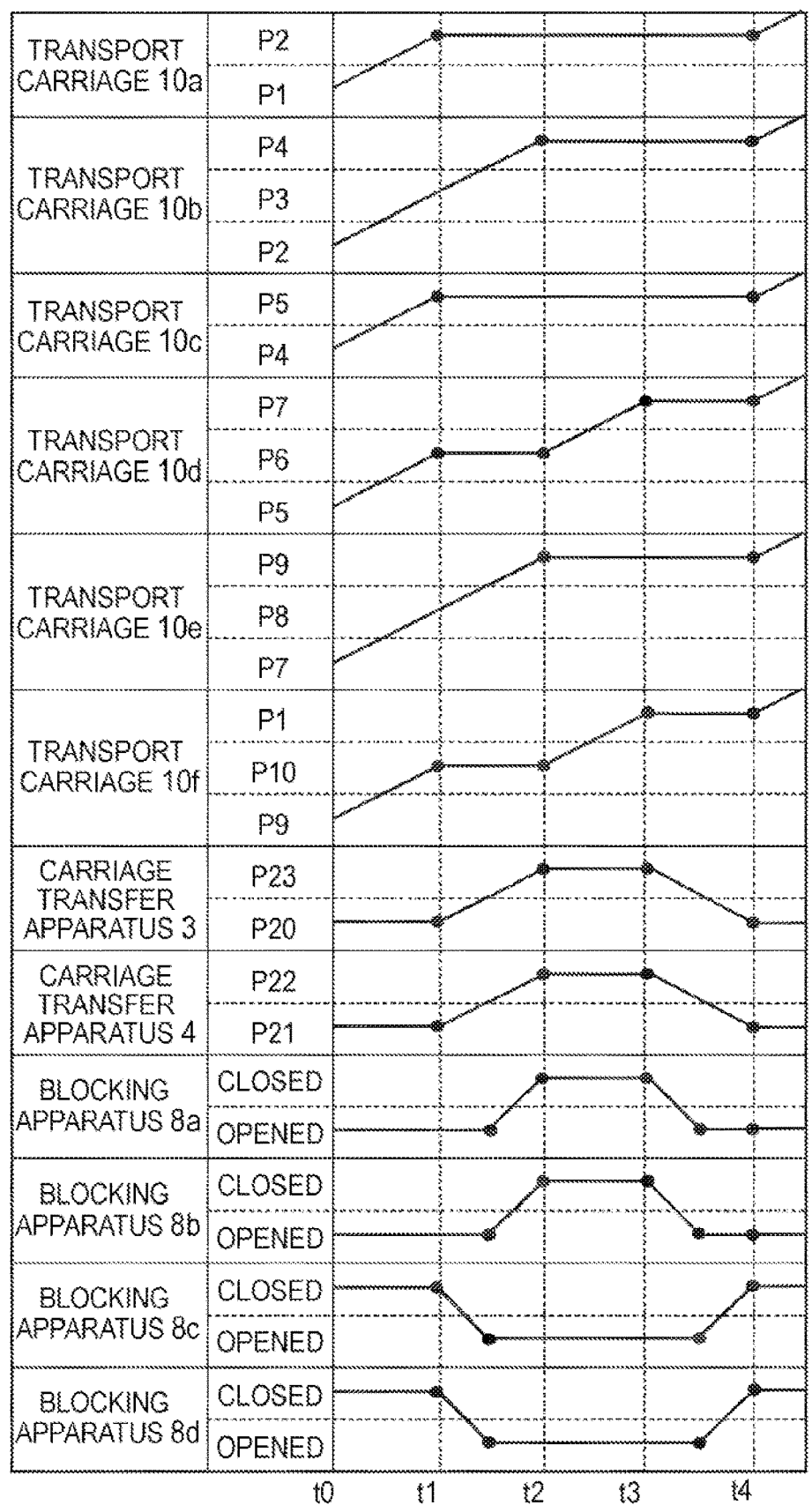
FIG. 34 is a diagram illustrating a part of a timing chart illustrating an operation of the transport system according to the twelfth embodiment of the present invention.

FIG. 33 illustrates each position and state of the transport carriage 2010, the carriage transfer apparatuses 2003 and 2004, and the blocking apparatus 2008 at the time t0. Note that, in the present embodiment, the positions of the carriage transfer apparatuses 2003 and 2004 refer to respective positions of the carriage transfer modules 2039. Further, FIG. 34 illustrates the operation of the transport carriage 2010, the carriage transfer apparatuses 2003 and 2004, and the blocking apparatus 2008 from the time t0 to the time t4. In FIG. 33 and FIG. 34, P1 to P10 indicate stop positions of the transport carriage 2010, P20 and P23 indicate the stop positions of the carriage transfer module 2039 of the carriage transfer apparatus 2003, and P21 and P22 indicate the stop positions of the carriage transfer module 2039 of the carriage transfer apparatus 2004.

First, at the time t0, the transport carriages 2010a, 2010b, 2010c, 2010d, 2010e, and 2010f and the carriage transfer modules 2039 of the carriage transfer apparatuses 2003 and 2004 are at respective stop positions illustrated in FIG. 33. That is, the transport carriage 2010a is stopped at the stop position P, the transport carriage 2010b is stopped at the stop position P2, the transport carriage 2010c is stopped at the stop position P4, the transport carriage 2010d is stopped at the stop position P5, the transport carriage 2010e is stopped at the stop position P7, and the transport carriage 2010f is stopped at the stop position P9. Further, the carriage transfer module 2039 of the carriage transfer apparatus 2003 is stopped at the stop position P20, and the carriage transfer module 2039 of the carriage transfer apparatus 2004 is stopped at the stop position P21.

Further, at the time t0, the blocking apparatuses 2008a and 2008b are opened, that is, the blocking stoppers 2107a and 2107b are in respective positions for not obstructing the movement of the transport carriage 2010. Further, at the time t0, the blocking apparatuses 2008c and 2008d are closed, that is, the blocking stoppers 2107c and 2107d are in respective positions for obstructing the movement of the transport carriage 2010.

From the time t0 to the time t1, the transport carriages 2010a, 2010b, 2010c, 2010d, 2010e, and 2010f operate. That is, the transport carriage 2010a moves to and stops at the stop position P2, the transport carriage 2010c moves to and stops at the stop position P5, the transport carriage 2010d moves to and stops at the stop position P6, and the transport carriage 2010f moves to and stops at the stop position P10. At this time, the transport carriages 2010b and 2010e continue to move.

Next, from the time t1 to the time t2, the transport carriages 2010b and 2010c, the transport transfer apparatuses 2003 and 2004, and the blocking apparatuses 2008a, 2008b, 2008c, and 2008d operate. That is, the transport carriage 2010b moves to and stops at the stop position P4, the transport carriage 2010e moves to and stops at the stop position P9, the carriage transfer module 2039 of the carriage transfer apparatus 2003 moves to and stops at the stop position P23, and the carriage transfer module 2039 of the carriage transfer apparatus 2004 moves to and stops at the stop position P22. Further, interlocking with this motion of the carriage transfer apparatuses 2003 and 2004, the blocking apparatuses 2008a and 2008b are switched from an opened state to a closed state, and the blocking apparatus 2008c and 2008d are switched from a closed state to an opened state.

At this time, the middle-level controller 2041 operates the blocking apparatus 2008 at a timing not causing interference with the carriage transfer module 2039 of the carriage transfer apparatus 2003 and switches the blocking apparatus 2008 between an opened state and a closed state. Thus, the transport carriage 2010b is moving also when the blocking apparatuses 2008a and 2008b are opened. Further, the transport carriage 2010e is moving also when the blocking apparatuses 2008c and 2008d are opened.

Here, the transport carriage 2010c preceding the transport carriage 2010b is located closer to the connection part where the carriage transfer module 2039 of the carriage transfer apparatus 2004 is connected to the transport module 2011 of the transport apparatus forward path 2001 than the transport carriage 2010b. In this case, the middle-level controller 2041 controls the transport carriage 2010c to stop while moving the transport carriage 2010b during a period including a period when the carriage transfer module 2039 of the carriage transfer apparatus 2004 is not connected to the transport module 2011 of the transport apparatus forward path 2001.

Similarly, the transport carriage 2010f preceding the transport carriage 2010e is located closer to the connection part where the carriage transfer module 2039 of the carriage transfer apparatus 2003 is connected to the transport module 2011 of the transport apparatus reverse path 2002 than the transport carriage 2010e. In this case, the middle-level controller 2041 controls the transport carriage 2010f to stop while moving the transport carriage 2010e during a period including a period when the carriage transfer module 2039 of the carriage transfer apparatus 2003 is not connected to the transport module 2011 of the transport apparatus reverse path 2002.

Thus, even if the transport carriage 2010b or 2010e does not stop at the stop position and almost jumps out of the transport path due to an erroneous operation, the transport carriage 2010 being out of control, or the like, such jumping out is prevented by the preceding stopped transport carriages 2010c or 2010f. That is, even if the transport carriage 2010b almost jumps out of the transport apparatus forward path 2001, the transport carriage 2010b collides with the preceding transport carriage 2010c, which prevents the transport carriage 2010b from jumping out. Further, even if the transport carriage 2010e almost jumps out of the transport apparatus reverse path 2002, the transport carriage 2010e collides with the preceding transport carriage 2010f, which prevents the transport carriage 2010e from jumping out.

As discussed above, in the present embodiment, even when the blocking apparatuses 2008a, 2008b, 2008c, and 2008d are opened, the preceding stopped transport carriages 2010c and 2010f prevent the moving transport carriages 2010b and 2010e from jumping out of the transport path. Thus, in the present embodiment, safety is ensured even when the blocking apparatus 2008 is opened. Therefore, in the present embodiment, even when the blocking apparatus 2008 is opened, the transport carriage 2010 can be moved.

Here, the middle-level controller 2041 that controls transportation of the transport carriage 2010 normally supplies motive power to the transport carriage 2010 stopped at a predetermined stop position and controls the transport carriage 2010 to stop at the predetermined stop position as a target stop position by using servo control.

In contrast, for further safety, the middle-level controller 2041 may perform control so as to cut off the motive power to the transport carriages 2010c and 2010f to stop the transport carriages 2010c and 2010f during the time t1 to the time t2. By cutting off the motive power to stop the transport carriages 2010c and 2010f, it is possible to more reliably prevent the transport carriages 2010c and 2010f from being pushed toward the outside of the transport path even when the subsequent transport carriages 2010b and 2010e collide.

Next, during the time t2 to the time t3, the transport carriages 2010d and 2010f operate. That is, the transport carriage 2010d moves to and stops at the stop position P7, and the transport carriage 2010f moves to and stops at the stop position P1.

Next, during the time t3 to the time t4, the carriage transfer apparatuses 2003 and 2004 and the blocking apparatuses 2008a, 2008b, 2008c, and 2008d operate. That is, the carriage transfer module 2039 of the carriage transfer apparatus 2003 on which the transport carriage 2010f stops moves to and stops at the stop position P20, and the carriage transfer module 2039 of the carriage transfer apparatus 2004 moves to and stops at the stop position P21. Further, the blocking apparatuses 2008a and 2008b are switched from a closed state to an opened state, and the blocking apparatuses 2008c and 2008d are switched from an opened state to a closed state.

As a result, at the time t4, the state of the transport system according to the present embodiment is a state where the transport carriages 2010 have moved to the next position by one transport carriage from the state of the time t0. With repetition of the same operation as the operation from the time t1 to the time t4 as discussed above, circulating transportation of the transport carriages 2010 is performed. Note that, also in other embodiments, the transport system can be operated in the same manner as the present embodiment.

As discussed above, there may be a case where the carriage transfer module 2039 of the carriage transfer apparatus 2003 or 2004 is not connected to the end of the transport apparatus forward path 2001 or the transport apparatus reverse path 2002, that is, the end of the transport module 2011 and further the blocking apparatus 2008 is opened. Even in such a case, by stopping the transport carriage 2010 located near the connection part of the carriage transfer module 2039 and the end of the transport module 2011, it is possible to move the transport carriage 2010 located farther from the connection part than that transport carriage 2010. Even if the transport carriage 2010 does not stop due to an erroneous operation, the transport carriage 2010 being out of control, or the like, the moving transport carriage 2010 collides with the stopped transport carriage 2010, and it is therefore possible to prevent the transport carriage 2010 from jumping out or dropping from.

Note that, while each blocking apparatus 2008 according to the present embodiment is configured to use an air cylinder to operate the blocking stopper 2107, the blocking apparatus 2008 as described above may be adapted to use a drive source other than an air cylinder to operate the blocking stopper 2107. Further, as each configuration of the blocking apparatus 2008, the configuration according to other embodiments such as the eighth embodiment may be employed.

Further, such a configuration may be employed that directly presses and fixes the transport carriage 2010 located near the connection part to the carriage transfer module 2039 and the end of the transport module 2011 by using an air cylinder or the like when the transport carriage 2010 is stopped at the stop position. For example, in the present embodiment, it is possible to install a fixing mechanism that presses and fixes the transport carriage 2010 stopping at the stop positions P5 and P10 that are the closest to the connection part, specifically, the transport carriages 2010c and 2010f stopping at the stop positions P5 and P10 during the time t1 to the time t2.

Other Embodiments

The present invention is not limited to the embodiments described above, and various modifications are possible.

For example, while the case of using the carriage transfer apparatus 11 that moves each of the transport modules 12, 17, and 17' within a plane formed by the transport path such as the Y-axis direction has been described as an example in the above embodiments, the carriage transfer apparatus is not limited thereto. As the carriage transfer apparatus, for example, a carriage transfer apparatus in which the moving direction of the linear or curved transport module, that is, the transfer direction of a carriage is the Z-axis direction may also be used. In this case, the carriage transfer apparatus can move the transport module upward or downward with respect to a plane formed by the transport path and transfer a carriage from one transport path to another transport path or the maintenance transport module whose positions of the Z-axis direction are different from each other. This enables maintenance of a particular carriage without increasing the footprint of the transport system and without stopping a process on another carriage.

The transport module connection face of the fixed transport path may be configured to be engaged with a concave part and a convex part in the carriage traveling direction. In such a case, it appears to be difficult to use a carriage transfer apparatus having a transport module that moves in a direction different from the carriage traveling direction within a plane forming the transport path. Even in such a case, the use of the carriage transfer apparatus that moves the transport module in the Z-axis direction as described above can realize motion of a carriage between the transport paths different from each other or between the transport path and the maintenance transport module.

Further, in the case described above, the maintenance transport module may be arranged in a position in the Z-axis direction which does not interfere with the processing operation area and is different from the processing operation area and thereby can be configured to be able to connect to the carriage transfer apparatus. Thereby, also in a portion where the curved transport module of the transport path is used, constraints on the end face shape of the transport module or constraints for avoiding interference between the maintenance transport module and the processing operation area can be significantly eased.

Further, while the case where the transport system is formed of a synchronous type linear motor has been described as an example in the above embodiments, without being limited thereto, the transport system can be formed of a reluctance type linear motor.

Further, while the case where the processing system forms a production line such as an assembly line of workpieces or the like has been described as an example in the above embodiments, the invention is not limited thereto. The present invention can be applied to any line that divides a series of operation processes into a plurality of stations and performs the series of operation processes and can also be applied to a line for various operations other than a production line.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2017-184119, filed Sep. 25, 2017, and No. 2017-184121, filed Sep. 25, 2017, which are hereby incorporated by reference herein in their entirety.

What is claimed is:

1. A transport system comprising:
   a carriage;
   a first transport module on which the carriage moves in a first direction;
   a second transport module on which the carriage moves in a second direction intersecting with the first direction, the second transport module being movable in the second direction;
   a sensor that detects a position of the second transport module and outputs position information of the second transport module; and
   a control unit that controls a position of the second transport module,
   wherein the control unit causes, before the second transport module arrives at a transfer position where the carriage transfers from the first transport module to the second transport module, the carriage on the first transport module to move toward the transfer position, and
   causes, after the second transport module arrives at the transfer position, the carriage to move from the first transport module to the second transport module.

2. The transport system according to claim 1, wherein each of the first direction and the second direction is a horizontal direction.

3. The transport system according to claim 1, wherein the first direction is a horizontal direction and the second direction is a vertical direction.

4. The transport system according to claim 1, wherein the sensor is an encoder.

5. The transport system according to claim 1,
wherein each of the first and second transport modules has a group of coils, and
wherein the carriage has a permanent magnet or a ferromagnetic material at a position where the permanent magnet or the ferromagnetic material can face the group of coils and is driven by electromagnetic force generated between the permanent magnet or the ferromagnetic material and the group of coils.

6. The transport system according to claim 1,
wherein the first transport module includes a plurality of first transport modules and the second transport module includes a plurality of second transport modules, and
wherein the transport system comprises a circulating transport path formed by the plurality of first transport modules and the plurality of second transport modules.

7. The transport system according to claim 1, wherein the control unit corrects the stop position of the second transport module using position information of the second transport module output from the sensor.

8. The transport system according to claim 7, wherein the control unit calculates a position displacement that is a difference between a stop position of the second transport module in the second direction and the transfer position, and corrects the stop position of the second transport module so as to make the position displacement smaller.

9. The transport system according to claim 1, wherein the control unit causes the carriage to move from the first transport module to the second transport module without stopping the carriage while keeping the carriage moving.

10. An article manufacturing method comprising:
transporting a workpiece by the transport system according to claim 1; and
performing processing on the workpiece by a process apparatus.

11. A transport system comprising:
a carriage;
a first transport module on which the carriage moves in a first direction;
a second transport module on which the carriage moves in a second direction intersecting with the first direction, the second transport module being movable in the second direction;
a sensor that detects a position of the second transport module and outputs position information of the second transport module; and
a control unit that controls a position of the second transport module,
wherein the control unit is able to move the carriage on the second transport module to move in the first direction when the second transport module is not in a transfer position where the carriage transfers from the first transport module to the second transport module.

12. An article manufacturing method comprising:
transporting a workpiece by the transport system according to claim 11; and
performing processing on the workpiece by a process apparatus.

13. The transport system according to claim 11, further comprising a module controller, wherein the module controller is able to move the carriage on the second transport module in the first direction.

14. The transport system according to claim 11, wherein the control unit corrects a stop position of the second transport module using position information of the second transport module output from the sensor.

* * * * *

UNITED STATES PATENT AND TRADEMARK OFFICE
CERTIFICATE OF CORRECTION

| | |
|---|---|
| PATENT NO. | : 11,929,655 B2 |
| APPLICATION NO. | : 17/179500 |
| DATED | : March 12, 2024 |
| INVENTOR(S) | : Hirohisa Ota et al. |

It is certified that error appears in the above-identified patent and that said Letters Patent is hereby corrected as shown below:

On the Title Page

Item (73), "CANON KABUSHIKI KAISHI, Tokyo(JP)" should read --CANON KABUSHIKI KAISHA, Tokyo(JP)--

Signed and Sealed this
Sixteenth Day of April, 2024

Katherine Kelly Vidal
*Director of the United States Patent and Trademark Office*